United States Patent
Steffi

(10) Patent No.: US 9,657,765 B2
(45) Date of Patent: May 23, 2017

(54) THREAD REPAIR ASSEMBLY AND THREAD REPAIR KIT

(71) Applicant: QwikLine Industrial Products, Inc., Portland, OR (US)

(72) Inventor: Kevin Steffi, Vancouver, WA (US)

(73) Assignee: QwikLine Industrial Products, Inc., West Linn, OR (US)

( * ) Notice: Subject to any disclaimer, the term of this patent is extended or adjusted under 35 U.S.C. 154(b) by 59 days.

(21) Appl. No.: 14/275,655

(22) Filed: May 12, 2014

(65) Prior Publication Data

US 2014/0334899 A1    Nov. 13, 2014

Related U.S. Application Data

(60) Provisional application No. 61/822,185, filed on May 10, 2013.

(51) Int. Cl.
  *F16B 37/08* (2006.01)
  *F16B 37/00* (2006.01)
  (Continued)

(52) U.S. Cl.
  CPC .............. *F16B 37/002* (2013.01); *B23G 5/04* (2013.01); *B23G 7/02* (2013.01); *B23G 9/009* (2013.01);
  (Continued)

(58) Field of Classification Search
  CPC .............. F16B 37/0857; F16B 37/0864; F16B 37/0807; F16B 37/00; F16B 37/002; F16B 37/081; F16B 37/0892
  (Continued)

(56) References Cited

U.S. PATENT DOCUMENTS 2,463,179 A * 3/1949 Iftiger, Sr. ............... F16L 37/10
                                                  285/314
2,491,543 A * 12/1949 Alfonso ................. B23D 21/08
                                                   30/102
(Continued)

FOREIGN PATENT DOCUMENTS

JP      2002106535 A     4/2002
JP      2002168222 A     6/2002
(Continued)

OTHER PUBLICATIONS

ISA Korean Intellectual Property Office, International Search Report of PCT/US2012/049473, WIPO, Dec. 12, 2012, 2 pages.
(Continued)

*Primary Examiner* — Flemming Saether
(74) *Attorney, Agent, or Firm* — McCoy Russell LLP

(57) ABSTRACT

A thread repair assembly is provided. The thread repair assembly comprises a cutting-nut housing including a first axial end, a second axial end and an internal cutting-nut interface, the first and second axial ends each having an opening. The thread repair assembly further includes a cutting nut at least partially enclosed by the cutting-nut housing and including a plurality of cutting threads configured to engage a threaded element when the assembly is urged in a first axial direction and disengage the threaded element when the thread repair assembly is urged in a second axial direction opposing the first axial direction.

20 Claims, 42 Drawing Sheets

(51) Int. Cl.
*B23G 5/04* (2006.01)
*B23G 7/02* (2006.01)
*B23G 9/00* (2006.01)
*B23P 6/00* (2006.01)

(52) U.S. Cl.
CPC ............ *B23P 6/00* (2013.01); *F16B 37/0857* (2013.01); *F16B 37/0864* (2013.01); *F16B 37/0892* (2013.01)

(58) Field of Classification Search
USPC ......................... 411/267, 270, 278, 427, 432
See application file for complete search history.

(56) References Cited

U.S. PATENT DOCUMENTS

| | | | |
|---|---|---|---|
| 2,748,647 A * | 6/1956 | Notturno | F16B 37/0892 411/433 |
| 2,895,362 A * | 7/1959 | Jamgotchian | 81/119 |
| 2,973,677 A * | 3/1961 | Reiner | 81/436 |
| 4,346,491 A | 8/1982 | Kraus et al. | |
| 4,363,164 A * | 12/1982 | Okada | 29/270 |
| 4,462,731 A | 7/1984 | Rovinsky et al. | |
| 4,630,978 A | 12/1986 | Keiser et al. | |
| 4,930,961 A * | 6/1990 | Weis | F16B 37/0864 411/266 |
| 5,081,811 A * | 1/1992 | Sasaki | 52/223.13 |
| 5,139,381 A * | 8/1992 | Lubreski | F16B 37/0864 411/267 |
| 5,288,181 A * | 2/1994 | Pinkston | 408/1 R |
| 5,803,676 A | 9/1998 | Wienss | |
| 6,007,284 A * | 12/1999 | Taneichi | 411/267 |
| 6,033,169 A * | 3/2000 | Bettger | F16B 37/0857 411/267 |
| 2008/0014049 A1 | 1/2008 | Dvorak | |
| 2014/0099173 A1* | 4/2014 | Zeng | 411/427 |

FOREIGN PATENT DOCUMENTS

JP      2003205425 A    7/2003
WO      2013020027 A1   2/2013

OTHER PUBLICATIONS

ISA Korean Intellectual Property Office, International Search Report and Written Opinion of PCT/US2014/037720, WIPO, Sep. 29, 2014, 14 pages.

* cited by examiner

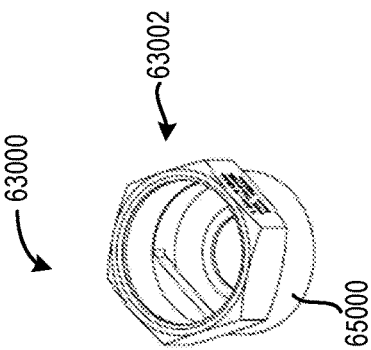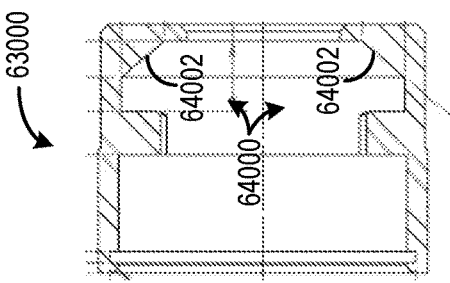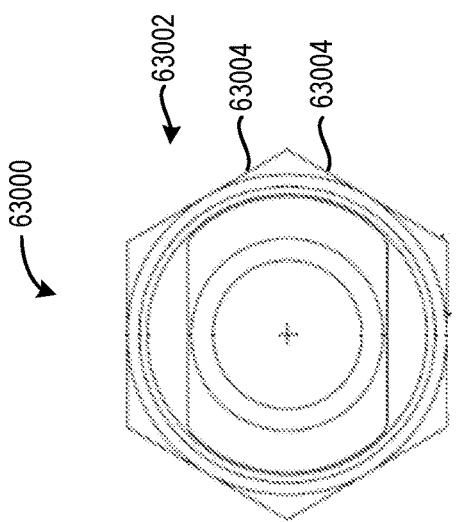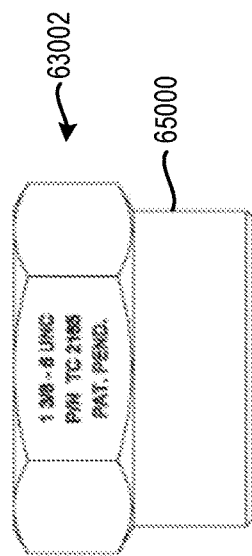

THREAD REPAIR ASSEMBLY AND THREAD REPAIR KIT

CROSS REFERENCE TO RELATED APPLICATION

This application claims priority to U.S. Provisional Patent Application No. 61/822,185, entitled "THREAD REPAIR ASSEMBLY AND THREAD REPAIR KIT," filed May 10, 2013, which is hereby incorporated by reference in its entirety for all purposes.

FIELD OF THE INVENTION

The present application relates to a thread repair assembly and a thread repair kit for repairing damaged threads on rods, pipes, etc.

BACKGROUND

Threaded rods or other threaded elements may be used in a wide range of applications. For instance, threaded rods may be used to hold buildings to foundation, floor-to-floor connections, roof-to-building connections, and in retrofit remodel construction. Specifically, when retrofitting or remodeling an existing building, extra connections constructed by adding threaded rod to existing foundations or side wall. Other applications for threaded rods include automotive applications, industrial applications, railway applications, etc. Threaded rods in all of the aforementioned applications may be damaged during construction, repair, etc. Attempts may be made to replace the damaged rod. However, replacing the rod may be costly and time consuming. Moreover, a spare rod having an equivalent size and geometry may not be on hand. Consequently, a worker may have to travel to a nearby store or order a new rod, further increasing delays. Therefore, attempts may be made to repair the threads of the rod on-site. Repairing the damaged threads may involve getting tools to cut or grind on the threaded rod to repair the treads so that a nut can be applied to the rod. Threaded rods that are not repaired may result in cross threading, which leads to weak connections. As a result, the structural integrity of the building, vehicle, railcar, machine, etc., in which the rod and nut is located may be decreased. Moreover, the damaged rods may increase the cost of construction and/or repair of a building, vehicle, railcar, machine, etc. Furthermore, prior thread cutters are bulky and have a limited applicability to threaded rods having a certain pitch and diameter. As a result, a large number of thread cutters may be needed for a construction project where the size and geometry of the rods vary. Furthermore, the thread cutters may be costly.

SUMMARY

As such, a thread repair assembly has been developed. The thread repair assembly comprises a cutting-nut housing including a first axial end, a second axial end, and an internal cutting-nut interface, the first and second axial ends each having an opening. The thread repair assembly further includes a cutting nut at least partially enclosed by the cutting-nut housing and including a plurality of cutting threads configured to engage a threaded element when the assembly is urged in a first axial direction and disengage the threaded element when the thread repair assembly is urged in a second axial direction opposing the first axial direction.

In one example, the cutting nut housing may further include an internal drive apparatus interface having at least two interior planar surfaces.

The thread repair assembly provides a number of advantages, such as providing thread repair of a damaged rod, bolt, or other suitable threaded element through an easily operated and compact system. Specifically, the thread repair assembly may be slid over an installed element in a first direction and then moved in the opposite direction to repair damaged threads, enabling the assembly to be used at a late stage in the construction/repair process. Moreover, positioning the drive apparatus interface at an internal location in the assembly enables a reduction in size of a drive apparatus used to apply torque to the assembly. Consequently, the thread repair assembly may be used in tighter and more compact spaces, thereby increasing the applicability of the thread repair assembly. Specifically, the thread repair assembly may be used in spaces with tight clearances, thereby enabling the assembly to be used in a variety of applications, environments, etc., which the thread repair assembly could not be previously used in. Furthermore, a variety of different types of cutting nuts having different thread sizes may be used in a common cutting-nut housing, increasing the adaptability of the thread repair assembly. In this way, a damaged element may be quickly and easily repaired via the thread repair assembly. Consequently, construction, repair, and/or remodel cost and duration of a building, vehicle, machine, etc., may be decreased.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show example embodiments of the present invention.

BRIEF DESCRIPTION OF THE DRAWINGS

FIGS. 63-66 show different views of another example cutting-nut housing which may be included in the thread repair system shown in FIGS. 48-50.

FIGS. 1-66 are drawn approximately to scale, however other relative dimensions may be used if desired.

DETAILED DESCRIPTION

Figure 1:
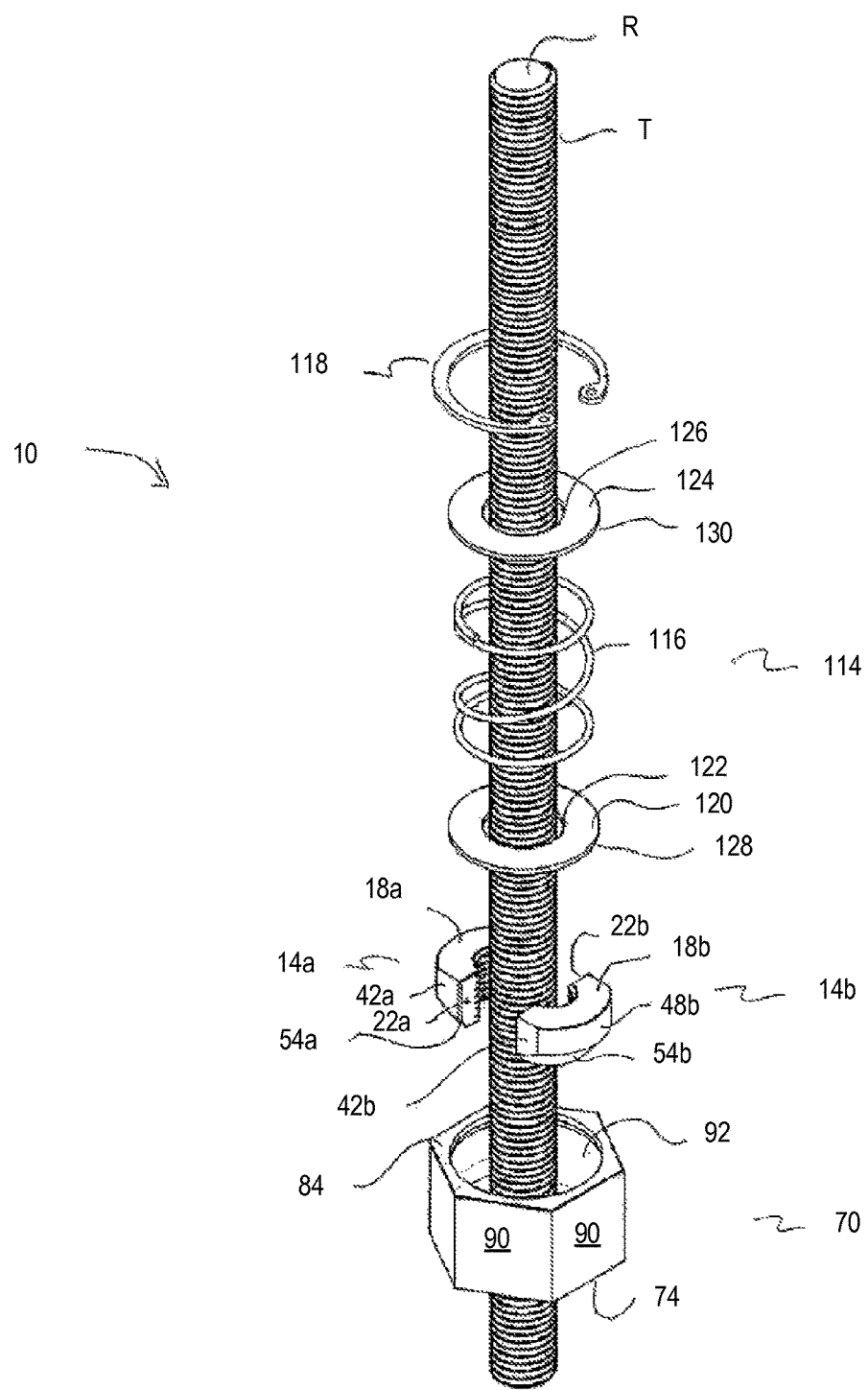
FIG. 1 shows an exploded view of a first embodiment.
Figure 2:
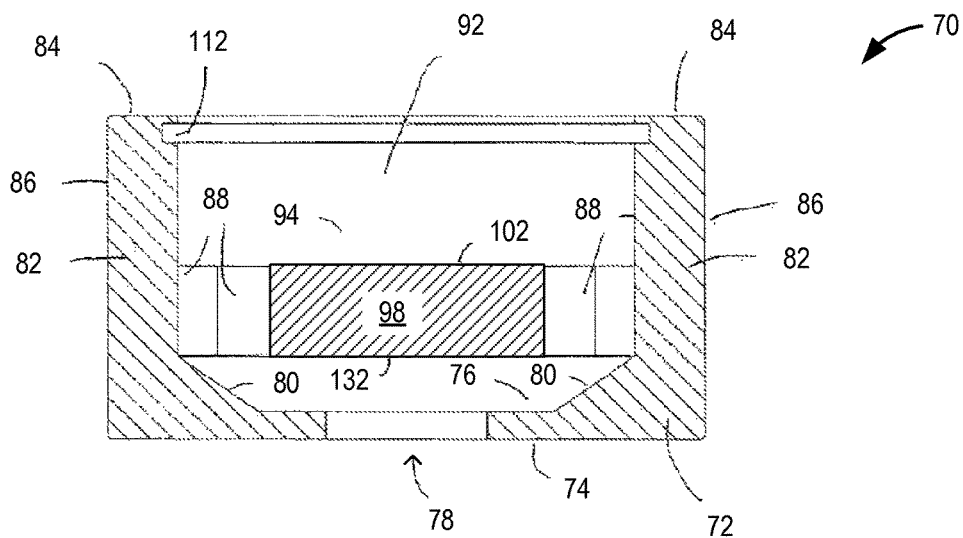
FIG. 2 shows a cutaway side view of a nut housing of a first embodiment, from the internal flat.
Figure 3:
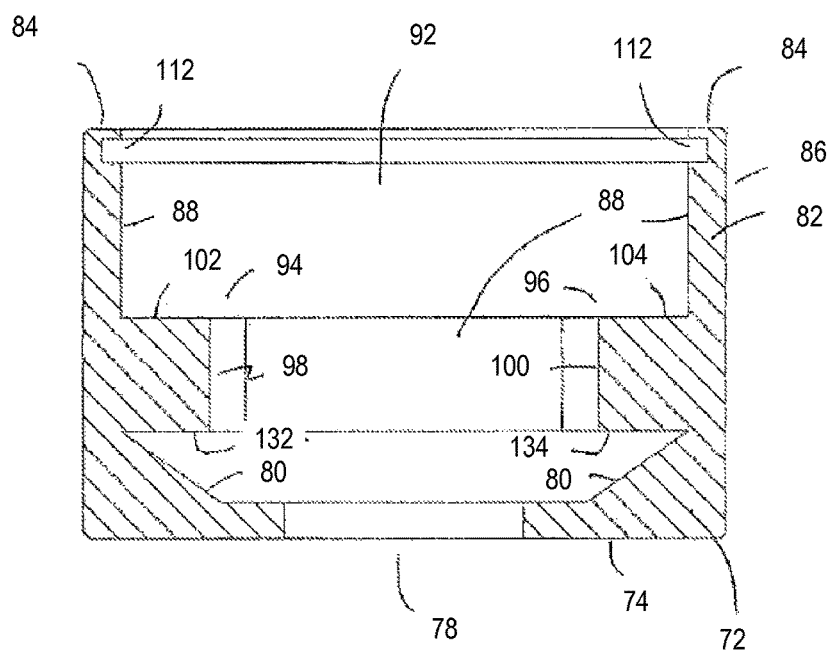
FIG. 3 shows a cutaway side view of a nut housing of a first embodiment, from the slot end.
Figure 4:
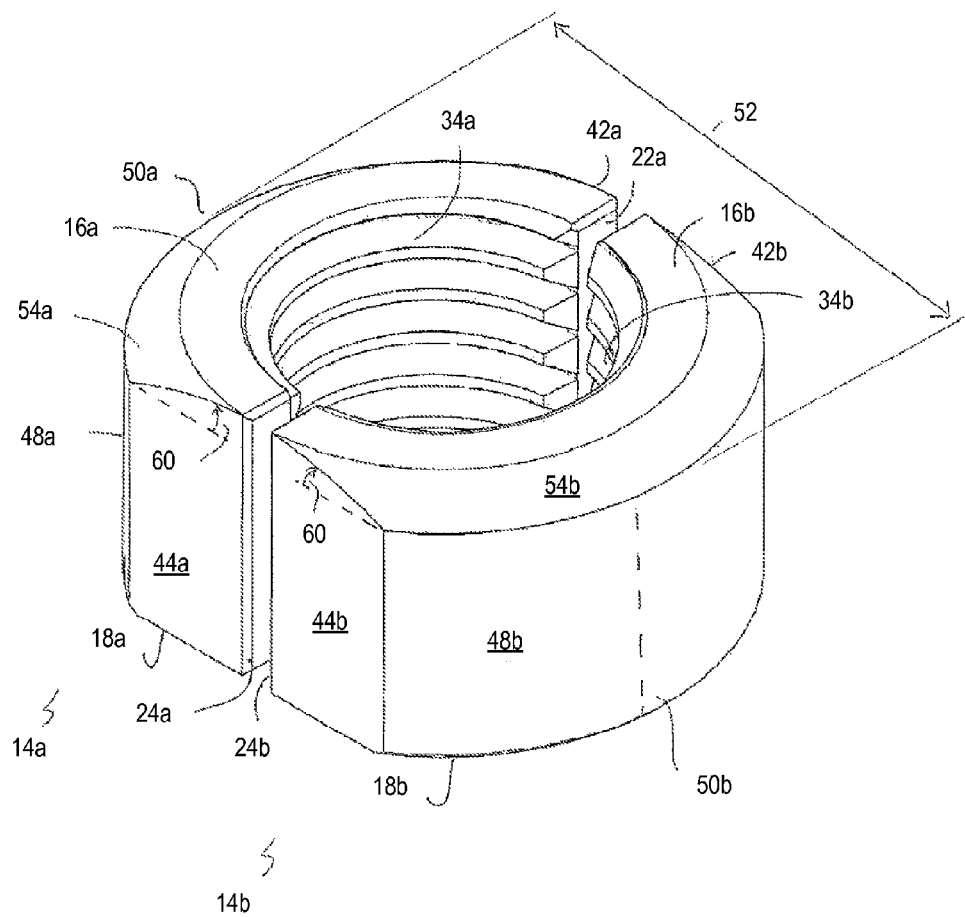
FIG. 4 shows a perspective view of a pair of half nuts of a first embodiment.
Figure 5:
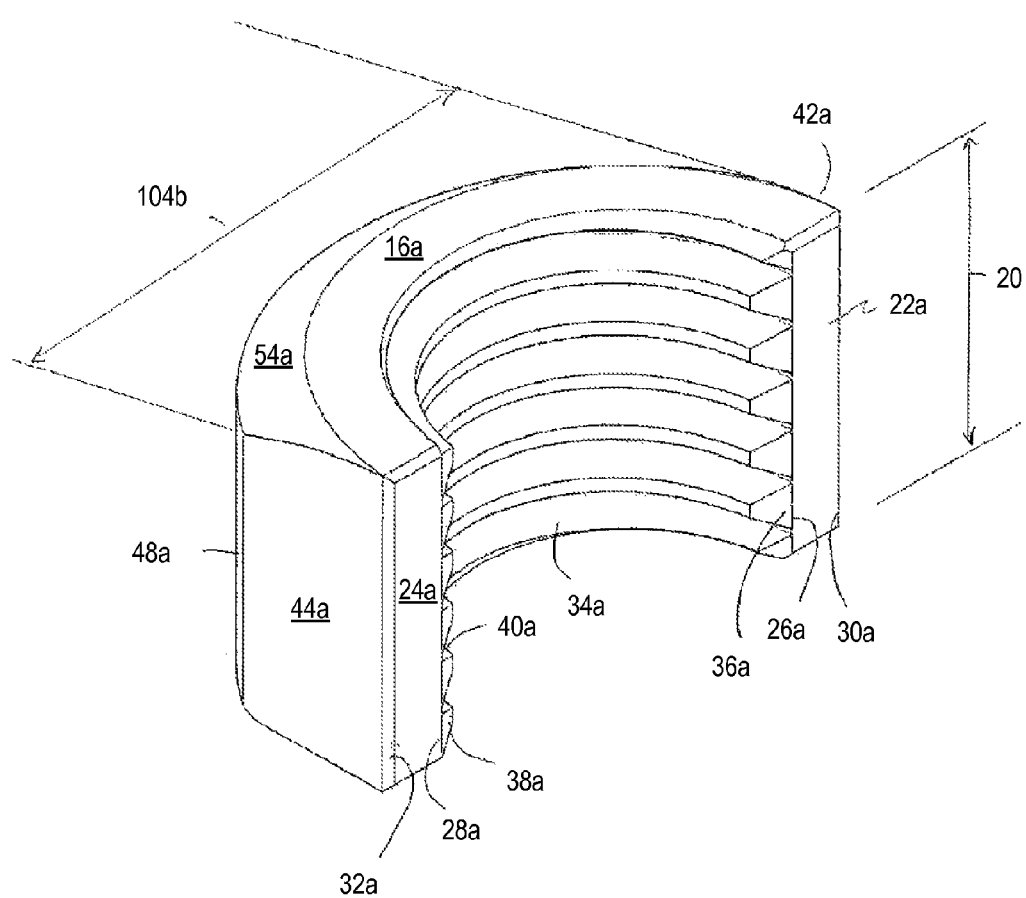
FIG. 5 shows a perspective view of a half nut of a first embodiment.
Figure 6:
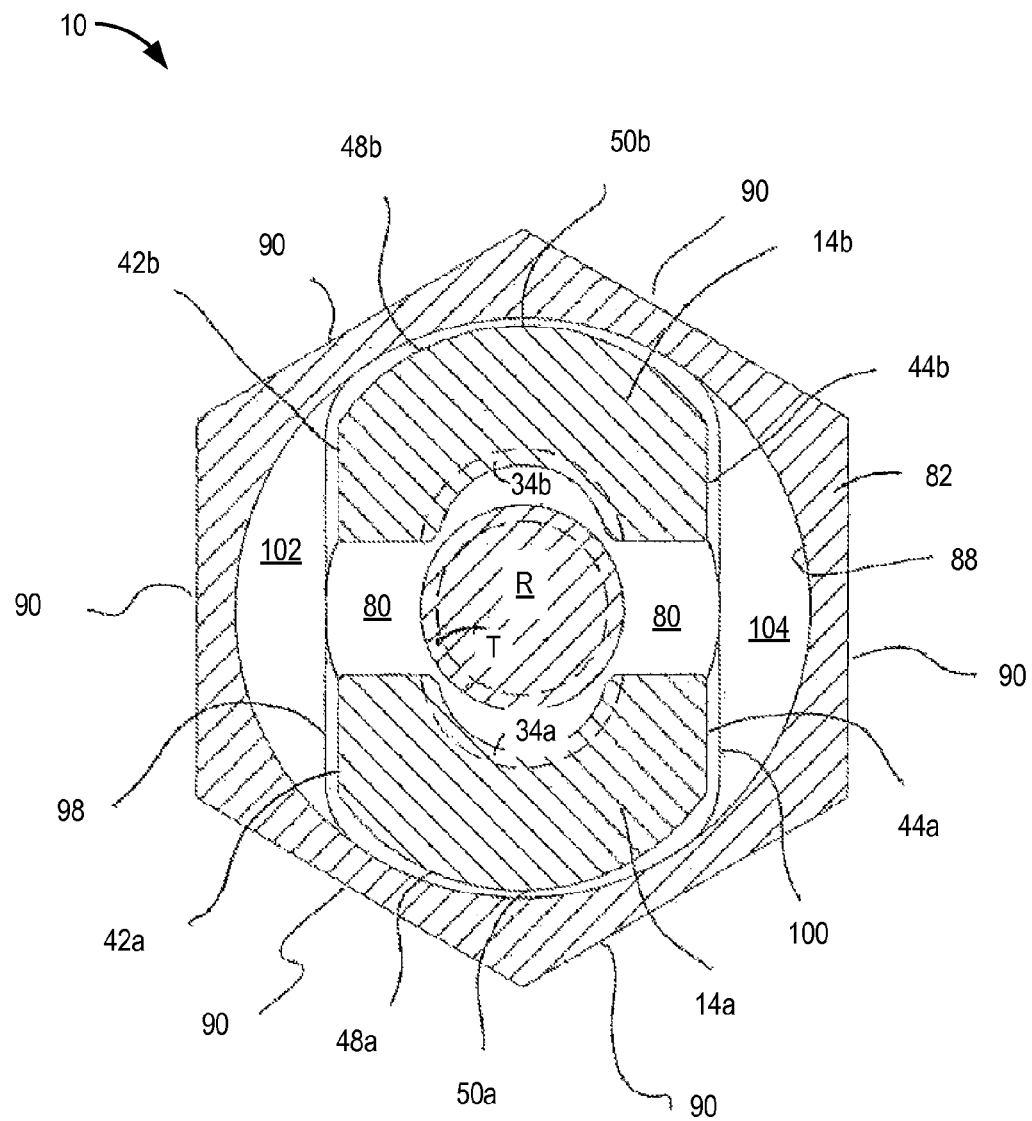
FIG. 6 shows a cutaway view of a first embodiment nut assembly on a threaded rod, disengaged.

A thread repair assembly is described herein. The thread repair assembly may include a cutting-nut housing including a first axial end, a second axial end, and an internal cutting-nut interface, the first and second axial ends each having an opening. The thread repair assembly may further include a cutting nut at least partially enclosed by the cutting-nut housing and including a plurality of cutting threads configured to engage a threaded element when the assembly is urged in a first axial direction and disengage the threaded element when the thread repair assembly is urged in a second axial direction opposing the first axial direction. In this way, the thread repair assembly may be slid over a threaded rod or bolt with the cutting nut disengaged and then moved in the opposite direction to engage the cutting nut, enabling repair of the damaged threads in the rod or bolt. The thread repair assembly may additionally include an internal drive apparatus interface having at least two interior planar surfaces, Positioning the drive apparatus interface at an internal location in the assembly enables a reduction in size of a drive apparatus used to apply torque to the assembly. Consequently, the thread repair assembly may be used in tighter and more compact spaces, thereby increasing the applicability of the thread repair assembly. Thus, the thread repair assembly may be used in applications, environments, etc., which were not formerly possible with prior thread repair devices.

Referring to FIGS. 1-6, a first embodiment of a fastener system 10 is shown. The first embodiment of the fastener system 10 includes a first nut assembly 12 to couple to a male threaded rod R or bolt, the first nut assembly 12 including opposed first and second half nuts 14a and 14b, a nut housing 70 to receive the first and second half nuts 14a & b, a compression portion 114, and retaining element 118. More generally both of the half nuts may be referred to as a cutting nut having a first piece and a second piece. Further it will be appreciated that the first piece and the second piece form separate volumes, in the depicted embodiment. Thus, each of the pieces forms a continuous shape, in the depicted embodiment.

Still referring to FIGS. 1-5, in a first embodiment, each first and second half nut 14a, 14b includes opposed first and second axial ends 16a, 16b and 18a, 18b, the distance between the axial ends 16a and 18a, 16b and 18b defining the nut depth 20a, 20b, respectively. First and second end faces 22a, 22b and 24a, 24b extend from the respective interior edge 26a, 26b, 28a, 28b to an exterior edge 30a, 30b and 32a, 32b, respectively, and from the first axial end 16a, 16b to the second axial end 18a, 18b, and parallel to each other. Female threaded semicircular interior surface 34a, 34b is adapted to engage a selected male thread T, the threaded interior surface 34a, 34b extending from a first thread edge 36a, 36b proximate the first end face interior edge 26a, 26b to a second thread edge 38a, 38b proximate the second end face interior edge 28a, 28b, and from the first 16a, 16b to the second 18a, 18b axial end, and having a thread depth 40a, 40b. Opposed parallel first and second exterior flats 42a, 42b and 44a, 44b are proximate the respective first and second end face exterior edges 22a, 22b and 24a, 24b, with the distance between the first and second exterior flats defining the nut width 46a, 46b. Back wall 48a, 48b extends between the first and second flats 42a, 42b and 44a, 44b, and between the first and second axial ends 16a, 16b and 18a, 18b. The distance between opposed points 50a, 50b on the respective first and second half nut back walls 48a, 48b when the first and second half nuts 14a, 14b are fully engaged against a threaded rod R or bolt defines the nut breadth 52. First bevel surface 54a, 54b extends along the intersection 56a, 56b of the back wall 48a, 48b and the first axial end 16a, 16b, defines a half nut first beveled end 58a, 58b and has a first bevel angle 60a, 60b. When the first and second half nuts 14a, 14b enclose a threaded rod R or bolt having the selected male thread T the respective first and second end faces 22a, 22b and 24a, 24b of the first and second half nuts 14a, 14b do not contact each other. This ensures that they will not interfere with the compression exerted on the half nuts. In the embodiment, each of first and second half nut first and second thread edges 36a, 36b and 38a, 38b, respectively, is beveled extending from the first axial end 16a, 16b, to the second axial end 18a, 18b, respectively. Beveling the thread edges, combined with the separation between end faces 22a, 22b and 24a, 24b, respectively, and the loose engagement, if any, of female threads 34a, 34b against threaded rod R while inserting, enables the nut assembly 12 to bypass regions of damaged threads. Damaged threads are a common occurrence in construction projects that can cause significant delays while effecting repairs. It will be appreciated that damaged threads may be caused via construction mistakes, external environmental factors, etc. Alternatively, first and second thread edges 36a, 36b and 38a, 38b may be rounded.

Still referring to FIGS. 1-6, in the first embodiment of the fastener system 10 nut housing 70 includes an end wall 72 having opposed exterior and interior surfaces 74 and 76 and a center aperture 78, the end wall interior surface including a concave tapered portion 80 centered on the center aperture 78 and matching the first bevel angle 60 to receive a half nut beveled end 58a, 58b. End wall exterior surface 74 has a flat (i.e., planar) face. However, other end wall exterior surface geometries have been contemplated. Enclosing sidewalls 82 extending from the end wall 72 to an edge face 84 and have exterior and interior surfaces 86 and 88, respectively, the edge face 84 parallel to the end wall exterior face 74. Side wall exterior surfaces 86 are adapted to receive a torque device. In the embodiment, side wall exterior surfaces 86 include six hexagonal flats 90 to receive a conventional flat wrench, but other configurations could be used, for example a square nut, star nut or other configurations. The interior surfaces of the end wall 76 and sidewalls 88 define a cavity 92 to receive first and second half nuts 14a, 14b, respectively. Opposed first and second interior flats 94 and 96, respectively, project into the cavity 92 proximate the end wall tapered portion 80, each of the first and second interior flats 94 and 96 including an engagement surface 98, 100, respectively, and a first lip 102, 104, respectively, distal from the nut housing end wall interior surface 76. The distance between the engagement surfaces defines a slot width 106 greater than or equal to the nut width 46a, 46b so as to slidingly engage the half nut exterior flats 42a, 44a and 42b, 44b, respectively, and the distance 108 from the end wall interior surface 7G to the first shoulder surface 102 or 104 is less than the nut depth 20a, 20b. The distance between sidewall interior surfaces 88 across the cavity 92 in the axis parallel to the interior flats 94, 96 defines a slot length 110 greater than the nut breadth 52 by at least the nut thread depth 40a, 40b. This allows the half nuts to fully disengage from threaded rod R or bolt during axial movement in one of the axial directions (e.g., a downward direction) along the threaded rod. In the embodiment, side wall interior surface 86 includes a channel 112 circumscribing the surface proximate edge face 84, the channel 112 to receive a snap ring 116.

In the embodiment, bevel edge 60a & 60b and tapered portion 80 have a slope in the range 10-15 degrees. Specifically in one example, the slope may be 10 degrees. However, other slopes have been contemplated. In practice, nut width 46a & 46b may be slightly less than the slot width 106 to permit insertion into the nut housing.

Referring again to FIGS. 1-6, in the first embodiment compression portion 114 includes a resilient member 116 disposed within the nut housing cavity 92 to urge the first and second half nuts 14a, 14b, respectively, against the end wall interior surface 76. Retaining element 118 retains the resilient member 116 within the nut housing cavity 92. In the first embodiment, resilient member 116 is a helical spring, and retaining element 118 is snap ring insertable into channel 112 in combination with second plate 124. However, other types of resilient members and/or retaining elements may be utilized in other embodiments. The second plate 124 may be generally referred to as a retaining element.

Referring again to FIGS. 1-6, in the first embodiment compression portion 114 includes a first plate 120 having a center aperture 122 and movably disposed between the resilient member 116 and the first and second half nuts 14a & 14b, respectively, and a second plate 124 having a center aperture 126 and movably disposed between the resilient member 116 (e.g., a helical spring) and the retaining element 118 (e.g., snap ring). First plate 120 provides more equal distribution of pressure from spring 116 against first and second half nuts 14a, 14b to ensure they remain aligned with each other and against tapered portion 80. In the embodiment, the outer perimeter edges 128 and 130 of first and second plates 120 and 124, respectively, approximately match the cross section of cavity 92 and side wall interior surfaces 86, so that they slide alongside wall interior surfaces 86 without becoming cockeyed. Resilient member 116 could also act directly against half nuts 14a & 14b without first plate 120, in which case the nut depth 20a, 20b would not necessarily have to be greater than the distance 108 from the end wall interior surface 76 to first shoulder surface 102, 104, in one example. In the embodiment shown in FIGS. 1-6, first plate 120 provides simple and robust distribution means and bearing surface to isolate the sliding movement of half nuts 14a & 14b from resilient member 116. The resilient member 116 and the first plate 120 may be generally referred to as a retaining element.

In the first embodiment, each of first and second half nut back walls 48a & 48b have an arcuate cross section, and more specifically a partial circular cross section, and nut housing end wall interior surface tapered portion 80 forms a concave frustum centered on aperture 78. However, other geometries of the first and second half nut back walls have been contemplated. Each of the nut housing first and second interior flats 94 and 96 include an opposed second lip 132 and 134, respectively, proximate the end wall interior surface 76, such that the interior flats 94 and 96 partially overhang the nut housing end wall interior tapered portion 80.

The arcuate cross section and frustum arrangement provide for more even compression around the perimeter of first and second half nut first beveled ends 58a & 58b, respectively, from tapered portion 80, which is especially useful for high torque scenarios. Additionally, a non-circular cross section for beveled ends 58a & 58b, and tapered portion 80, creates a complex surface which is difficult to machine with precision. In the first embodiment, a nut housing 70 may be produced in a multi-step machining process in order to achieve a circular frustum cross section: first, machining out cavity 92; second machining the tapered frustum 80; third machining channel 112, and fourth spot welding interior flats 94 and 96 to side wall interior surface 88. However, other nut housing production methods may be used in other examples.

Alternatively in another example, the first and second half nut back walls may be substantially rectangular in cross section, such that the first beveled surfaces may comprise triangular wedges, with end wall interior surface tapered portion formed into corresponding opposed flat tapered surfaces. However, this flat tapered configuration may be difficult to obtain using machining techniques and may require special tooling. Therefore, the flat tapered configuration may= be used for plastic molding or powdered metal forming techniques. It will be appreciated that plastic molding may limit the strength and temperature properties of the system and the powdered metal forming techniques may be costly. Additionally, the rectangular wedge shape may be more susceptible to galling or jamming, and may provide less even compression which reduces resistance to backing out. Unlike conventional bolting systems, the inventor's system may be manufactured from electrically non-conductive and/or chemically resistant materials such as PVC, PTFE, carbon fiber, or similar materials, for example to be used as a seismic restraint for a semiconductor chemical bench in a clean room, but still provide a desired amount of strength.

In the embodiment, resilient member 116 is a helical spring, but other resilient systems such as flat springs, pneumatics, or even opposing magnets could be used depending on size, cost and chemical environment, for instance. The fastener system can be easily scaled up or down for a given application. As a result, the applicability of the fastener system is increased.

Figure 7:
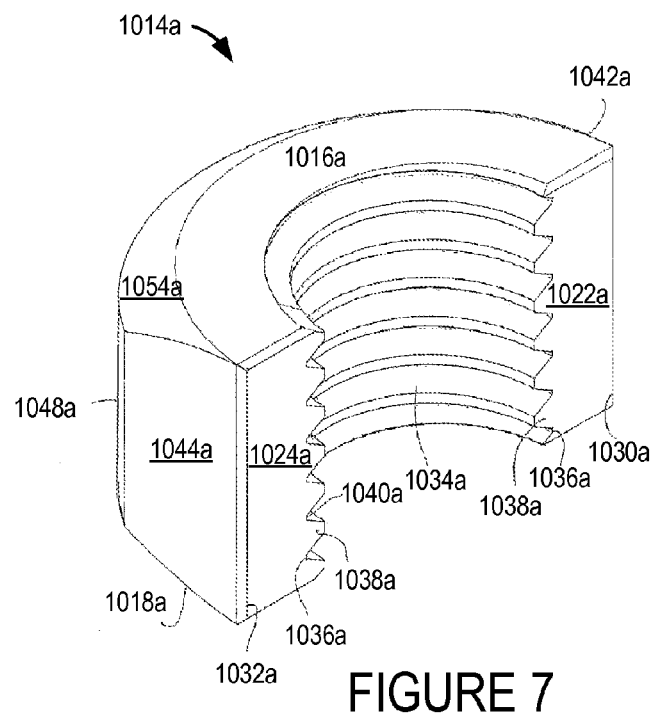
FIG. 7 shows a perspective view of a half nut of a second embodiment.
Figure 8:
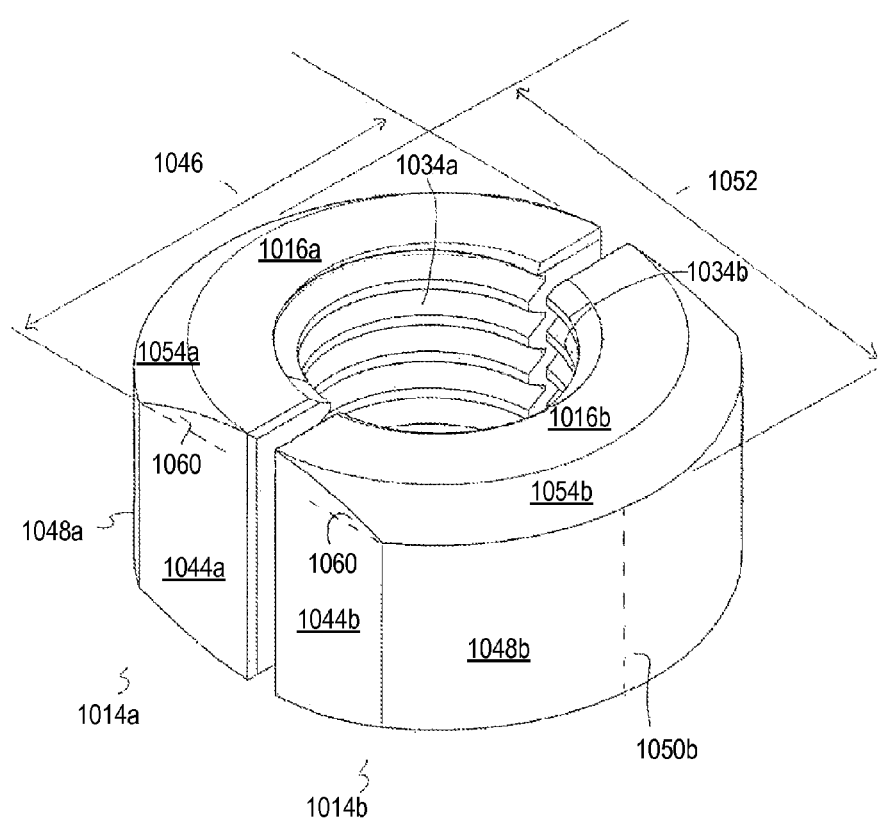
FIG. 8 shows a perspective view of a pair of half nuts of a second embodiment.
Figure 9:
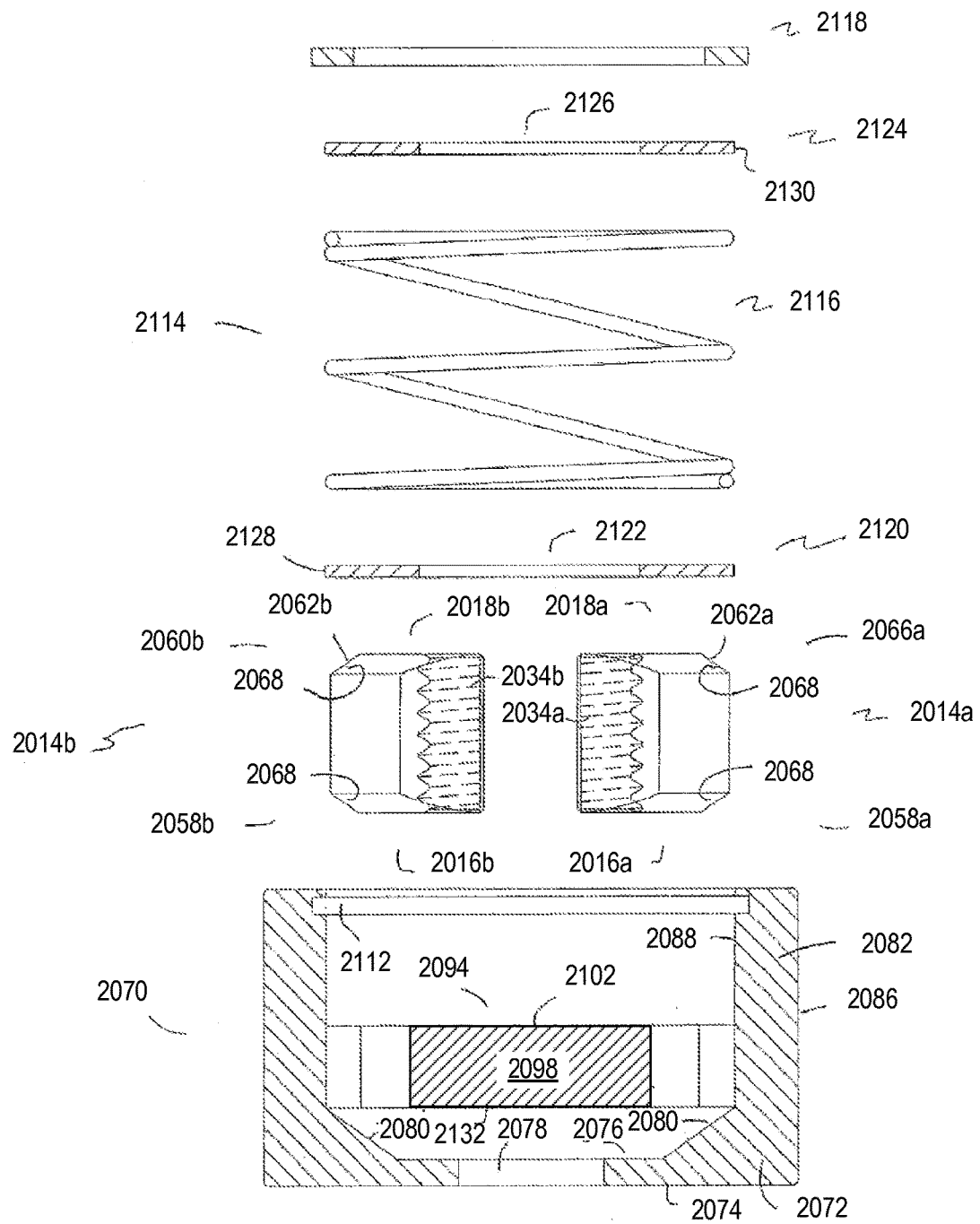
FIG. 9 shows an exploded cutaway side view of a third embodiment.
Figure 10:
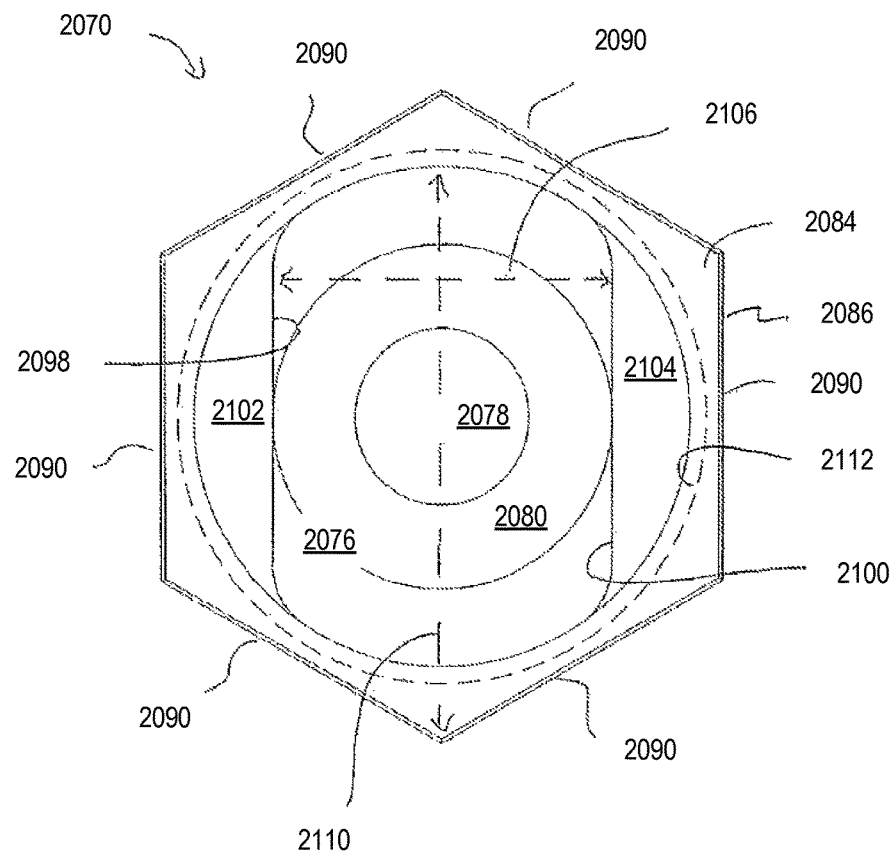
FIG. 10 shows an end-on view of a nut housing of a third embodiment.
Figure 11:
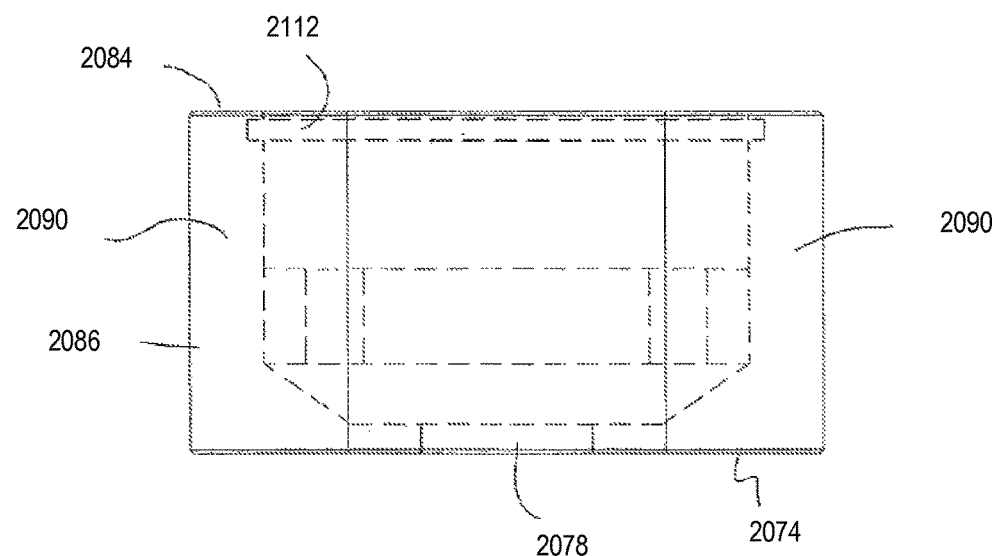
FIG. 11 shows aside view of a nut housing of a third embodiment oriented on the internal flats, with internal structures shown in hidden lines.
Figure 12:
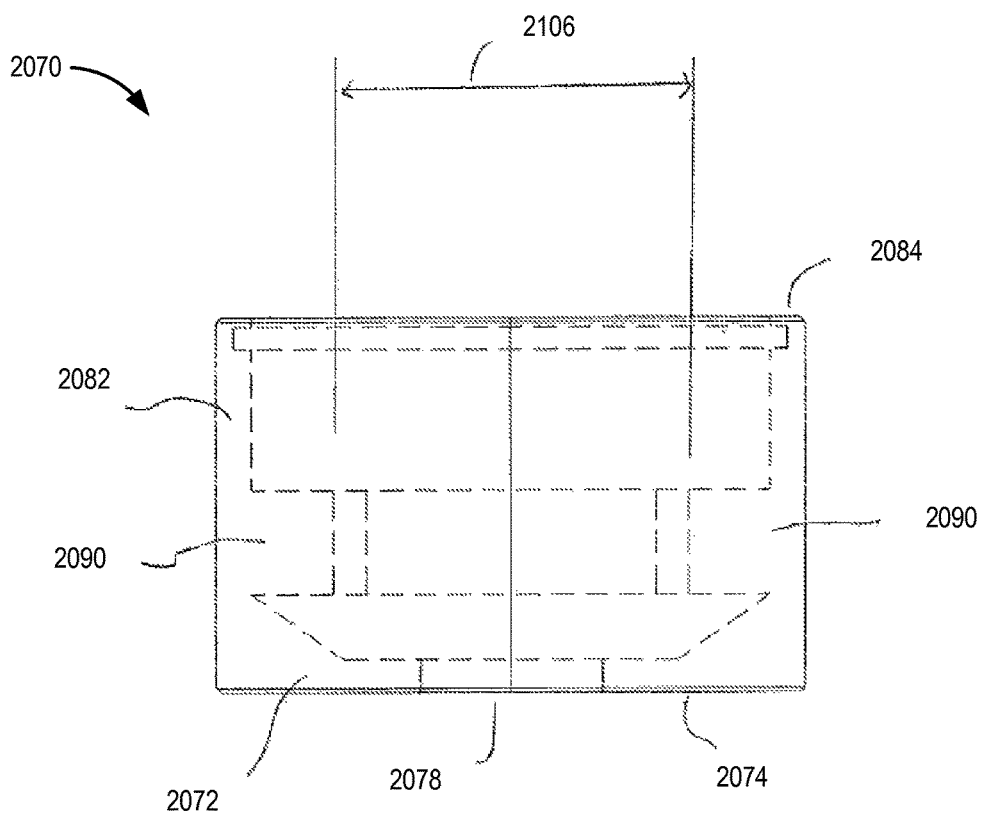
FIG. 12 shows a side view of a nut housing of a third embodiment oriented on the slot end, with internal structures shown in hidden lines.
Figure 13:
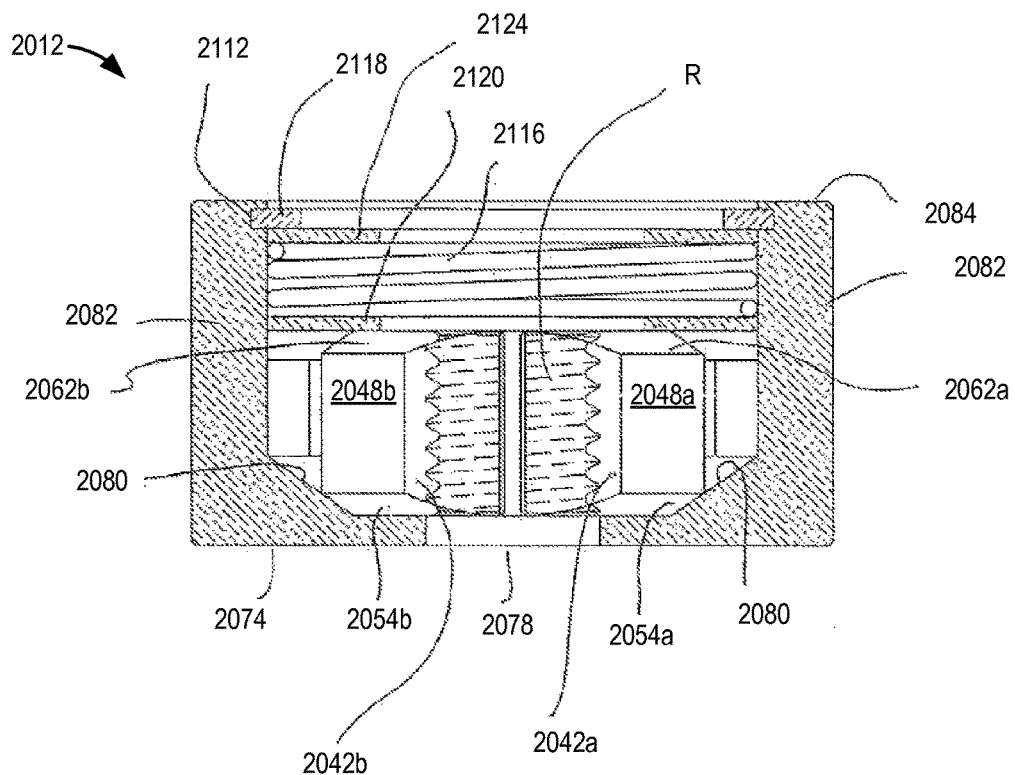
FIG. 13 shows a cutaway view of a third embodiment assembled.

Referring to FIGS. 7-8, first and second half nuts 1014a & 1014b of a second embodiment of the fastener system are shown. In the embodiment, each of first and second half nut first and second thread edges 1036a & 1036b and 1038a & 1038b, respectively, are sharp thread-cutting edges extending from the first axial end 1016a & 1016b, to the second axial end 1018a & 1018b, respectively. The ability to insert thread cutting half nuts 1014a & 1014b into a nut housing (not shown) provides the ability to repair damaged threads on a threaded rod if desired, similar to a thread die cutter. Unlike a conventional thread die cutter, however, threads 1034a & 1034b may loosely engage the male threads T along rod R until reaching the damaged thread region, at which point the user may provide counterforce on the nut housing to engage half nuts 1014a & 1014b to cut clean threads. In this way, a thread cutting die is not needed to engage and cut the entire length of threaded rod R or bolt. FIGS. 7 and 8 also show back wall 1048a, bevel edge 1060a & 1060, nut breadth 1052, nut width 1046, and exterior flat 1042a. The first and second end faces 1022a, 1024a are also shown in FIGS. 7 and 8. Additionally, an opposed point 1050b is also shown in FIGS. 7 and 8. The exterior flats 1044a and 1044b are also shown in FIGS. 7 and 8. Beveled surfaces 1054a and 1054b are also shown in FIGS. 7 and 8. Additionally, exterior edges 1030a 1032a are also shown in FIG. 7.

Referring to FIGS. 9-15, a third embodiment of a fastener system 2010 is shown. The third embodiment of the fastener system 2010 includes a first nut assembly 2012 to couple to a male threaded rod R or bolt, the first nut assembly 2012 including opposed first and second half nuts 2014a and 2014b, a nut housing 2070 to receive the first and second half nuts, a compression portion 2114, and retaining element 2118. In the third embodiment each half nut 2014a and 2014b includes opposed first and second beveled ends 2058a & 2066a and 2058b & 2066b, respectively. Providing first and second bevel surfaces allows the first and second half nuts 2014a and 2014b to be interchangeable with each other, reducing costs and/or potential installation errors.

Still referring to FIGS. 9-15, in the third embodiment the first and second half nut bevel ends 2058a & 2058b and 2066a & 2066b, respectively, are provided. Each first and second half nut 2014a & 2014b includes opposed first and second axial ends 2016a and 2018a, the distance between the axial ends 2016a and 2018a defining the nut depth 2020a. Each of the first and second end faces 2022a, 2024a extend from respective interior edge 2026a, 2028a to an exterior edge 2030a, 2032a, and from the first axial end 2016a to the second axial end 2018a, and parallel to each other. However, other edge and axial end geometries and orientations have been contemplated. Female threaded semi-circular interior surface 2034a is adapted to engage a selected male thread T, the threaded interior surface 2034a extending from a first thread edge 2036a proximate the first end face interior edge 2026a to a second thread edge 2038a proximate the second end face interior edge 2028a, and from the first 2016a to the second 2018a axial end, and having a thread depth 2040a. Opposed parallel first and second exterior flats 2042a and 2044a are provided proximate the respective first and second end face exterior edges 2022a and 2024a, the distance between the first and second exterior flats defining the nut width 2046a. Back wall 2048a extends between the first and second flats 2042a, 2044a and between the first and second axial ends 2016a, 2018a. The distance between opposed points 2050a & 2050b on the respective first and second half nut back walls 2048a & 2048b when the first and second half nuts 2014a & 2014b are fully engaged against a threaded rod R or bolt defines the nut breadth 2052. First bevel surface 2054a extends along the intersection 2056a of the back wall 2048a and the first axial end 2016a, defining a half nut first beveled end 2058a and having a first bevel angle 2060a. In the depicted embodiment, each of the first and second half nuts 2014a & 2014b includes a second bevel surface 2062a & 2062b extending along the intersection 2064a & 2064b of the back wall 2048a & 2048b and the second axial end 2018a & 2018b, respectively, defining a half nut second beveled end 2066a & 2066b, respectively, and having a second bevel angle 2068a & 2068b matching the first bevel angle 2060a & 2060b. wherein, when the first and second half nuts 2014a & 2014b enclose a threaded rod R or bolt having the selected male thread T the respective first and second end faces 2022a & 2022b and 2024a & 2024b of the first and second half nuts 2014a & 2014b do not contact each other.

In the third embodiment, each of first and second half nut first and second thread edges 2036a & 2036b and 2038a & 2038b, respectively, is beveled extending from the first axial end 2016a & 2016b, to the second axial end 2018a & 2018b, respectively. Beveling the thread edges, combined with the separation between end faces 2022a & 2022b and 2024a & 2024b, respectively, and the loose engagement, if any, of female threads 2034a & 2034b against threaded rod R or bolt while inserting, allows the nut assembly 2012 to bypass regions of damaged threads, a common occurrence in construction projects that can cause significant delays while effecting repairs. Alternatively, first and second thread edges 2036a & 2036b and 2038a & 2038b may be rounded.

Still referring to FIGS. 9-15, in a third embodiment 2010 nut housing 2070 includes an end wall 2072 having opposed exterior and interior surfaces 2074 and 2076 and a center aperture 2078, the end wall interior surface including a concave tapered portion 2080 centered on the center aperture 2078 and matching the first bevel angle 2060 to receive a half nut beveled end 2058a & 2058b. However, other arrangements and geometries of the nut housing have been contemplated. End wall exterior surface 2074 provides a flat face for mating against a flat surface. Enclosing sidewalls 2082 extend from the end wall 2072 to an edge face 2084 and have exterior and interior surfaces 2086 and 2088, respectively, the edge face 2084 parallel to the end wall exterior face 2074, and the side wall exterior surfaces 2086 adapted to receive a torque device. In the embodiment, side wall exterior surfaces 2086 include six hexagonal flats 2090 to receive a conventional flat wrench, but other configurations could be used. For instance, there may be two or more flats. The interior surfaces of the end wall 2076 and sidewalls 2088 define a cavity 2092 to receive first and second half nuts 2014a & 2014b, respectively. Opposed first and second interior flats 2094 and 2096, respectively, project into the cavity 2092 proximate the end wall tapered portion 2080, each of the first and second interior flats 2094 and 2096 including an engagement surface 2098 and 2100, respectively, and a first lip 2102 and 2104, respectively, distal from the nut housing end wall interior surface 2076. The distance between the engagement surfaces defines a slot width 2106 not less than the nut width 2046a & 2046b so as to slidingly engage the half nut exterior flats 2042a & 2044a and 2042b & 2044b, respectively, and the distance 2108 from the end wall interior surface 2076 to the first shoulder surface 2102 or 2104 is less than the nut depth 2020a & 2020b. The distance between sidewall interior surfaces 2088 across the cavity 2092 in the axis parallel to the interior flats 2094 & 2096 defines a slot length 2110 greater than the nut breadth 2052 by at least the nut thread depth 2040a & 2040b. In the depicted embodiment, side wall interior surface 2086 includes a channel 2112 circumscribing the surface proximate edge face 2084, the channel 2112 to receive a retaining clamp 2116.

Referring again to FIGS. 9-15, in the third embodiment compression portion 2114 includes a resilient member 2116 disposed within the nut housing cavity 2092 to urge the first and second half nuts 2014a & 2014b, respectively, against the end wall interior surface 2076, and retaining element 2118 to retain the resilient member 2116 within the nut housing cavity 2092. In the first embodiment, resilient member 2116 is a helical spring, and retaining element 2118 is "snap ring" insertable into channel 2112 in combination with second plate 2124.

Referring again to FIGS. 9-15, in a third embodiment compression portion 2114 includes a first plate 2120 having a center aperture 2122 and movably disposed between the resilient member 2116 and the first and second half nuts 2014a & 2014b, respectively, and a second plate 2124 having a center aperture 2126 and movably disposed between the resilient member 2116 and the retaining element 2118. First plate 2120 provides more equal distribution of pressure from spring 2116 against first and second half nuts 2014a & 2014b to ensure they remain aligned with each other and against tapered portion 2080. In the embodiment, the outer perimeter edges 2128 and 2130 of first and second plates 2120 and 2124, respectively, approximately match the cross section of cavity 2092 and side wall interior surfaces 2086, so that they slide alongside wall interior surfaces 2086 without becoming cockeyed.

In the third embodiment, each of first and second half nut back walls 2048a & 2048b have an arcuate cross section, and more specifically a partial circular cross section, and nut housing end wall interior surface tapered portion 2080 forms a concave frustum centered on aperture 2078. Each of the nut housing first and second interior flats 2094 and 2096 include an opposed second lip 2132 and 2134, respectively, proximate the end wall interior surface 2076, such that the interior flats 2094 and 2096 partially overhang the nut housing end wall interior tapered portion 2080. However, other geometries and/or orientations of the aforementioned features have been contemplated.

Figure 14:
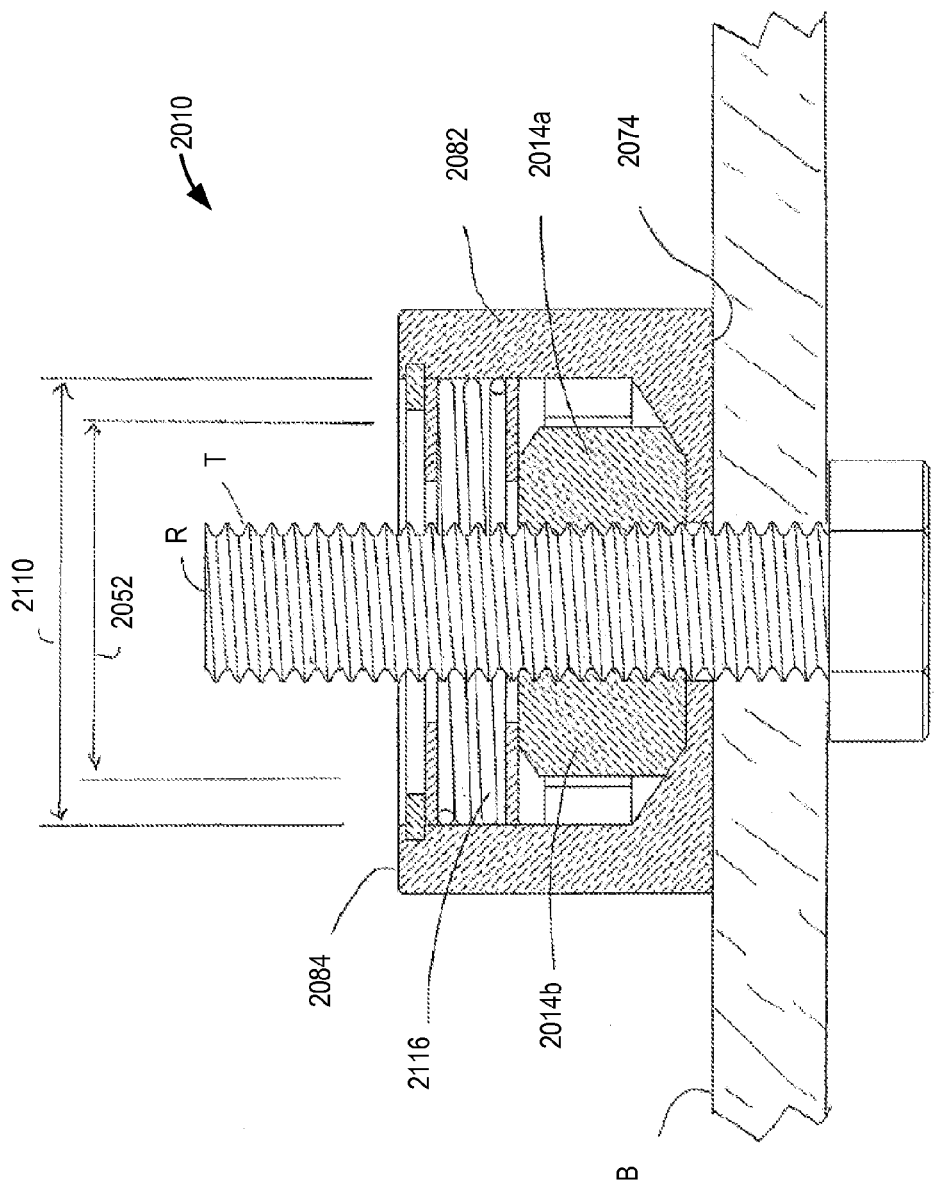
FIG. 14 shows a cutaway view of a third embodiment engaged to a threaded rod.
Figure 15:
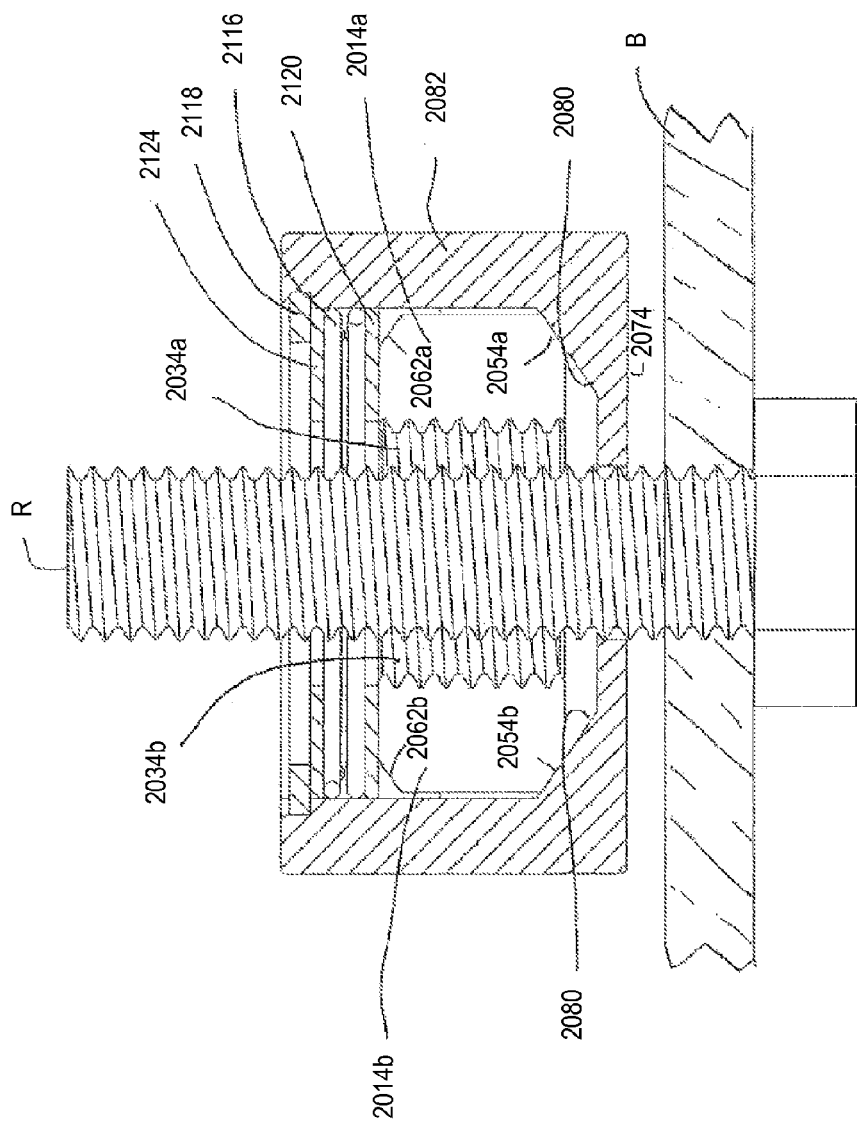
FIG. 15 shows a cutaway view of a third embodiment disengaged on a threaded rod.

Referring to FIGS. 9-15, and particularly to FIGS. 14-15, the operation of the system is demonstrated. Nut housing end wall exterior surface 2074 faces the surface to be coupled. When nut assembly 2012 is inserted over a threaded rod R or bolt, as shown in FIG. 15, half nuts 2014a & 2014b are loose within cavity 2092 and will slide apart along the slot length 2110, allowing assembly 2012 to slide down R easily. Female threads 2034 may loosely engage the male threads on rod R. Assembly 2012 is moved down rod R until it is abutting the member to be coupled, designated B, which is connected within the structure by other standard means, such as nails, screws, brackets, etc. With assembly 2012 pressed tightly against B, as shown in FIG. 14, the user may rotate nut housing 2070 slightly to ensure half nuts 2014a & 2014b slip into engagement with threaded rod R. Resilient member 2116 will press half nuts 2014a & 2014b into light engagement by pressing beveled ends 2058a & 2058b against tapered surface 2080. At this point the system 2010 is set. If an external force pushes member B in a first axial direction (e.g., upwards) or pulls rod R in a second opposing axial direction (e.g., downwards, (such as during high winds or a seismic event, then half nuts 2014a & 2014b will be driven inwards against threaded rod R to prevent movement, thereby preventing member B from lifting, as shown in FIG. 14. If member B shrinks over time, nut housing 2070 will slide downward, loosening the engagement of half nuts 2014a & 2014b, and resilient member 2116 will urge them down rod R. The process of shrinkage and nut movement is slow, but over time will ensure the fastener system remains effective for its purpose to prevent upward displacement of member B.

Figure 16:
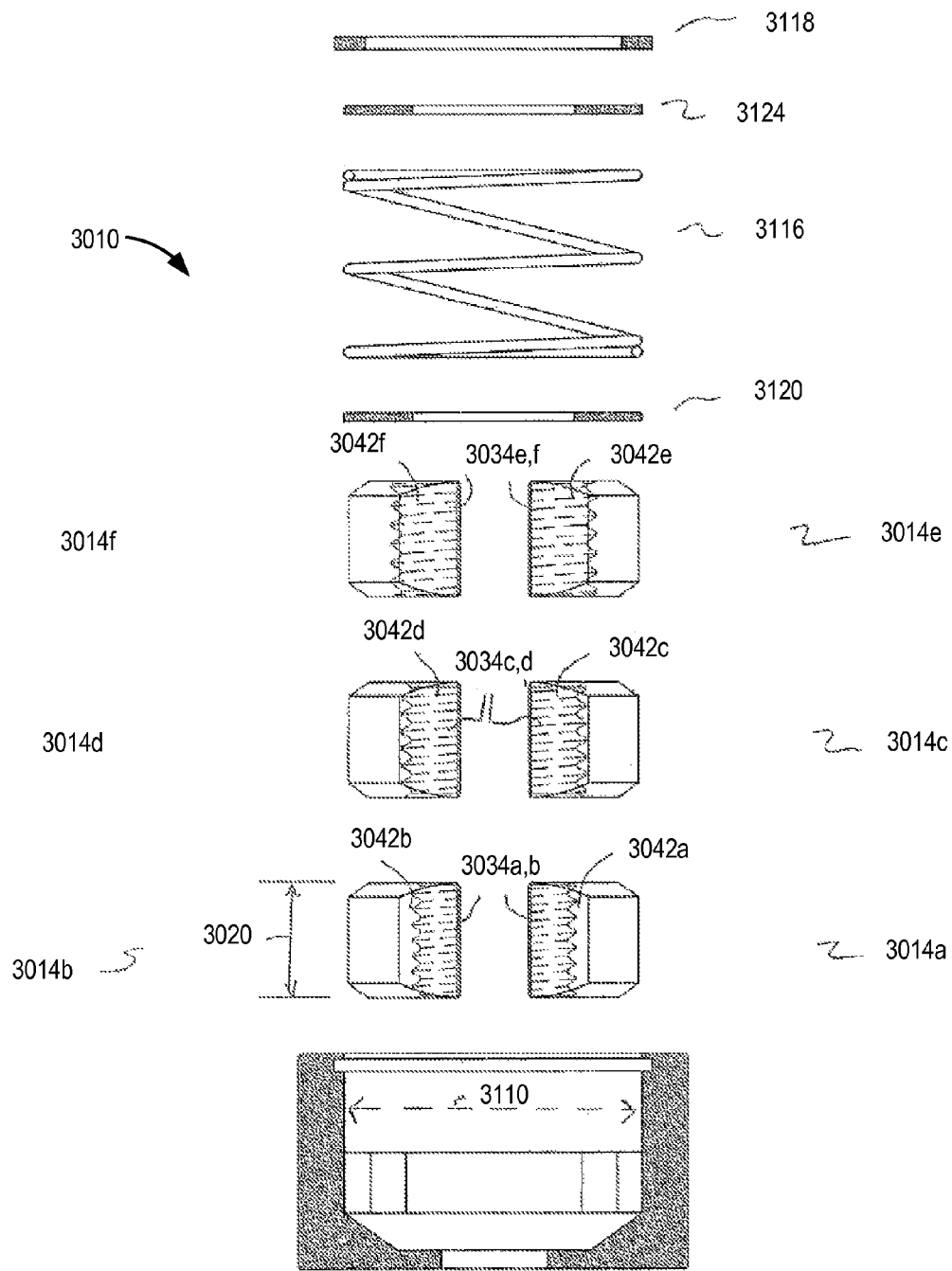
FIG. 16 shows an exploded partial cutaway side view of a fourth embodiment.
Figure 17:
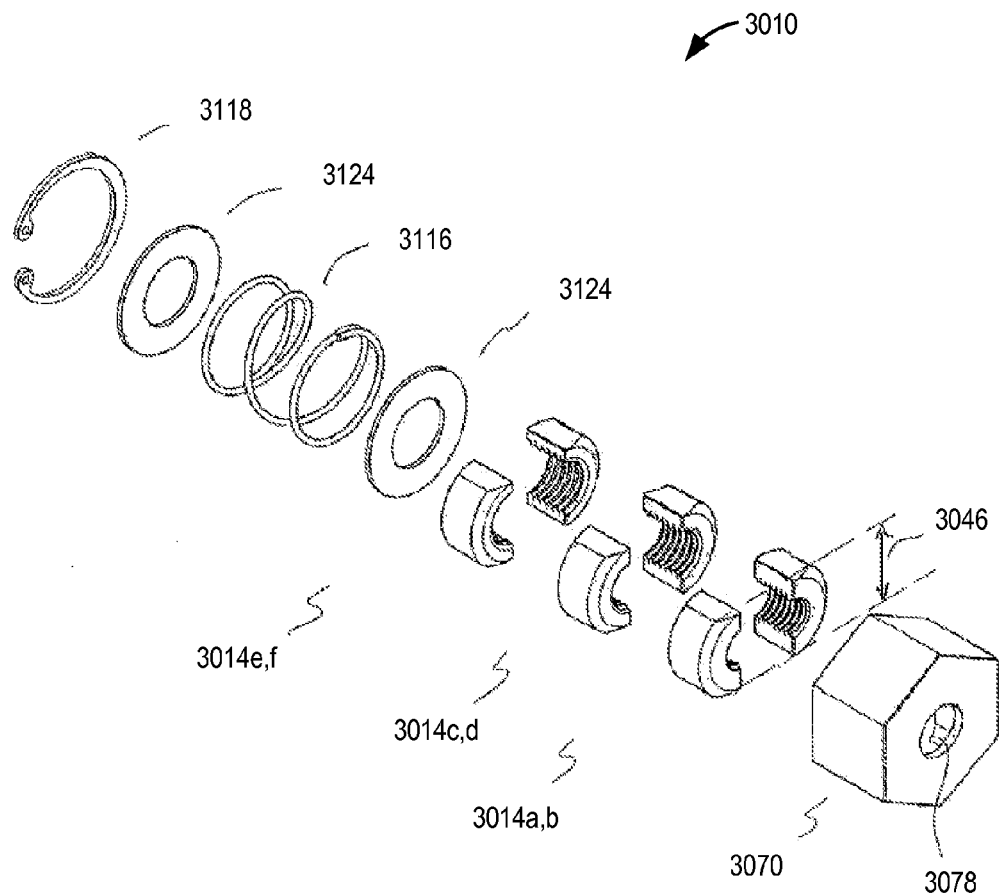
FIG. 17 shows an exploded perspective view of a fourth embodiment.

Referring to FIGS. 16-17, a fourth embodiment 3010 is shown, including a plurality of half nut sets 3014a&b, 3014c&d, and 3014e&f, each similar to the third embodiment described above. In the embodiment, each half nut set 3014ab, 3014cd & 3014ef includes a different female thread size corresponding to a selected male thread size, but all have approximately the same nut width 3046, nut breadth 3052 (half nuts shown separated, rather than engaged to a male thread), and nut depth 3020, such that nut housing 3070 is usable with any of the sets. This interchangeability of the system design provides substantial advantages in that the nut housing 3070 is significantly more expensive and heavier than the respective half nuts 3014, so relatively fewer nut housings 3070 (as well as first and second plates 3120 and 3124, resilient members 3116, and retaining element 3118) may be stocked and transported in proportion to half nut sets to support a given range of threaded rod or bolt sizes. In the fourth embodiment, each of the opposed first and second half nuts 3014*a* & 3014*b*, 3014*c* & 3014*d*, and 3014*e* & 3014*f*, for a selected male thread size R defines a set 3014. The system 3010 includes a single nut housing 3070 and a plurality of sets 3014, each set for a different selected male thread size R. All of the sets 3014 have the same nut width 3046 to engage the nut housing slot width 3106 and a nut breadth 3052 compatible with the nut housing slot length 3110. In this regard, "compatible with" refers to the slot length 3110 being greater than the nut breadth 3052 by at least the magnitude of the thread depth. The half nut sets 3014 could have identical nut breadths 3052, or variable nut breadths 3052, so long as the nut housing 3070 provides sufficient space for the set 3014*ab*, 3014*cd* or 3014*ef* with the greatest breadth 3052 to slide apart and fully disengage the male threads. In the fourth embodiment, the nut breadths 3052 are identical and the slot length 3110 is sufficient to accommodate the largest thread size of the plurality of sets 3014*ab*, 3014*cd* or 3014*ef*. However, other relative sizes of the aforementioned features have been contemplated.

Figure 18:
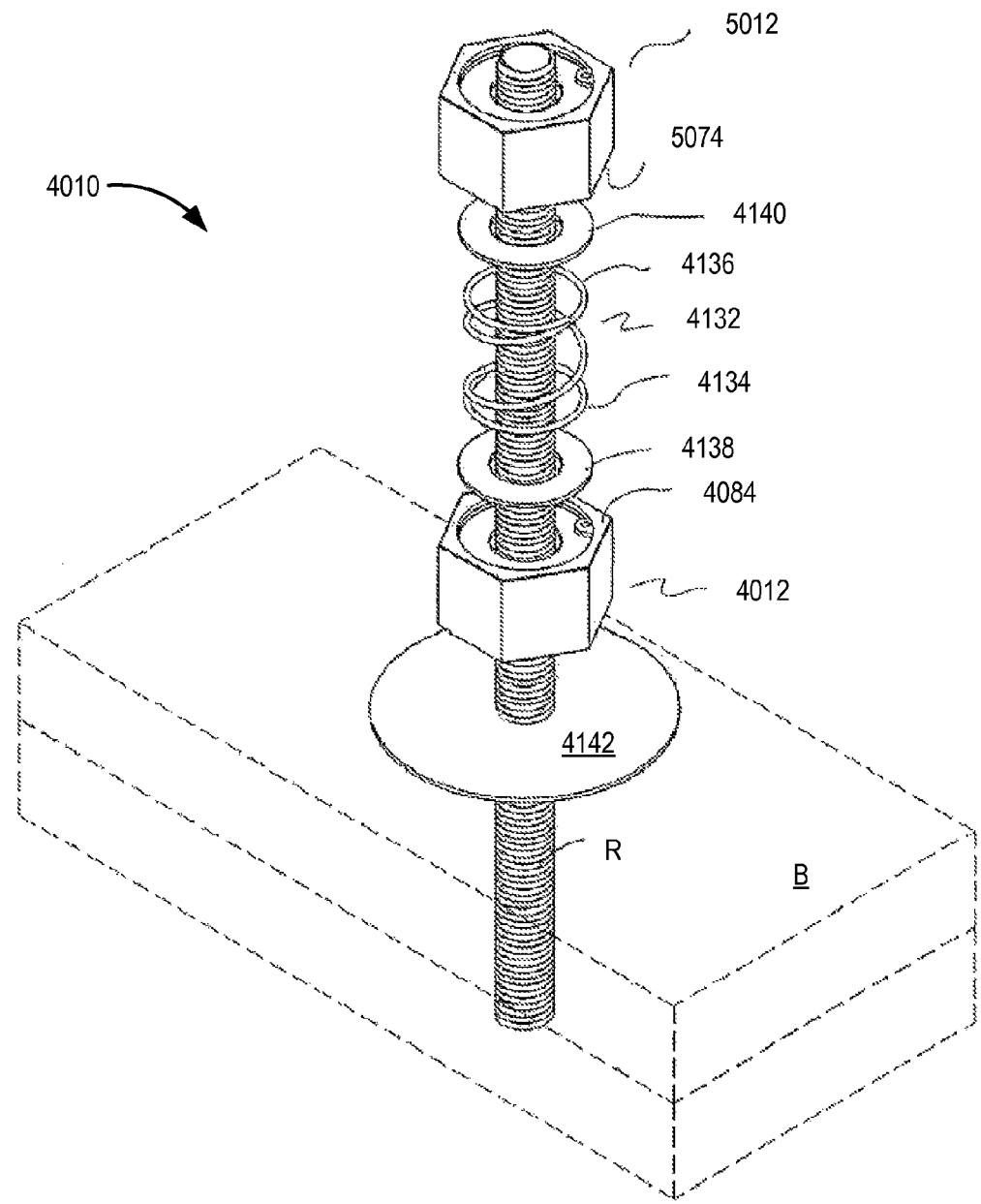
FIG. 18 shows a partially exploded perspective view of a fifth embodiment.
Figure 19:
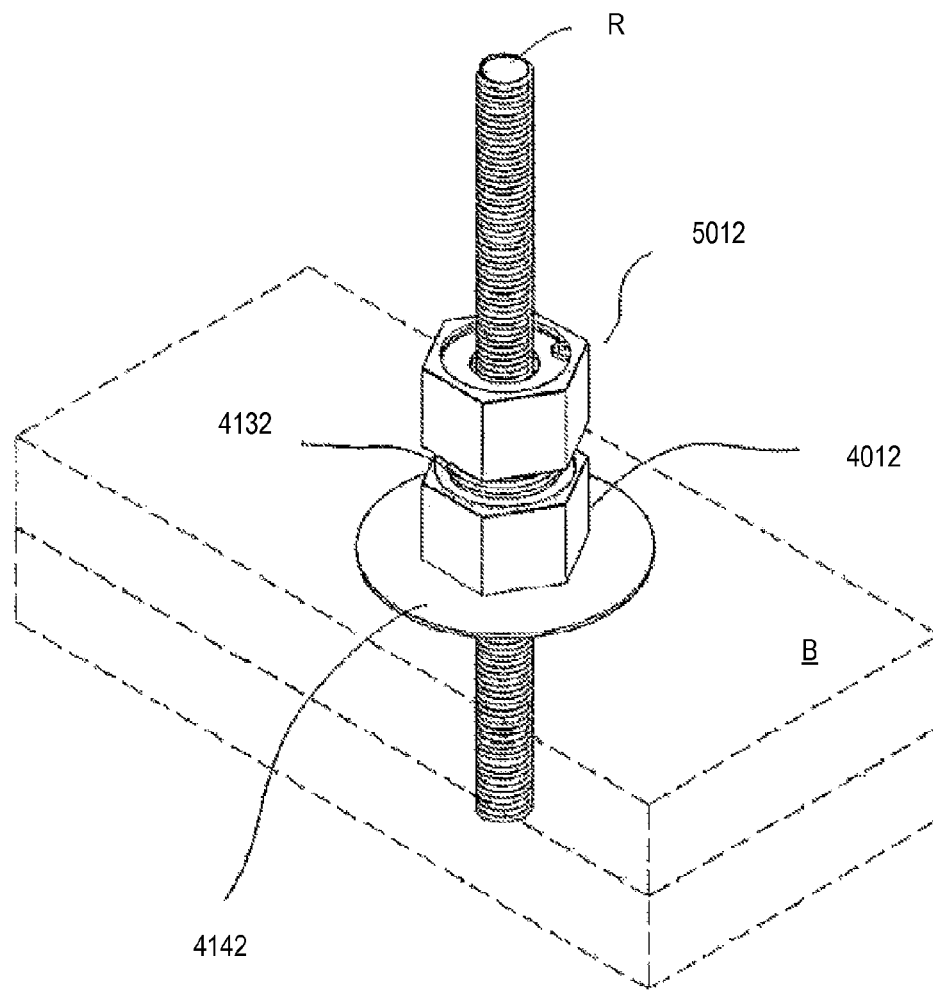
FIG. 19 shows a partially compressed perspective view of a fifth embodiment.

Referring to FIGS. 18-19, a fifth embodiment is shown, which is in essence two nut assemblies 4012 and 5012, similar to the assemblies described in the third embodiment, stacked with an interlineal compression member 4132 between them. A second nut assembly 5012 is provided to couple to the male threaded rod R having the second nut assembly nut housing end wall exterior surface 5074 oriented against the first nut assembly nut housing edge face 4084, and an interlinear compression member 4132 disposed between the first and second nut assemblies 4012 and 5012. Interlineal compression member 4132 has a first end 4134 engaged against the first nut assembly second plate 4124, and a second end 4136 engaged against the second nut assembly end wall exterior face 5074. In the embodiment, the interlineal compression element 4132 is a helical spring. However, other types of compression elements have been contemplated. In the embodiment, first and second interlineal plates 4138 and 4140 are provided to distribute pressure and provide bearing surfaces. A washer 4142 is disposed between first nut assembly 4012 and base plate B. In this way, the second nut assembly 5012 back-stops the first 4012, and the interlineal compression member 4132 provides constant additional pressure to drive the half nuts (not visible) against first nut assembly end wall interior surface tapered portion, such that as the coupled surface B pulls away, for example, the base plate of a house frame wall section shrinking the first nut assembly 4012 half nuts will actually work downwards on the threaded rod R to self-tighten against the coupled surface B. Therefore, seismic, hurricane, and/or other external forces exerted on structures which may include the fastener system will not loosen the fastener system over time and will hold down a frame or other elements to which the fastener system is attached.

Figure 20:
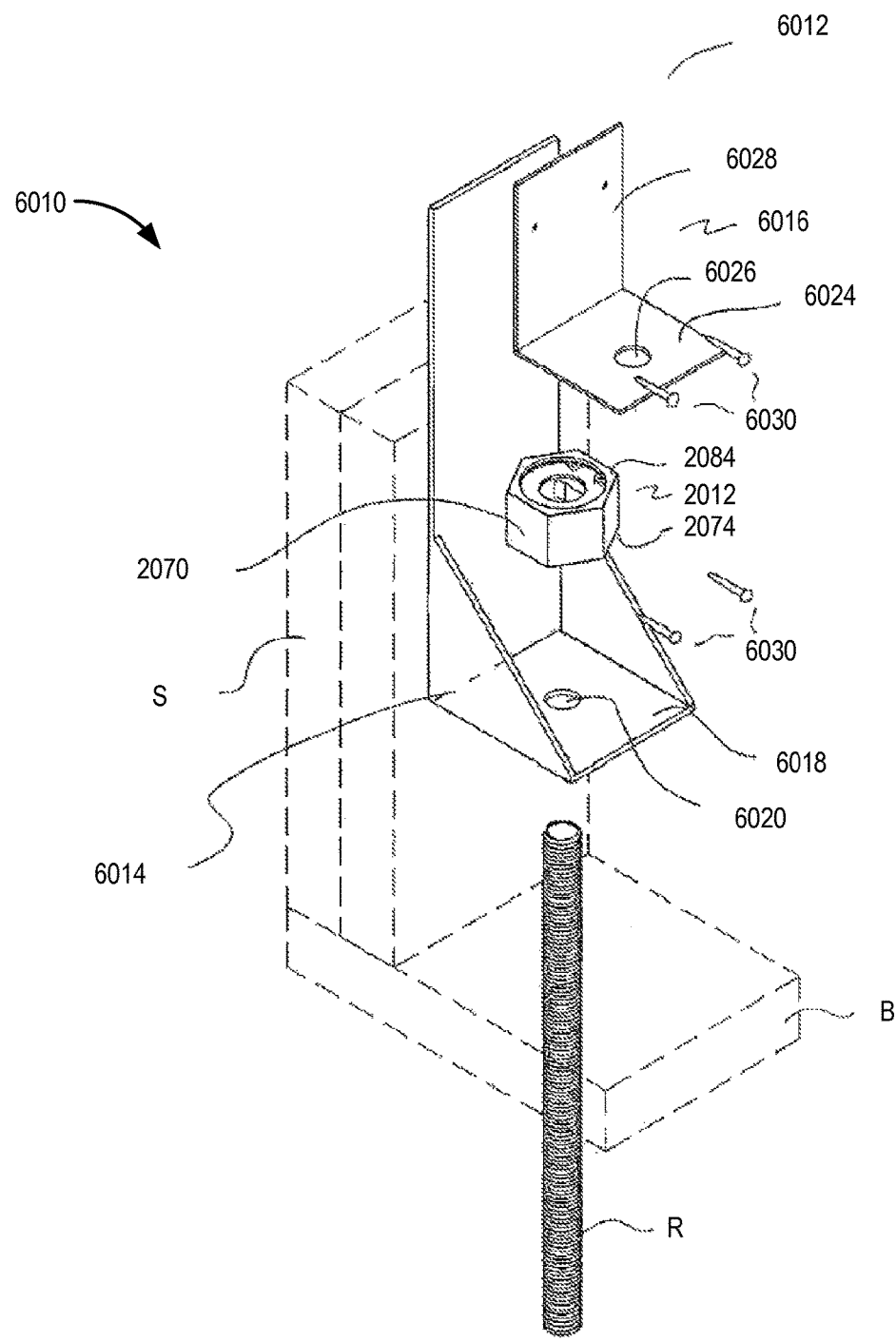
FIG. 20 shows a partially exploded perspective view of a sixth embodiment.
Figure 21:
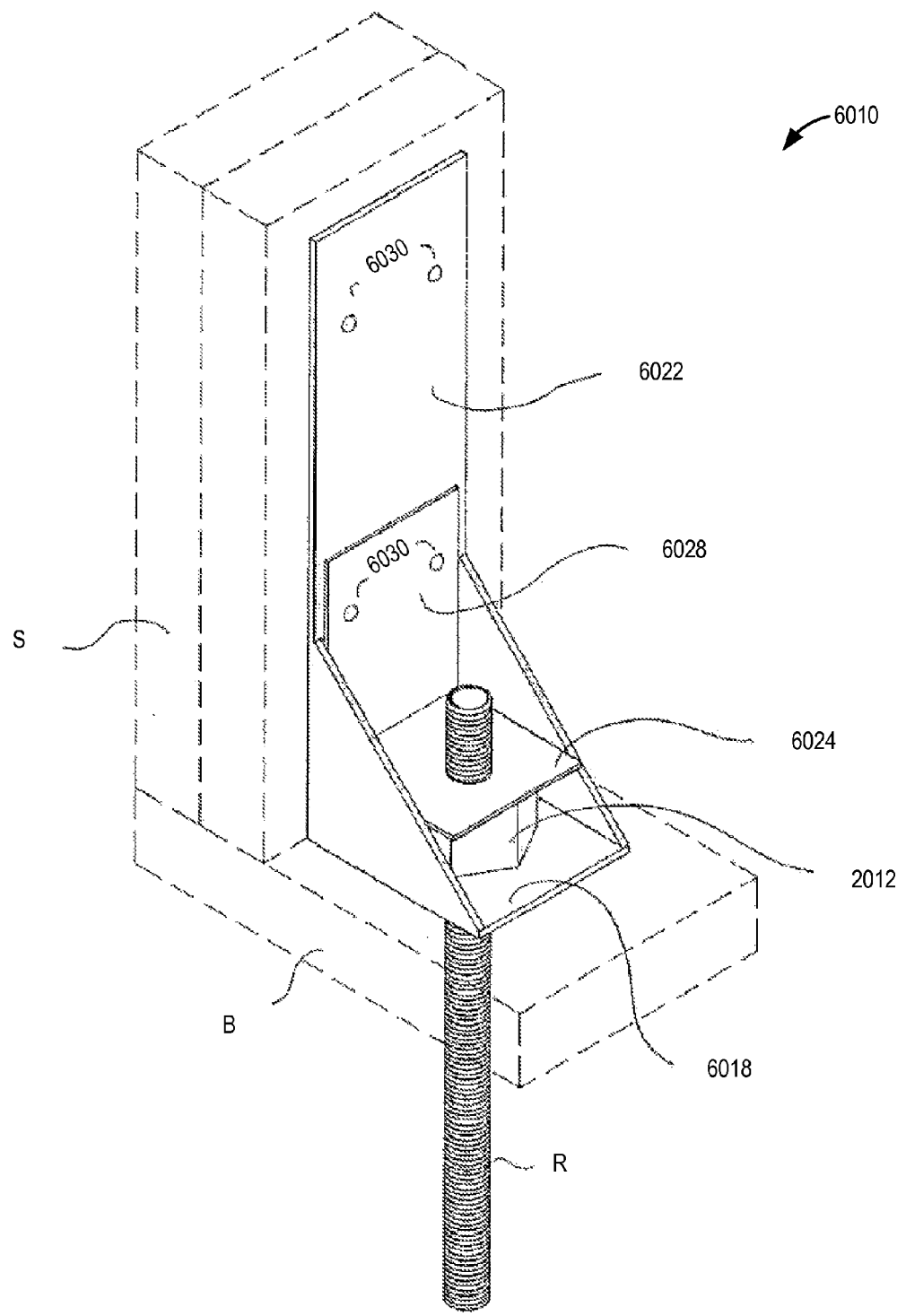
FIG. 21 shows a perspective view of a sixth embodiment, installed.
Figure 22:
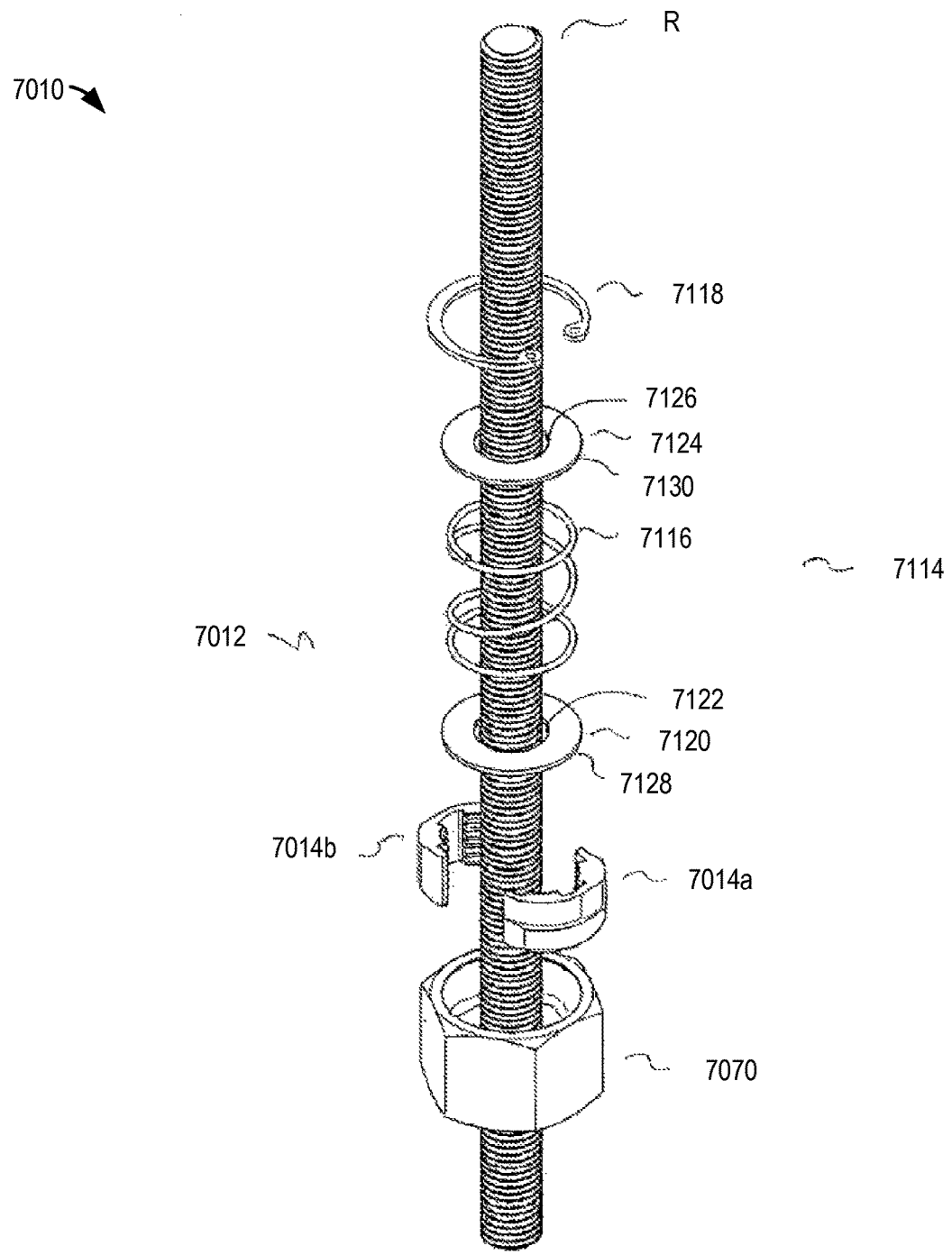
FIG. 22 shows an exploded view of a seventh embodiment.
Figure 23:
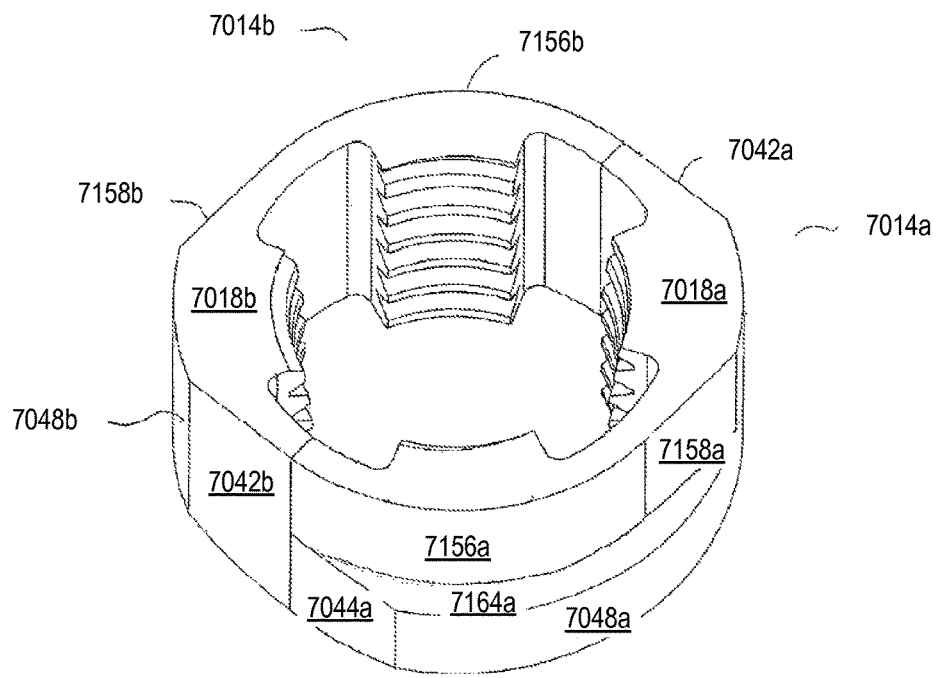
FIG. 23 shows a perspective view of a pair of half nuts of a seventh embodiment.
Figure 24:
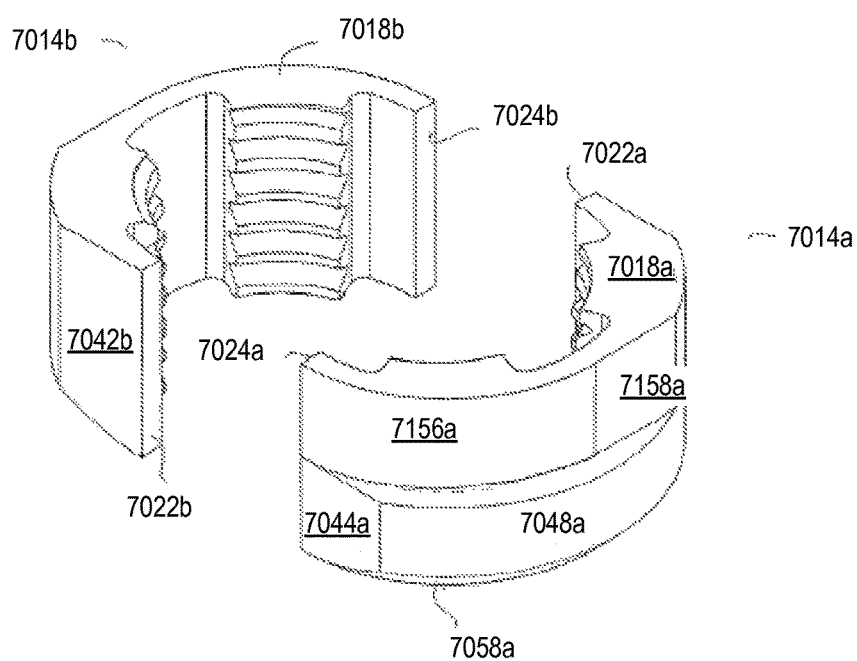
FIG. 24 shows a perspective view of a pair of half nuts of a seventh embodiment.
Figure 25:
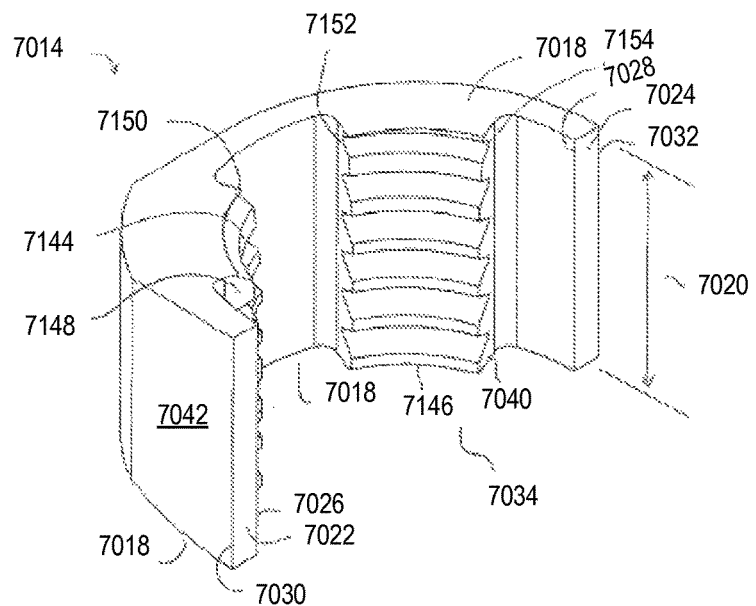
FIG. 25 shows a perspective view of a single half nut of a seventh embodiment.
Figure 26:
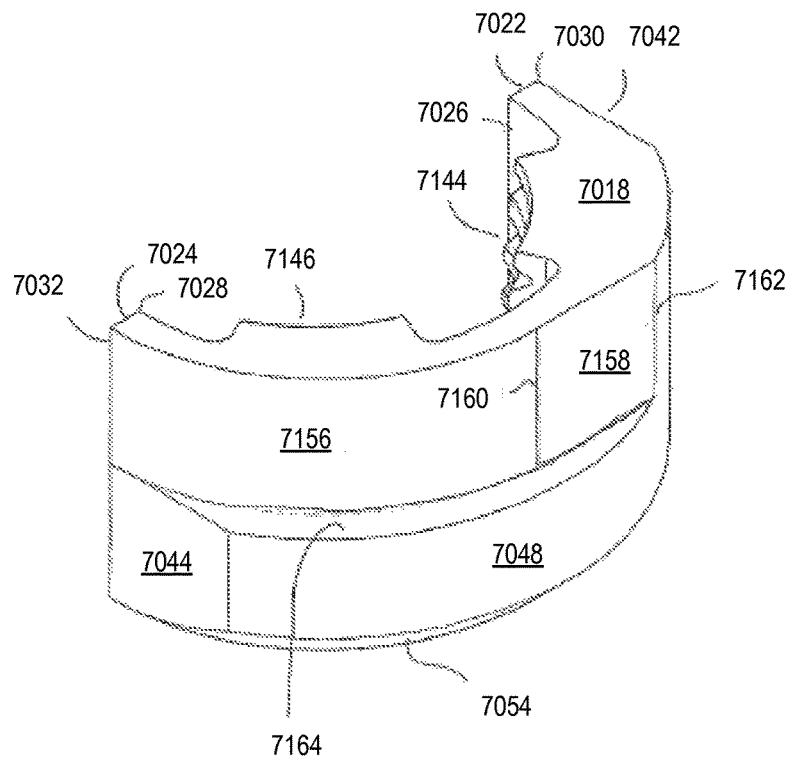
FIG. 26 shows a perspective view of a single half nut of a seventh embodiment.

Referring to FIGS. 20-21, a sixth embodiment of a fastener system 6010 and corresponding component is shown including a nut assembly 2012 as described in the third embodiment in combination with a vertical hold down bracket 6012. In the embodiment, a vertical hold down 6012 includes bottom and top brackets, 6014 and 6016, respectively. Bottom bracket 6014 includes a first flange 6018 having a first oversized aperture 6020 to receive a male threaded rod R and a second flange 6022 extending from the first flange 6018 at an angle normal to the first flange 6018. Top bracket 6016 includes a first flange 6024 having a second oversized aperture 6026 to receive male threaded rod R and a second flange 6028 extending from the first flange 6024 at an angle normal to the first flange 6024. Bottom bracket first flange 6018 inserts over a threaded rod R through the first oversized aperture 6020 against a horizontal member B, and the bottom bracket second flange 6022 goes against a vertical member S to be coupled to the horizontal member B. Nut assembly 2012 inserts over the threaded rod R and against the bottom bracket first flange 6018 with the end wall exterior surface 2074 against the first flange. Top bracket 6016 inserts over the threaded rod R to press the top bracket first flange 6024 tightly against the nut assembly nut housing edge face 2084 and the top bracket second flange 6028 against the bottom bracket second flange 6022 and vertical member S. A plurality of fasteners 6030 are coupled to the vertical member S through the top and bottom bracket second flanges 6022 and 6028, respectively. In this regard, "oversized" means an opening greater than the cross section of the anticipated range of threaded rods or bolts, such that the brackets may be adjusted to butt against the vertical member. With this system, nut assembly 2012 provides strong and reliable long term structural connections (e.g., hurricane and seismic connections) regardless of the amount of shrinkage (e.g., wood shrinkage) and flexing during the life of the structure. Any lifting or bending by vertical member S relative to horizontal member B will push up against nut assembly 2012, causing the half nuts (not shown) to clamp more tightly against threaded rod R, and reducing movement (e.g., preventing movement). As frame members shrink, nut housing 2070 will slide down threaded rod R slightly, thereby reducing engagement of the half nuts against threaded rod R, and the half nuts will work down the rod under pressure from the internal resilient member 2116 (not shown in this view).

Referring to FIGS. 22-40, a seventh embodiment 7010, adapted for repairing damaged threads, is shown. The seventh embodiment includes a nut assembly 7012 to engage male threaded rod R nut housing 7070 to receive first and second half nuts 7014*a* & *b*, a compression portion 7114, and a retaining element 7118.

Still referring to FIGS. 22-40 in the seventh embodiment, each first and second half nut 7014*a*, 7014*b* is asymmetrical and identical to each other. Therefore, a single half nut 7014 will be described in detail. Each half nut 7014 includes opposed first and second axial ends 7016 and 7018, the distance between the axial ends 7016 and 7018 defining the nut depth 7020. First and second end faces 7022 and 7024 extend from the respective interior edge 7026 and 7028 to an exterior edge 7030 and 7032, respectively, and from the first axial end 7016 to the second axial end 7018, and parallel to each other.

Female threaded interior surfaces 7034 include interrupted female thread sections 7144 and 7146, adapted to engage a selected male thread T, and having thread depth 7040. In the embodiment, each interior surface 7034 includes first and second interrupted thread sections 7144, and 7146, respectively. Each first interrupted thread section 7144 extends from a first thread edge 7148, to a second thread edge 7150. Each second interrupted thread section 7146 extends from a third thread edge 7152 to a fourth thread edge 7154. Interrupted thread edges 7148, 7150, 7152 and 7154 form sharp cutting edges in order to cut through and repair damaged male threads on a threaded rod R. Interrupted thread sections 7144 and 7146 are provided in order to provide additional cutting edges and for positive engagement around intermittent damaged regions of male threaded rod R. Additionally, the gaps between interrupted thread sections 7144 and 7146 provide space for shavings to displace during thread cutting. In one example, the thread sections may be referred to as cutting threads and may be non-continuous and include a plurality of sections spaced away from one another. Female threaded portion 7036 may be tapered to ensure a desired amount of pressure on a narrow band of male threads, or may be straight. Each half nut 7014 includes a first full exterior flat 7042 and an opposing second partial exterior flat 7044 disposed proximate the first and second end face exterior edges 7022 and 7024, respectively, with the distance between the first and second exterior flats defining the nut width 7046. First back wall 7048 extends between the first and second exterior flats 7042 and 7044. In the embodiment, first back wall 7048 traces a constant-radius curve between first and second exterior flats 7042 and 7044. Second back wall 7156 is displaced inwardly from first sidewall 7048, tracing a constant radius curve from proximate second face 7024 exterior edge 7032 to a first edge 7160 of a partial third flat 7158, creating shoulder 7164 to engage second lips 7078 or 7080 of nut housing 7070. In the embodiment, second back wall 7156 blends into third flat 7158 at first edge 7160 to form a continuous smooth surface without a sharp edge, to facilitate rotation within nut housing 7070, as discussed below. Third flat 7158 is a partial flat, extending axially from second axial end 7018 to shoulder 7164, and circumferentially from first edge 7160 to a second edge 7162. The distance between third flats 7158*a* and 7158*b* of first and second half nuts 7014*a* and 7014*b* when engaged around threaded rod R is equal to the nut width 7046. First back wall 7048 extends full breadth from proximate first axial end 7016 to proximate second axial end 7018. However, other geometries and/or sizing of the aforementioned nut components have been contemplated.

Figure 27:
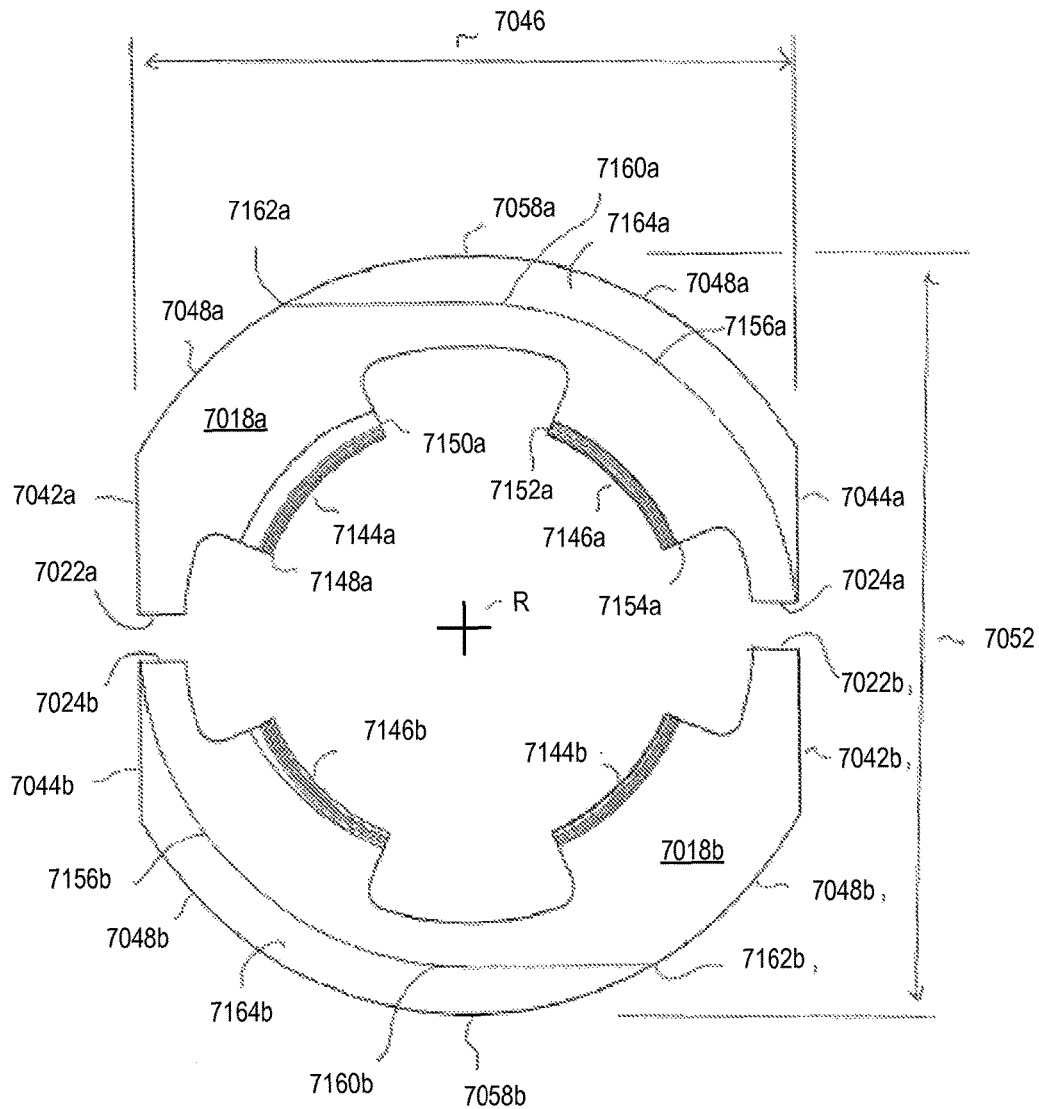
FIG. 27 shows plan view of a pair of half nuts of a seventh embodiment, from the second axial end.
Figure 28:
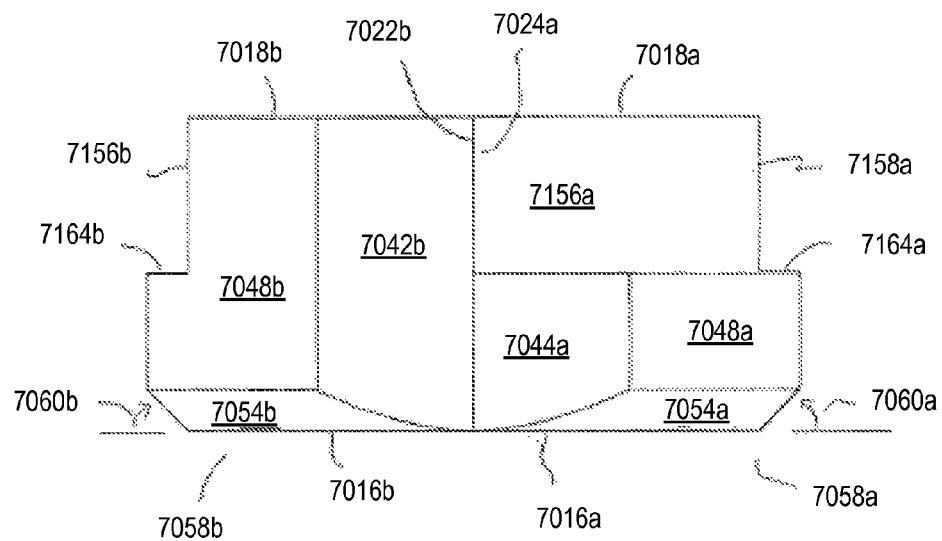
FIG. 28 shows a side view of a pair of half nuts of a seventh embodiment.
Figure 29:
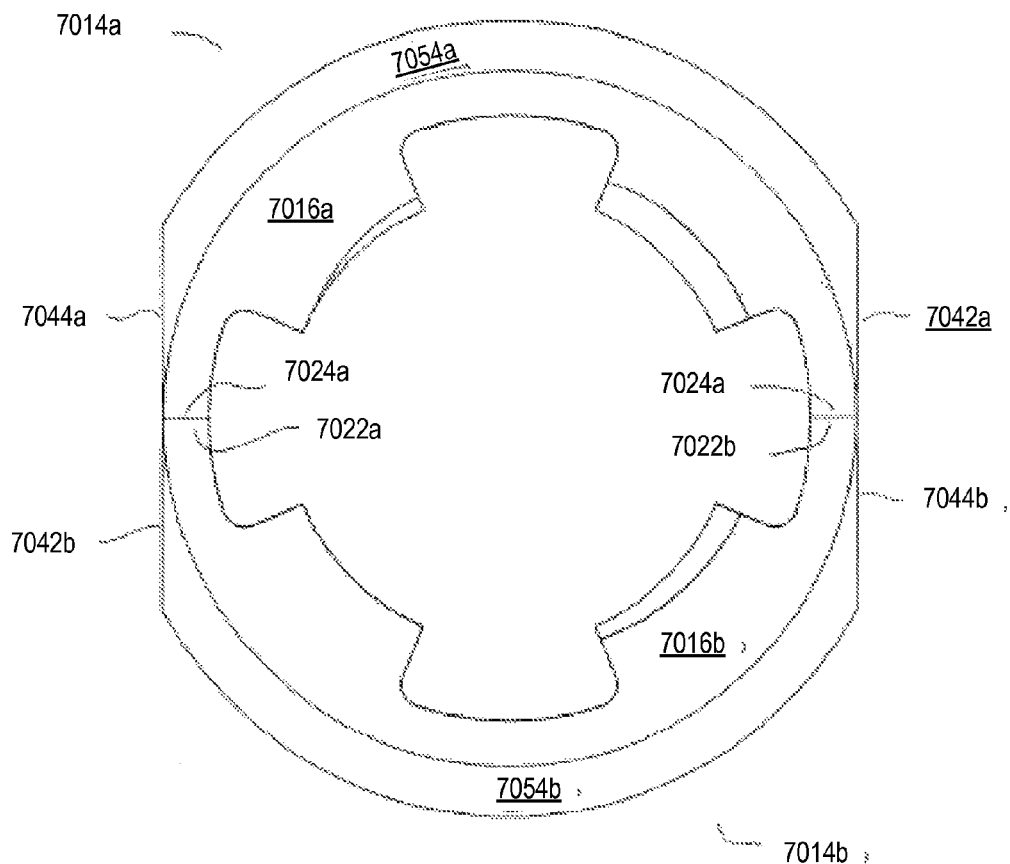
FIG. 29 shows plan view of a pair of half nuts of a seventh embodiment, from the first axial end.
Figure 30:
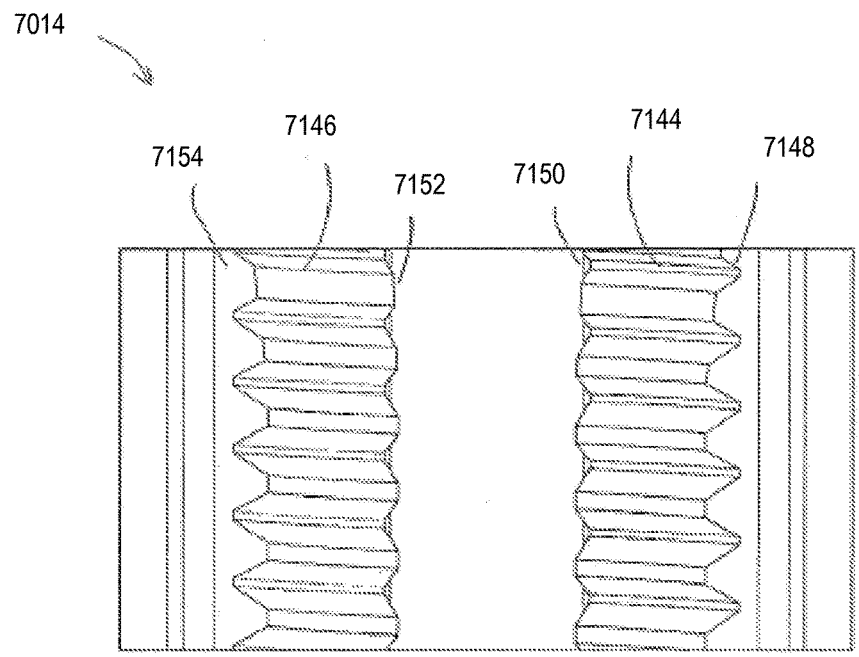
FIG. 30 shows a side view of a half nut of a seventh embodiment, facing the interior.
Figure 31:
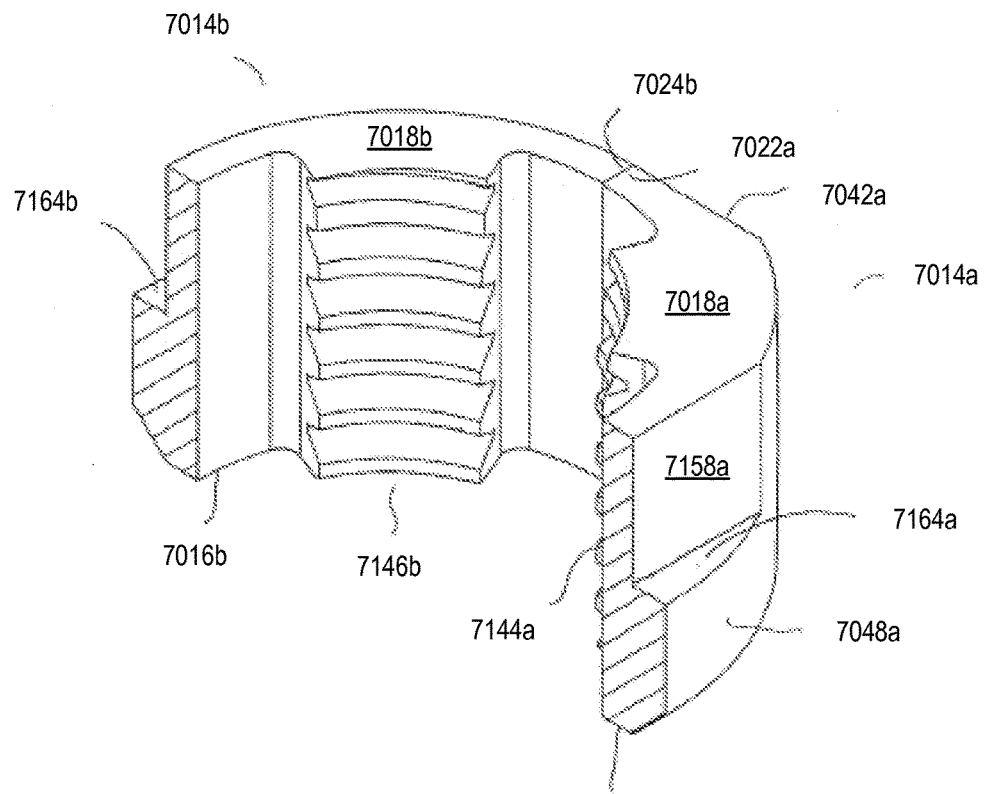
FIG. 31 shows a cross section cutaway view of a pair of half nuts of a seventh embodiment.
Figure 32:
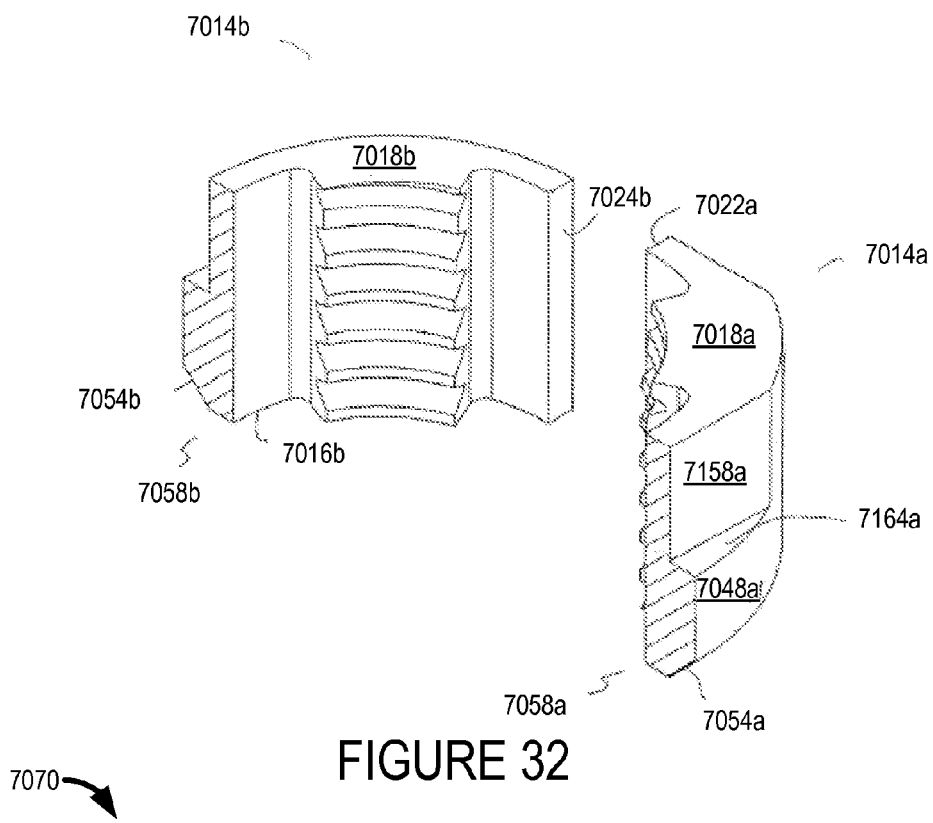
FIG. 32 shows a cross section cutaway view of a pair of half nuts of a seventh embodiment.
Figure 33:
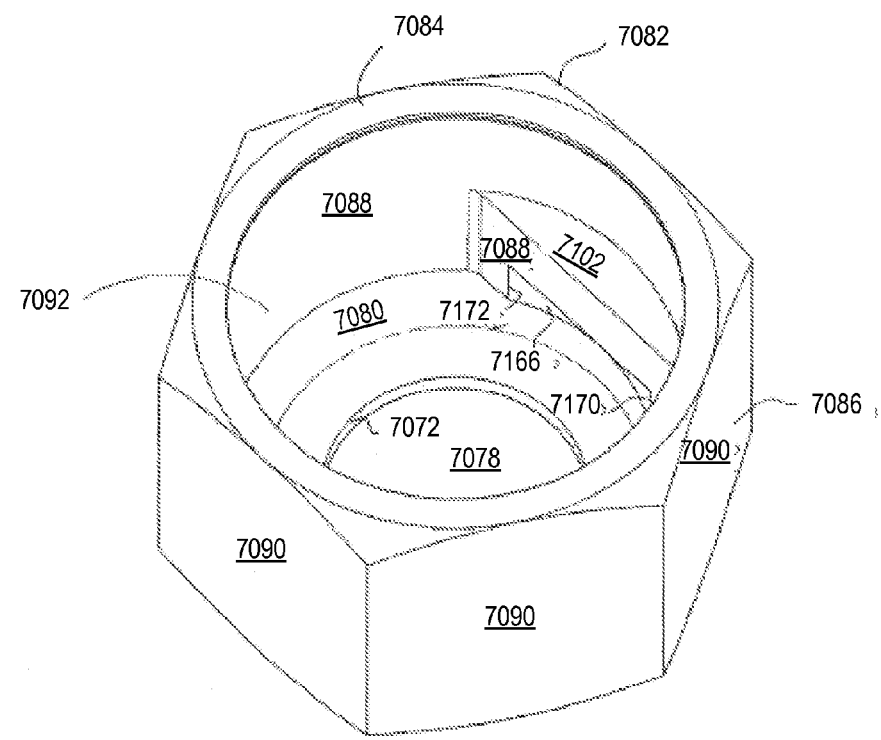
FIG. 33 shows a perspective view of the interior of a nut housing of a seventh embodiment.
Figure 35:
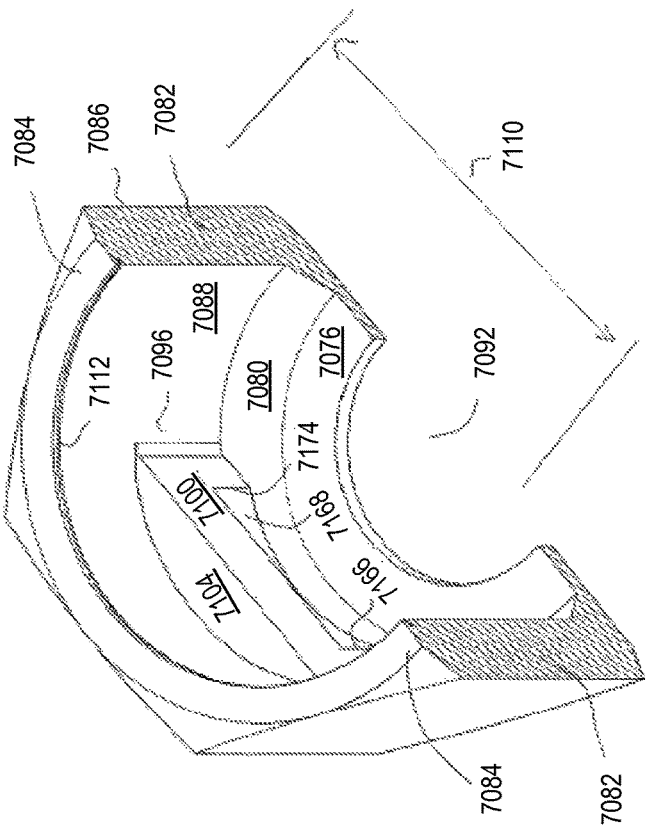
FIG. 35 shows a cutaway view of a nut housing of a seventh embodiment.
Figure 34:
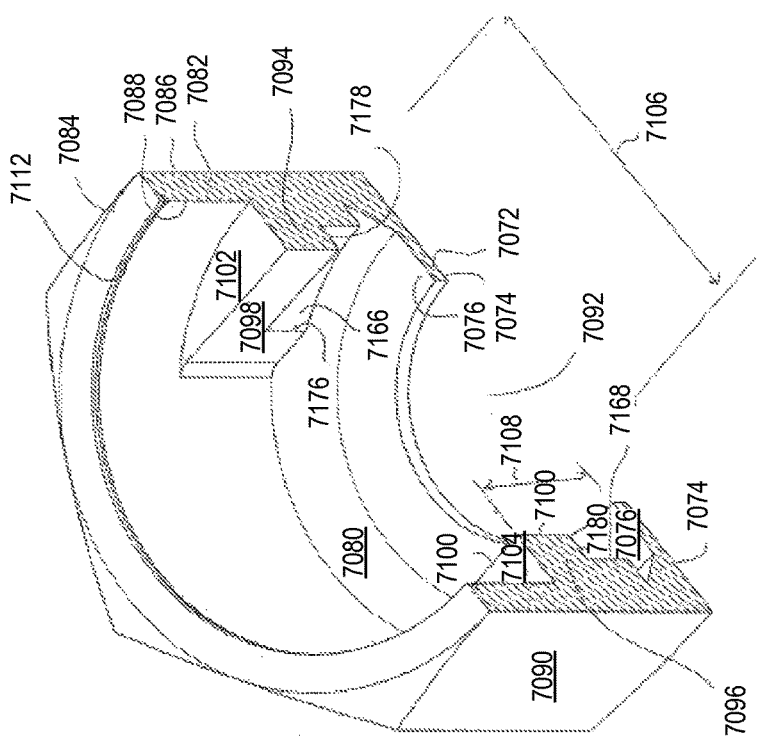
FIG. 34 shows a cutaway view of a nut housing of a seventh embodiment.

Referring to FIG. 27, the distance (e.g., maximum) between opposed points 7050*a* and 7050*b* on the respective first and second half nut first back walls 7048*a* and 7048*b* when the first and second half nuts 7014*a*, 7014*b* are fully engaged against a threaded rod R defines the nut breadth 7052. First bevel surface 7054*a*, 7054*b* extends along the intersection of the back wall 7048*a*, 7048*b* and the first axial end 7016*a*, 7016*b*, defining a half nut first beveled end 7058*a*, 7058*b* and having a first bevel angle 7060*a*, 7060*b*. When the first and second half nuts 7014*a*, 7014*b* enclose a threaded rod R having the selected male thread T the respective first and second end faces 7022*a*, 7022*b* and 7024*a*, 7024*b* of the first and second half nuts 7014*a*, 7014*b* do not contact each other. This ensures that they will not interfere with the compression exerted on the half nuts.

Still referring to FIGS. 22-40, in the seventh embodiment 7010 nut housing 7070 includes an end wall 7072 having opposed exterior and interior surfaces 7074 and 7076 and a center aperture 7078, the end wall interior surface including a concave tapered portion 7080 centered on the center aperture 7078 and matching the first bevel angle 7060 to receive a half nut beveled end 7058. End wall exterior surface 7074 has a flat face. Enclosing sidewalls 7082 extending from the end wall 7072 to an edge face 7084 and have exterior and interior surfaces 7086 and 7088, respectively, the edge face 7084 parallel to the end wall exterior face 7074. Side wall exterior surfaces 7086 are adapted to receive a torque device. In the embodiment, nut housing 7010 is configured similar to the previously described nut housings, with side wall exterior surfaces 7086 include six hexagonal flats 7090 to receive a conventional flat wrench, but other configurations could be used, for example a square nut, star nut or other configurations. The interior surfaces of the end wall 7076 and sidewalls 7088 define a cavity 7092 to receive first and second half nuts 7014*a*, 7014*b*, respectively. Opposed first and second interior flats 7094 and 7096, respectively, project into the cavity 7092 proximate the end wall tapered portion 7080, each of the first and second interior flats 7094 and 7096 including a flat engagement surface 7098, 7100, respectively, and a first shoulder surface 7102, 7104, respectively, distal from the nut housing end wall interior surface 7076. The distance between the flat engagement surfaces defines a slot width 7106 not less than the nut width 7046*a*, 7046*b* so as to slidingly engage the half nut first and second exterior flats 7042*a/b* and 7044*a/b*, respectively, or the third exterior flats 7158*a* and 7158*b*, and the distance 7108 from the end wall interior surface 7076 to the first shoulder surface 7102 or 7104 is less than the nut depth 7020.

Opposed first and second semi-circular engagement surfaces 7166 and 7168 are recessed under first and second interior flats 7094 and 7096, respectively, creating a second lip 7078 and 7080 opposing first shoulder surface 7102, 7104, respectively. First semi-circular engagement surface 7166 extends from a first edge 7170 to a second edge 7172, and second semi-circular engagement surface 7168 extends from a first edge 7174 to a second edge 7176. In the embodiment, each semi-circular engagement surface 7166, 7168 is concave and open to cavity 7092, having a constant radius of curvature less than that of sidewall interior surface 7088, and equal to that of first sidewall 7048. First and second flat engagement surfaces 7098 and 7100 extend around the edges 7170, 7172 and 7174, 7176 of semi-circular engagement surfaces 7166 and 7168, respectively, to form flat extensions (e.g., bars, handles, etc.) 7182, 7184 and 7186, 7188, respectively. The height of first and second semi-circular engagement surfaces 7166 and 7168 is approximately equal to the height of half nut projecting shoulder 7164 to receive the projection portion therein.

The distance between sidewall interior surfaces 7088 across the cavity 7092 in the axis parallel to the interior flats 7094, 7096 defines a slot length 7110 greater than the nut breadth 7052. This allows the half nuts to disengage from threaded rod R during downward movement. In the embodiment, slot length 7110 is greater than nut breadth 7052 by at least twice the thread depth 7040 in order to allow half nuts 7014*a*, 7014*b* to fully disengage threaded rod R. In the embodiment, side wall interior surface 7086 includes a channel 7112 circumscribing the surface proximate edge face 7084, the channel 7112 to receive a retaining element 7118 (e.g., snap ring).

In the embodiment, bevel edge 7060*a* & 7060*b* and tapered portion 7080 have a slope in the range 10-15 degrees, and optionally approximately 10 degrees.

In practice, nut width 7046*a* & 7046*b* may be slightly less than the slot width 7106 to permit insertion into the nut housing.

Referring again to FIG. 22, in the seventh embodiment compression portion 7114 includes a resilient member 7116 disposed within the nut housing cavity 7092 to urge the first and second half nuts 7014*a*, 7014*b*, respectively, against the end wall interior surface 7076. Retaining element 7118 retains the resilient member 7116 within the nut housing cavity 7092. In the seventh embodiment, resilient member 7116 is a helical spring, and retaining element 7118 is snap ring insertable into channel 7112 in combination with second plate 7124.

Referring again to FIG. 22, in the first embodiment compression portion 7114 includes a first plate 7120 having a center aperture 7122' and movably disposed between the resilient member 7116 and the first and second half nuts 7014a & 7014b, respectively, and a second plate 7124 having a center aperture 71-26 and movably disposed between the resilient member 7116 and the retaining element 7118. First plate 7120 provides more equal distribution of pressure from resilient member 7116 against first and second half nuts 7014a, 7014b to ensure they remain aligned with each other and against tapered portion 7080. in the embodiment, the outer perimeter edges 7128 and 7130 of first and second plates 7120 and 7124, respectively, approximately match the cross section of cavity 7092 and side wall interior surfaces 7088, so that they slide alongside wall interior surfaces 7088 without becoming cockeyed.

In the seventh embodiment, each of first and second half nut first back walls 7048a & 7048b have an arcuate cross section, and more specifically a partial circular cross section, and nut housing end wall interior surface tapered portion 7080 forms a concave frustum centered on aperture 7078.

The arcuate cross section and frustum arrangement provide for more even compression around the perimeter of first and second half nut first beveled ends 7058a & 7058b, respectively, from tapered portion 7080, which is especially useful for high torque scenarios, such as thread repair cutting. Additionally, a non-circular cross section for beveled ends 7058a & 7058b, and tapered portion 7080, creates a complex surface which is difficult to machine with precision.

Alternatively, first and second half nut back walls may be substantially rectangular in cross section, such that the first beveled surfaces would comprise essentially triangular wedges, with end wall interior surface tapered portion formed into corresponding opposed flat tapered surfaces.

In the embodiment, resilient member 7116 is a helical spring, but other resilient systems such as flat springs, pneumatics, or opposing magnets could be used depending on size, cost and chemical environment, for instance. The fastener system can be easily scaled up or down for a given application.

In operation, the seventh embodiment provides an ability to cut and/or repair threads along a male threaded rod R, operating similarly to the embodiments described previously, and may be used as a common system. First and second half nuts 7014a/b are inserted into nut housing 7070, with beveled edges 7054a/b oriented against tapered interior surface 7080, and opposed first and second exterior flats 7042a/b and 7044a/b aligned against flat engagement surfaces 7098 and 7100. Compression portion 7114, including first and second plates 7120 and 7124 with resilient member 7116 (e.g., spring) disposed between are inserted and retaining element 7118 installed. First and second half nuts 7014a/b are identical, rather than mirror images, so when inserted into nut housing 7070 the first half nut 7014a first end face 7022a may abut second half nut 7014b second end face 7024b, and. first half nut 7014a second end face 7024a may abut second half nut 7014b first end face 7022b. Similarly, first half nut 7014a first flat 7042a may be proximate second half nut 7014b second flat 7044b, and first half nut 7014a second flat 7044a may be proximate second half nut 7014b first flat 7042b. Opposed first and second half nuts 7014a and 7014b slide apart within cavity 7092 along slot length 7110 as the assembly 7012 is inserted over and along the length of rod R to a location slightly beyond a damaged thread region. At this point assembly 7012 is pulled upward to drive tapered surface 7080 against beveled edges 7054a/b which forces half nuts 7014a/b together to compress interrupted thread portions 7144a/b and 7146a/b against threaded rod R to engage the male threads. When interrupted thread portions are engaged, the operator rotates assembly 7012 in the direction to loosen the nut assembly (which is conventionally counterclockwise), which causes nut housing 7070 to rotate in relation to first and second half nuts 7014a/b until first sidewalls 7048a/b with projecting shoulders 7164a/b are engaged against semi-circular engagement surfaces 7166 and 7168, respectively, and nut housing lower lips 7178 and 7180, respectively. First and second half nut third flats 7158a/b will then be engaged against nut housing interior flat engagement surfaces 7098 and 7100, respectively, and first and second half nuts 7014a/b may be locked in place in increased compression (e.g., maximum), so that high torque may be applied to cut into damaged threads in order to repair them. As assembly 7012 rotates (with half nuts 7014a/b locked in place and highly compressed against threaded rod R), interrupted thread edges 7148 and 7152 will cut through and/or reform material to clear and repair damaged threads, or form new threads. When thread repair operations are complete, assembly 7012 may be counter-rotated to disengage projecting shoulders 7164a/b, allowing half nuts 7014a/b to slide apart slightly and loosen so they can be removed without cutting the entire thread length of threaded rod R.

Figure 36:
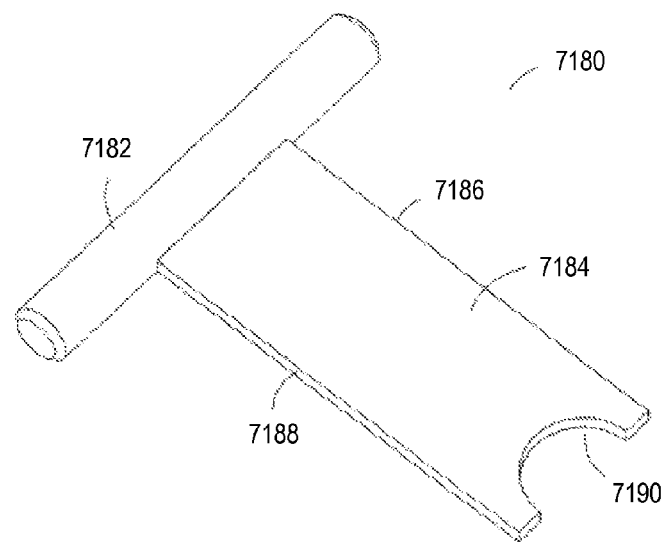
FIG. 36 shows a tool for operating a seventh embodiment.
Figure 37:
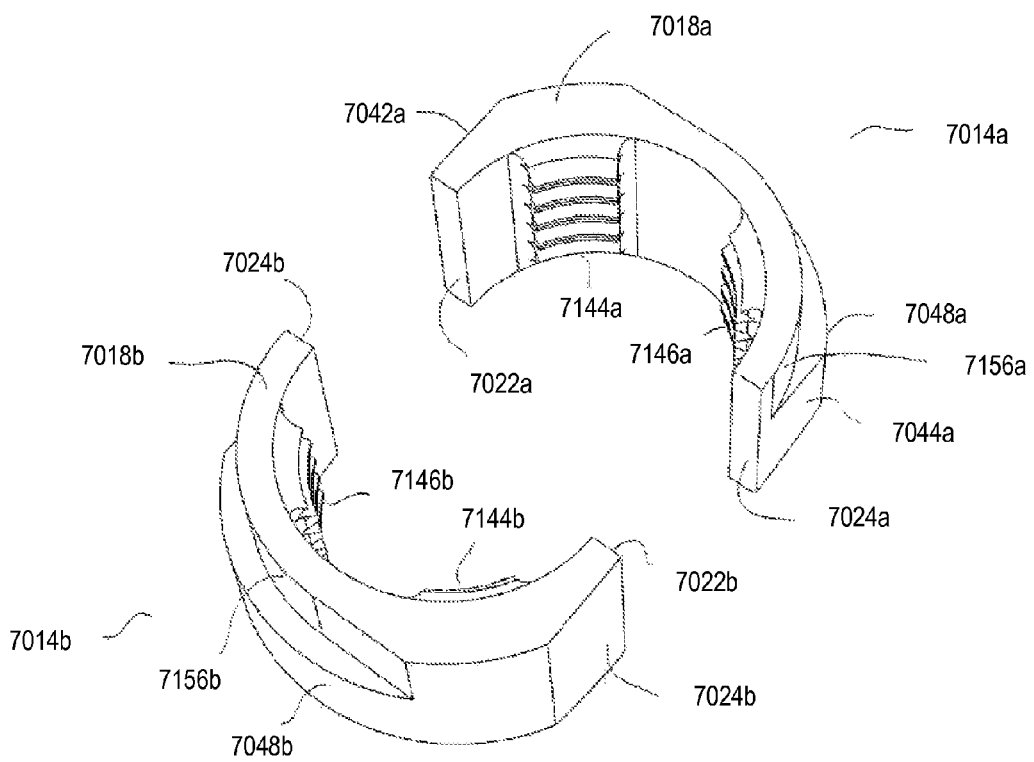
FIG. 37 shows a top perspective view of a pair of half nuts of a seventh embodiment.
Figure 38:
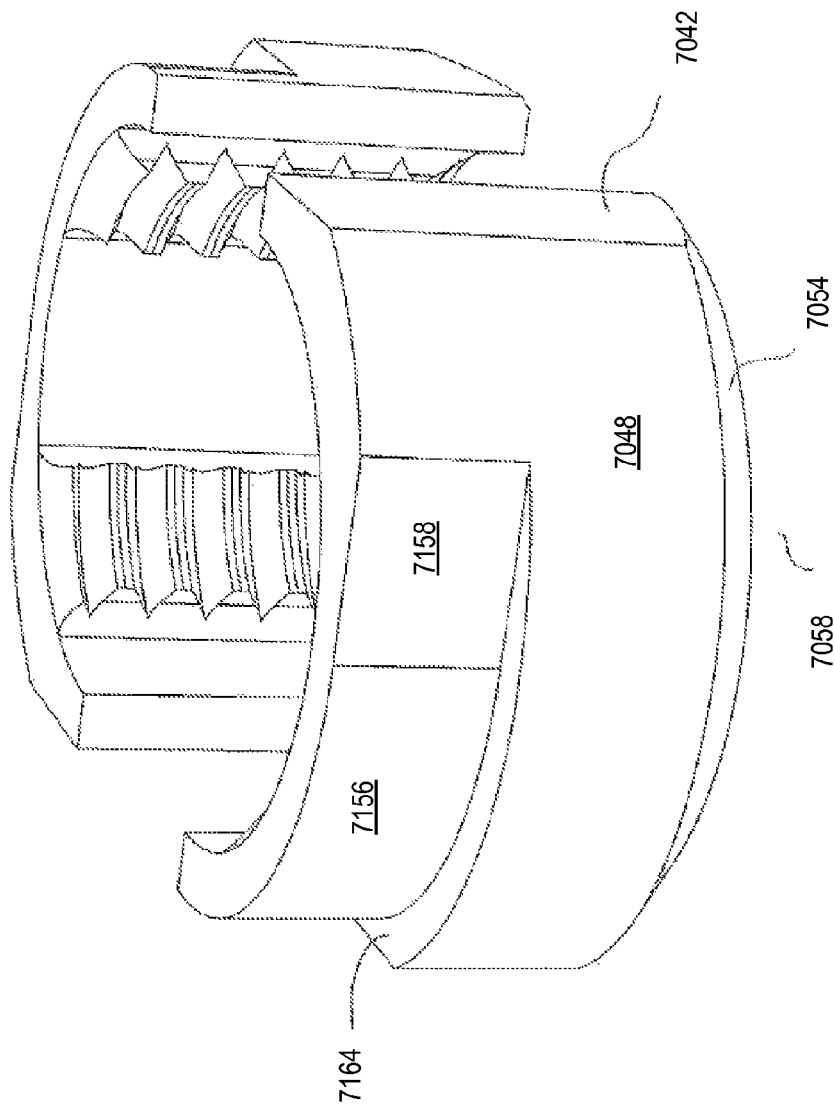
FIG. 38 shows a side perspective view of a pair of half nuts of a seventh embodiment.
Figure 39:
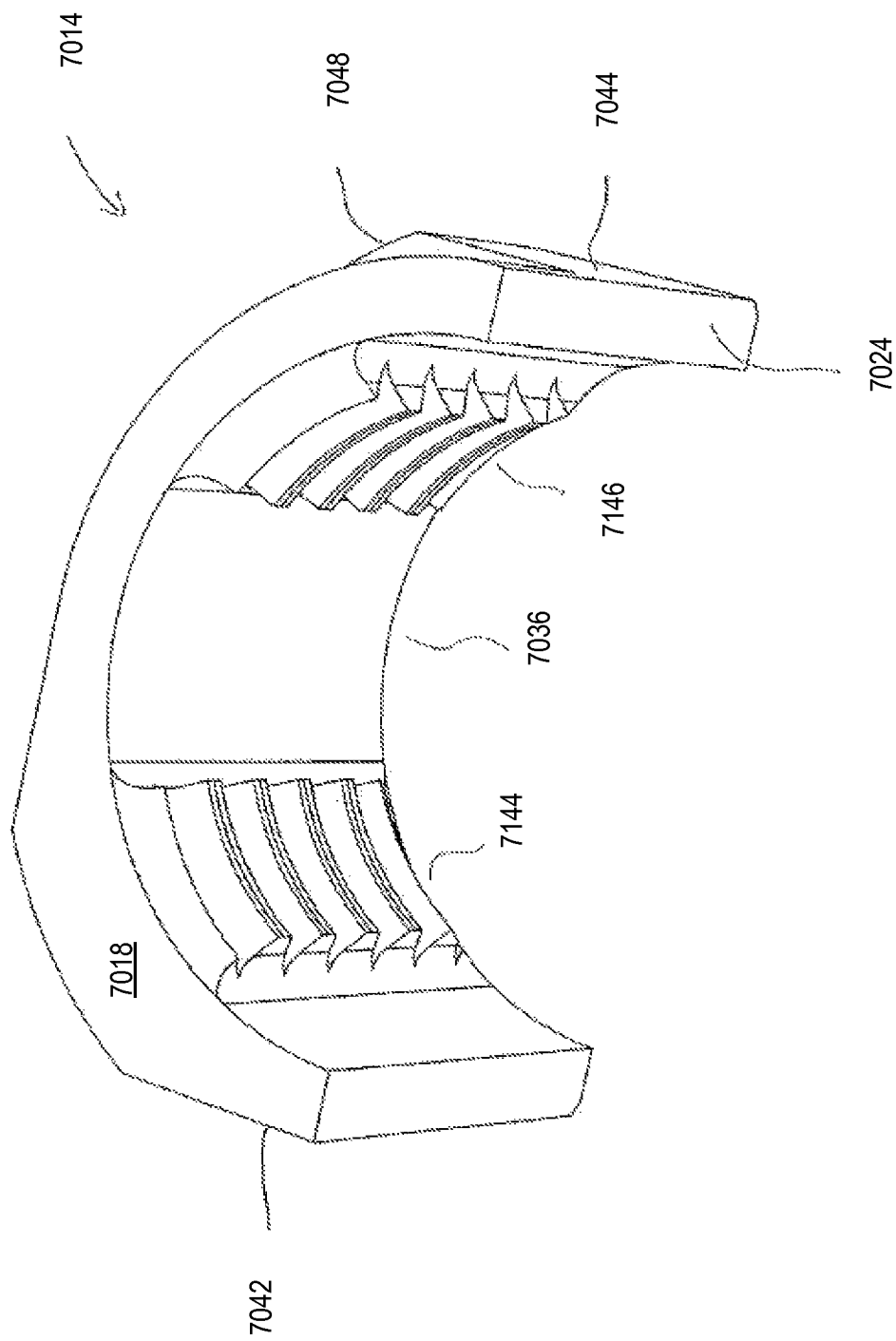
FIG. 39 shows an interior detail view of a half nut of a seventh embodiment.
Figure 40:
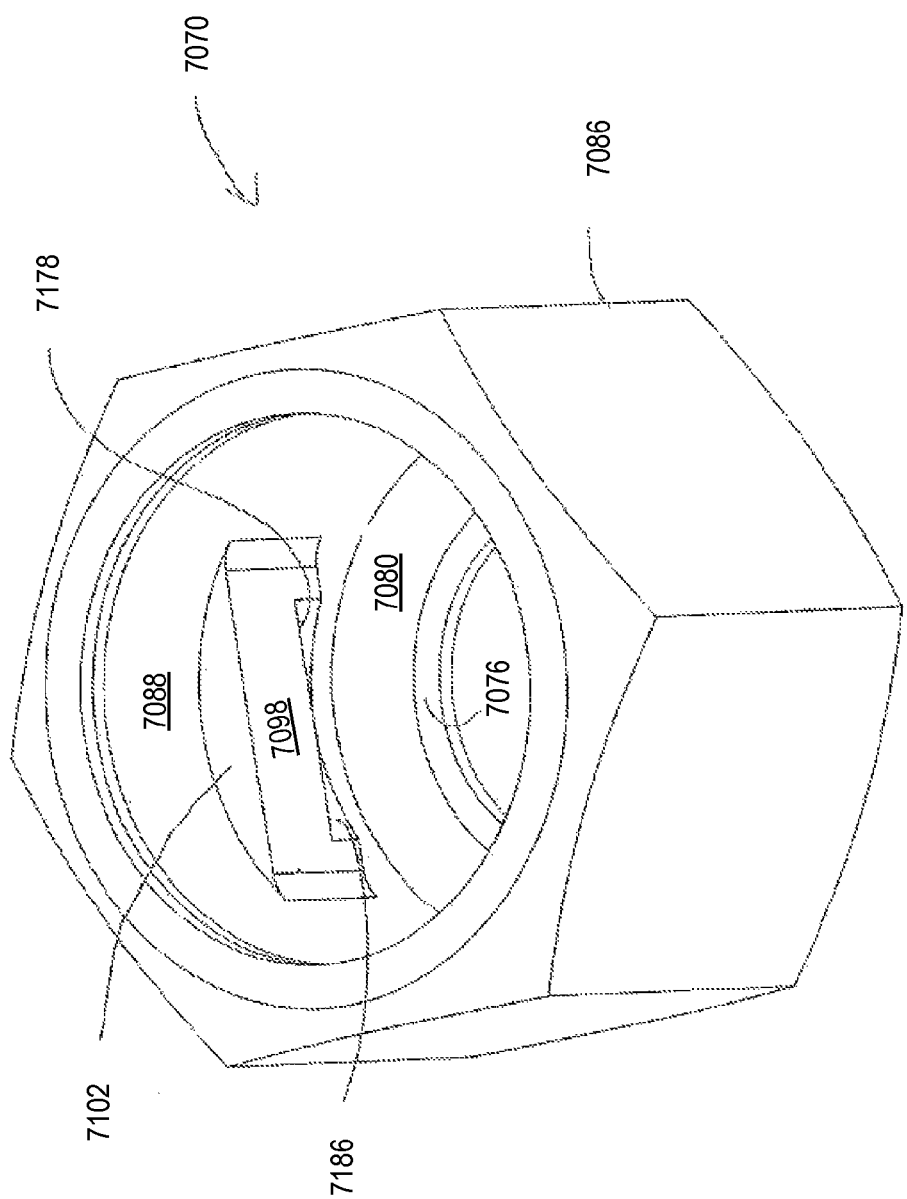
FIG. 40 shows a perspective view of the interior of a nut housing of a seventh embodiment.

Referring to FIG. 36, a tool 7180 is provided which is useful with the seventh embodiment for engaging or disengaging the half nuts 7014a/b into semi-circular engagement surfaces 7166 and 7168. Tool 7180 includes a handle 7182 and a flat bar 7184 projecting from handle 7182, the flat bar 7184 extending widthwise from a first edge 7186 to an opposed second edge 7188 defining a tool width. In the embodiment, the tool width is approximately equal to the distance between opposed points along first and second half nut 7014a/b interior surfaces, between the interrupted thread portions 7144 and 7146 such that tool 7180 may be inserted in-between the half nuts and to engage against the thread edges an rotate the half nuts to pre-engage the semi-circular engagement surfaces 7166 and 7168 (e.g., depressions). Curved inset 7190 is provided to allow insertion around a threaded rod R.

Figure 41:
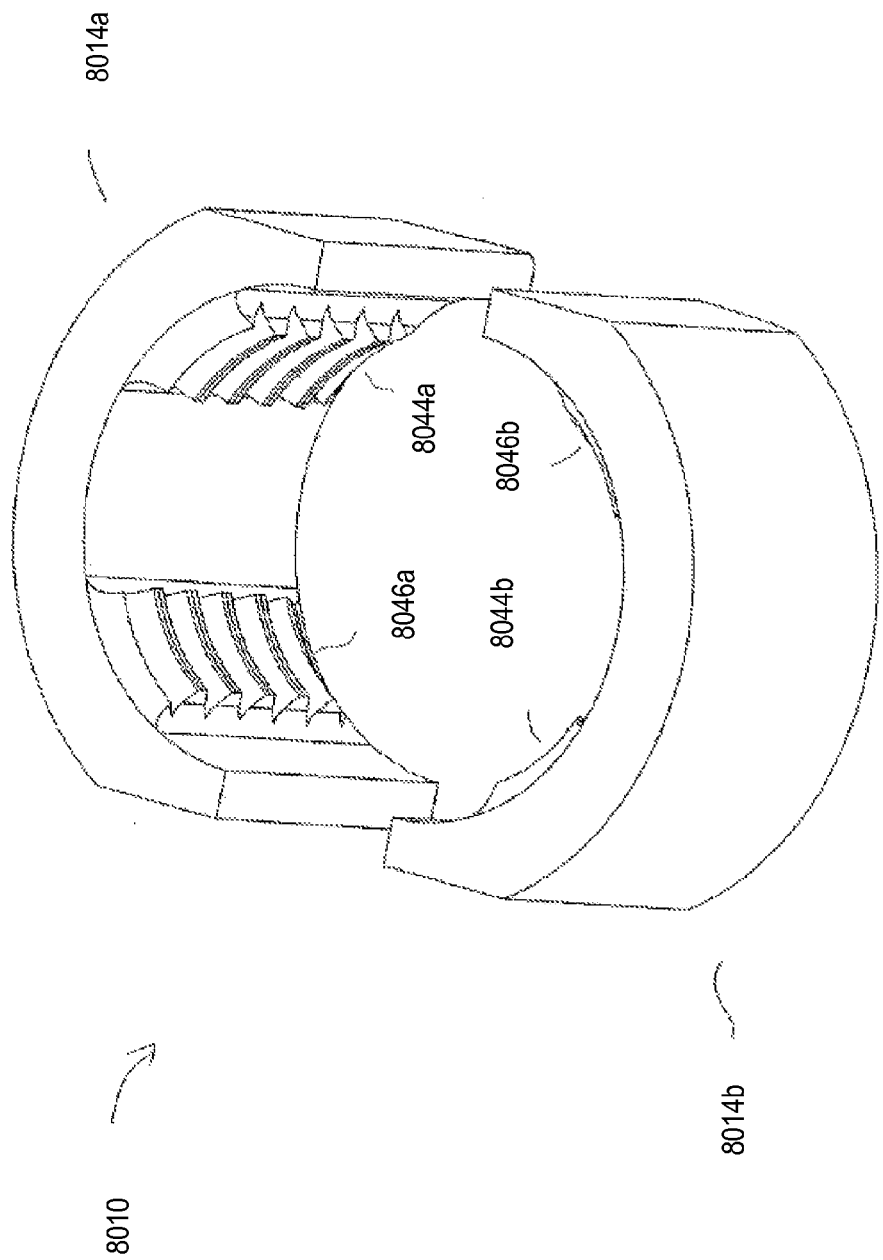
FIG. 41 shows a bottom perspective view of a pair of half nuts of an eighth embodiment.

Referring to FIG. 41, a pair of half nuts 8014a and 8014b of an eighth embodiment is shown, generally similar to the first embodiment but including interrupted female thread portions 8044a/b and 8046a/b, each of the interrupted female thread portions having a cutting edge.

The seventh embodiment adapted to repair damaged threads, although described separately, may be combined with the other embodiments adapted as fasteners. A set of first and second half nuts having thread cutting edges, 7014a&b or 8014a&b may be interchangeable with half nut sets 14a&b, 1014a&b, 2014a&b, 3014a-f, etc. For instance, referring to FIGS. 16 and 17 demonstrating use of a common nut housing with a plurality of sets of half nuts 3014a, b, 3014c, d and 3014e, f adapted for different thread sizes, the plurality of sets may include one or more sets of half nuts having thread cutting edges 7014a, b adapted for use in the same nut housing 3070. If damaged or galled threads are encountered while applying one of the fastener sets 3014a-f, the apparatus may be disassembled in place, the half nut set 3014 removed and a half nut set 7014a, b for the required thread size having a cutting edge inserted into the nut housing 3070 with the first and second plates, compression member and retaining element reassembled in place below the damaged area. As the assembly is rotated in the "unthreading" direction, the cutting edges will be compressed against the male threads removing burrs and/or realigning thread ridges as they move along the male threaded member. When the damaged thread portion is repaired, the cutting edge half nuts 7014*a, b* may be swapped in place with the appropriate fastener half nut set 3014*a-f*, and the fastener system torqued into place. The flexibility to exchange compression half nut sets with cutting edge half nut sets in-place, and back again, provides significant savings in time and material at the job site. Additionally, all of this may be accomplished using a common nut housing for a variety of male thread sizes, thereby markedly decreasing the number of parts required for inventory, and reducing time lost to mistakes in selecting the wrong part size.

Figure 42:
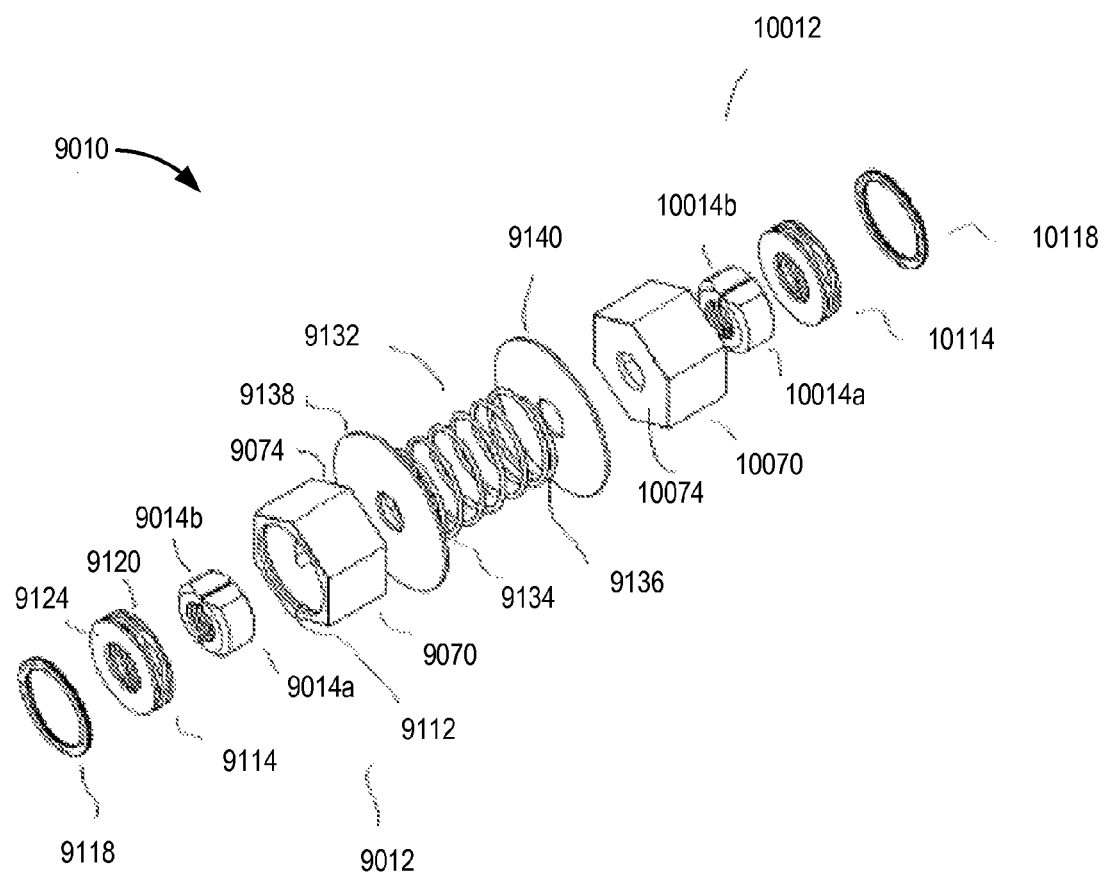
FIG. 42 shows an exploded view of a ninth embodiment in an opposing horizontal stacked configuration.
Figure 43:
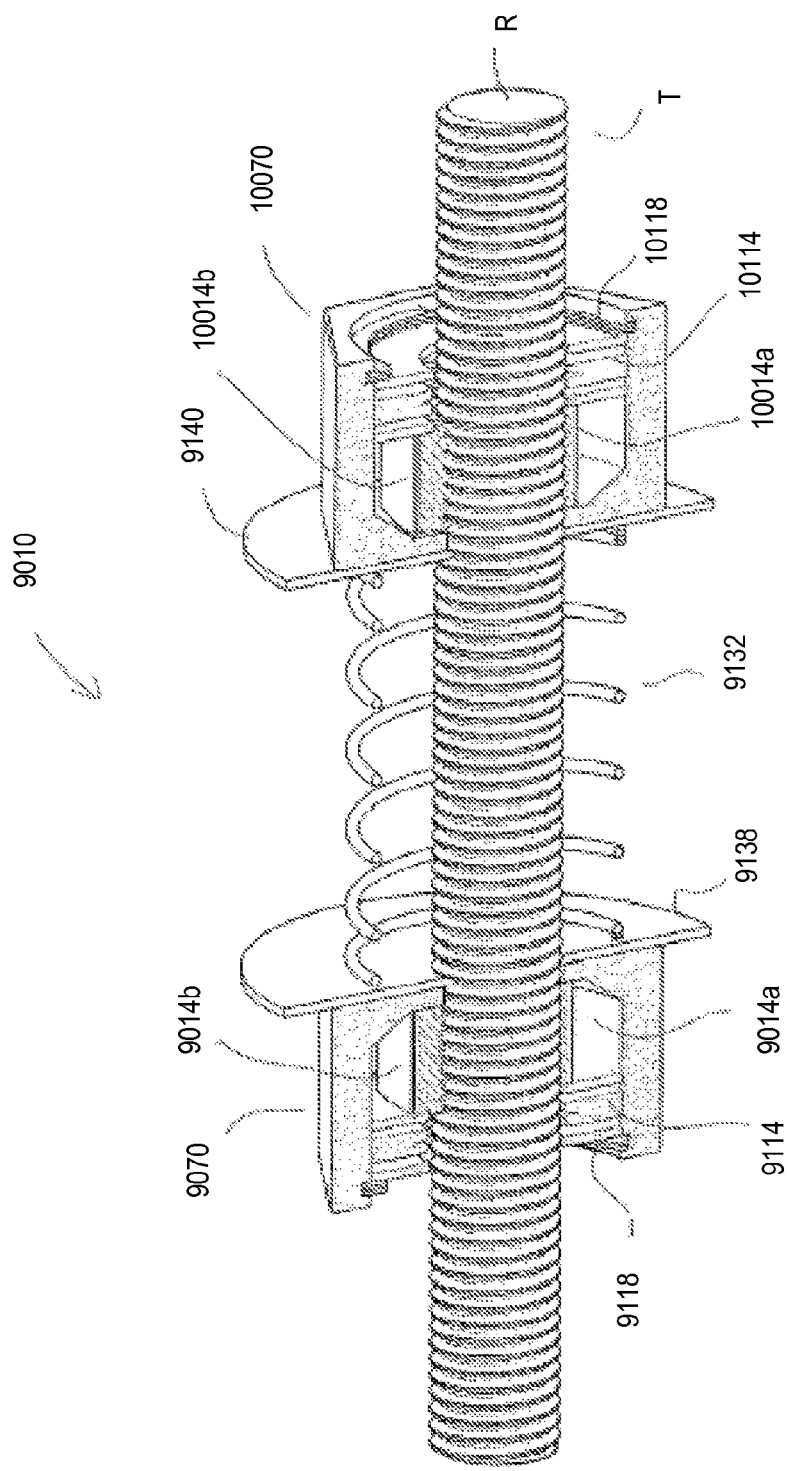
FIG. 43 shows a cutaway side view of a ninth embodiment in an opposing horizontal stacked configuration.
Figure 44:
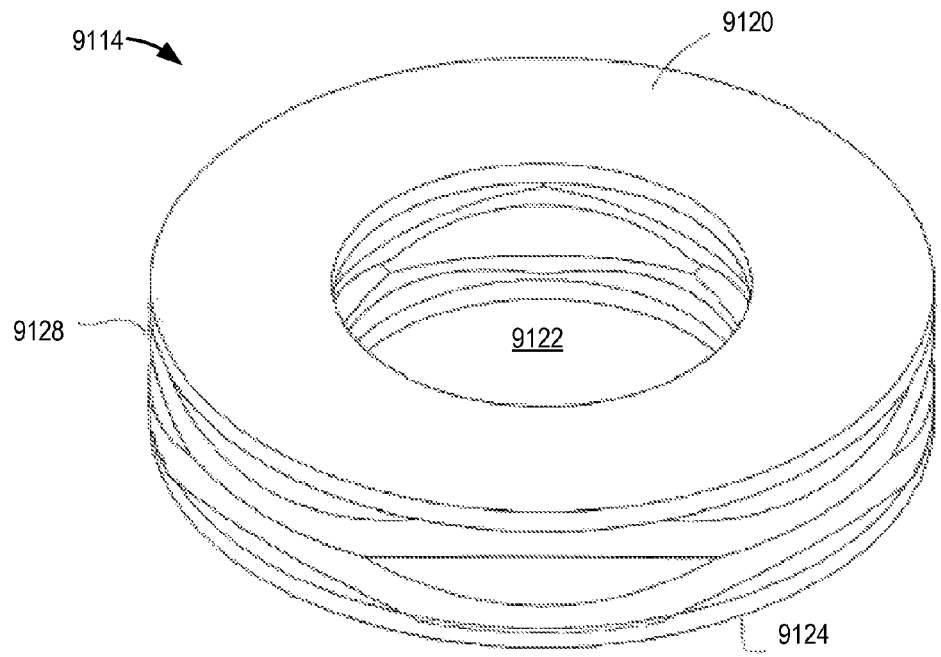
FIG. 44 shows a perspective view of a wave spring compression portion of a ninth embodiment.
Figure 45:
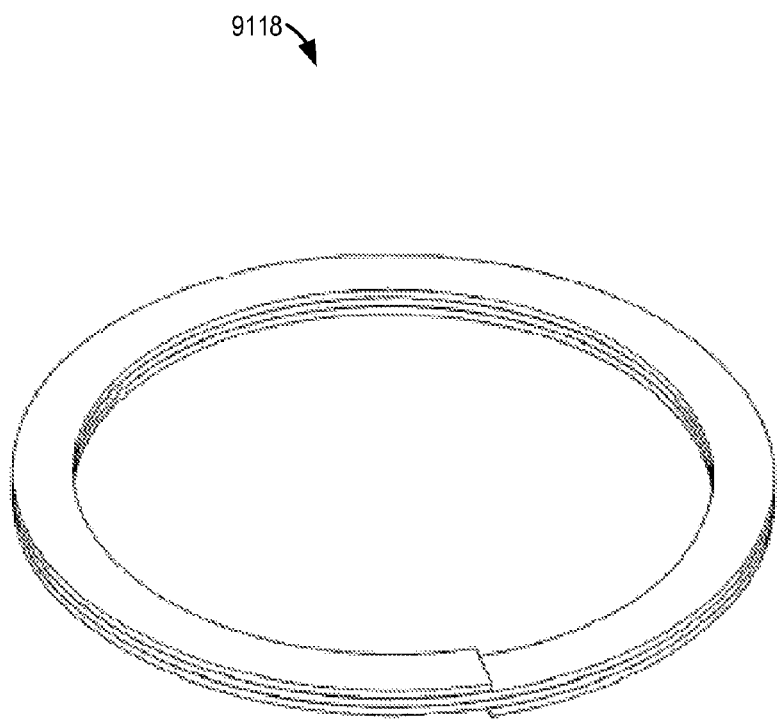
FIG. 45 shows a perspective view of a flat coil retaining element of a ninth embodiment, compressed.
Figure 46:
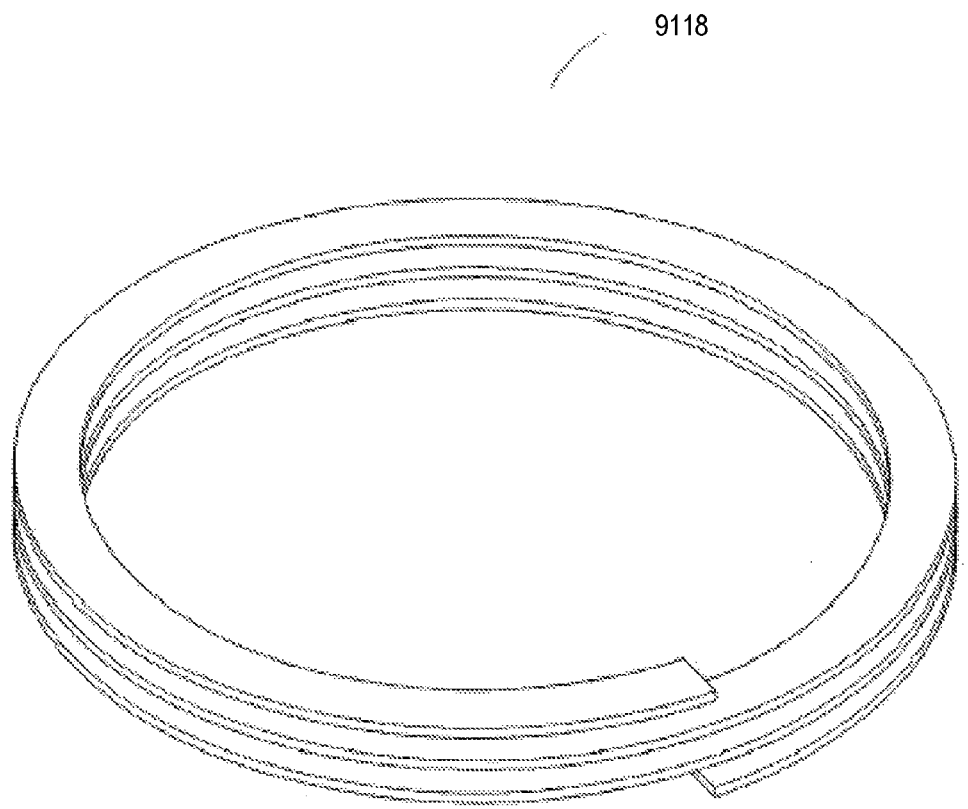
FIG. 46 shows a perspective view of a flat coil retaining element of a ninth embodiment, expanded.

Referring to FIGS. 42-47 a ninth embodiment 9010 is shown, similar to the first described embodiment, including a first nut assembly 9012 to couple to a male threaded rod R, the first nut assembly 9012 including opposed first and second half nuts 9014*a* and 9014*b*, a nut housing 9070 to receive the first and second half nuts 9014*a* &*b*, a compression portion 9114, and retaining element 9118. Referring to FIGS. 42, 43 & 44, compression portion 9114 comprises a resilient wave spring having a first a first end forming a plate 9120 to engage against first and second half nuts 9114*a*&*b*, and a second plate 9124 to engage against retaining element 9118. Wave spring 9114 is formed from a flat coil, such that first and second plates 9120 and 9124, respectively, are integral with the spring itself. Wave spring 9114 provides high compression force in a relatively compact form, and obviates the need for separate plates and resilient members, permitting a more compact nut housing 9070.

Referring to FIGS. 42, 43, 45 & 46, retaining element 9118 comprises a flat helical spring having two or three turns, which allows it to be compressed circumferentially to insert into nut housing 9070 and compressed axially to fit into channel 9112, and retained in place by friction when the compression is released. The nut assembly 9012 can therefore be assembled and disassembled without need for tools (such as a snap ring puller, as required for the first described embodiment).

Figure 47:
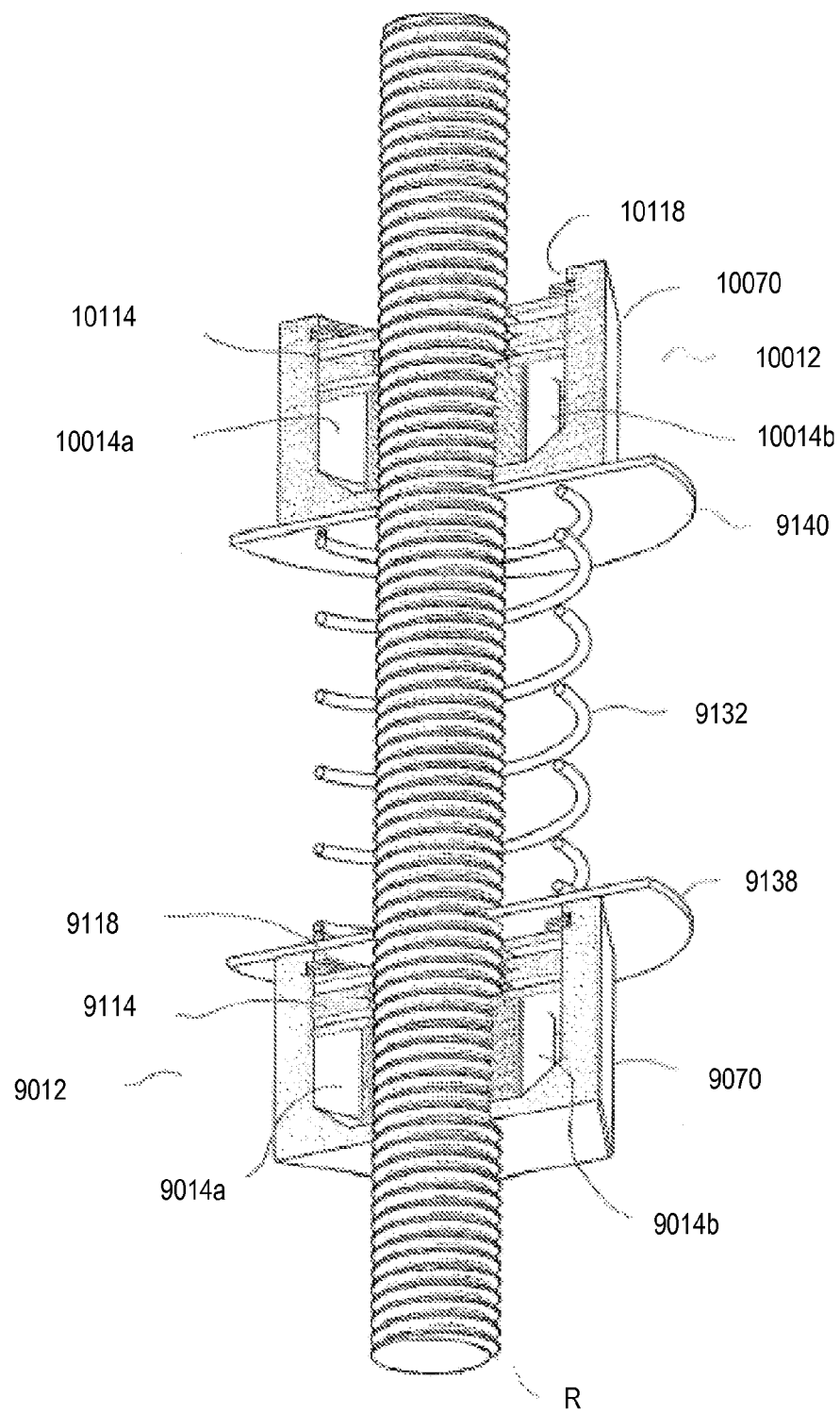
FIG. 47 shows a cutaway view of a ninth embodiment in an inline vertically stacked configuration.

Referring to FIGS. 42, 43 and 47 the configuration includes a second nut assembly 10012 which is identical to the first nut assembly 9012, including a nut housing 10070 to receive first and second opposed half nuts 10014*a*&*b*, compression portion 10114, and retaining element 10118. Interlineal compression member 9132 is disposed between the first and second nut assemblies 9012 and 10012. Interlineal compression member 9132 has a first end 9134 engaged against a first interlineal plate 9138, and a second end 9136 engaged against second interlineal compression plate 9140. In the depicted embodiment, the interlineal compression element 9132 is a helical spring.

In the horizontal configuration shown in FIGS. 42 and 43, first and second interlineal compression plates 9138 and 9140 abut directly against the respective first and second nut housing end wall exterior faces 9074 and 10074. This opposing orientation may be especially useful for horizontally mounted fasteners, to reduce (e.g., prevent) vibration and cyclic forces from loosening the fasteners over time. Additionally, this configuration may be useful with first and second nut assemblies 9012 and 10012 tightened against opposing surfaces of a plate or board, with interlineal compression member 9132 extending through an aperture in the plate or board.

In the vertically stacked configuration shown in FIG. 47, similar to the configuration shown in FIGS. 18 & 19, the second nut assembly acts as a keeper to reduce the likelihood (e.g., prevent) first nut assembly 9012 from working loose over time. Interlineal compression element 9132 maintains pressure on second nut assembly 10012 to maintain half nuts 10014*a*&*b* fully engaged, and provide some level of shock absorption.

Figure 48:
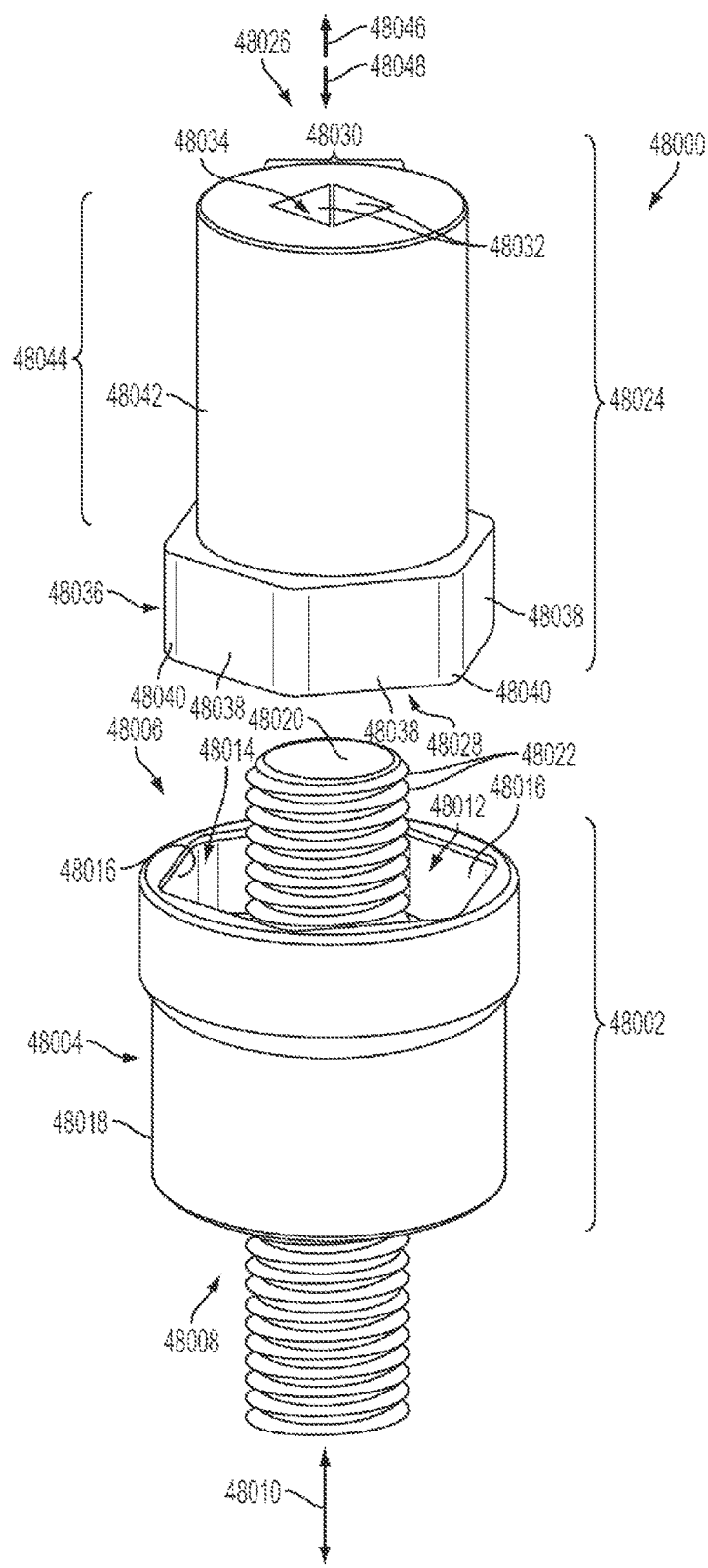
FIGS. 48-50 show different views of an example thread repair system.

FIG. 48 shows another example thread repair system 48000. It will be appreciated that the thread repair system 48000 may be a thread repair kit, in one example. Moreover, the thread repair system 48000 may be a type of fastener system. Therefore, the elements discussed above with regard to FIGS. 1-48 may be included in the thread repair system 48000 shown in FIG. 48.

The thread repair system 48000 includes a thread repair assembly 48002. The thread repair assembly 48002 includes a cutting-nut housing 48004. The cutting-nut housing 48004 may at least partially enclose a plurality of components. For instance, the thread repair assembly 48002 may further include a cutting nut, such as the cutting nut 58000 shown in FIGS. 58-62. The thread repair assembly 48002 may further include a plurality of cutting nut retaining elements, such as the cutting nut retaining elements (118, 124, 116, and/or 120) shown in FIG. 1 and/or the retaining element 9114 (e.g., wave spring) shown in FIG. 44. As such, it will be appreciated that the thread repair assembly 48002 may include similar components to the fastener systems discussed above with regard to FIGS. 1-48. It will be appreciated that the retaining elements may include one or more springs, such as a wave spring, coil spring, etc.

The cutting-nut housing 48004 includes a first axial end 48006 and a second axial end 48008. A central axis 48010 of the thread repair assembly 48002 is depicted for reference. The first axial end 48006 includes an opening 48012. The second axial end 48008 also includes an opening 49004, shown in FIG. 49. Returning to FIG. 48, the cutting-nut housing 48004 includes an internal drive apparatus interface 48014. The internal drive apparatus interface 48014 includes at least two interior planar surfaces 48016. Specifically, in the depicted example, the internal drive apparatus interface 48014 includes six planar surfaces forming a hexagonal shape. However, other types of internal drive apparatuses interfaces having an alternate number of planar surfaces have been contemplated, such an interface having a star shape, octagonal shape, a square shape, etc. The internal drive apparatus interface 48014 is adjacent to the first axial end 48006 of the cutting-nut housing 48004. As illustrated the cutting-nut housing 48004 includes an external surface 48018. The external surface 48018 is curved, in the depicted example. In other examples the external surface 48018 may additionally or alternatively include an external drive apparatus interface, such as the external drive apparatus interface 63002 shown in FIG. 63. It will be appreciated that the external drive apparatus interface may have a hexagonal shape, a square shape, a star shape, an octagonal shape, etc.

As shown, the thread repair assembly 48002 encloses a threaded element 48020 including threads 48022. The threaded element 48020 is a threaded rod, in the depicted example. However, it will be appreciated that the threaded element may be any suitable threaded fastener such as a bolt, screw, a threaded pipe, etc. The threaded element 48020 is depicted as extending through the thread repair assembly 48002. Specifically, the threaded element 48020 extends through the opening 48012.

The thread repair system 48000 further includes a drive apparatus 48024. The drive apparatus 48024 may be configured to rotate the thread repair assembly 48002 to urge movement of the assembly in an axial direction, discussed in greater detail herein.

The drive apparatus 48024 includes a first axial end 48026 and a second axial end 48028. A tool interface 48030 is included in the drive apparatus 48024. Specifically, in the depicted example the tool interface 48030 is positioned in the first axial end 48026. The tool interface includes at least two planar surfaces 48032 defining the boundary of an opening 48034. In the depicted example, the tool interface includes four planar surfaces, defining a square opening. However, tool interfaces having an alternate number of planar surfaces have been contemplated, such as a hexagonal interface, a star interface, an octagonal interface, etc. The tool interface 48030 is positioned in an internal location in the drive apparatus 48024. Additionally or alternatively, a tool interface having two or more planar sides may be positioned in an external location in the drive apparatus.

The tool interface 48030 is configured to accept (e.g., mate with) a rotational-tool element which may be included in a powered and/or unpowered drill/driver, wrench (e.g., impact wrench), etc. For instance, the rotational-tool element may be a bit (e.g., removable bit) included in a power-drill. The rotational tool attachment may be square bit sized to mate with the tool interface, in the depicted example. However, in other examples, the rotational tool attachment may be a hexagonal bit, a triangular bit, an octagonal bit, a star bit, etc. In this way, a rotational input may be delivered to the drive apparatus via an external tool. The tool interface 48030 is positioned in an internal portion of the drive apparatus 48024.

The drive apparatus 48024 further includes a repair assembly interface 48036. The repair assembly interface 48036 includes at least two planar surfaces 48038. Specifically in the depicted example, the repair assembly interface 48036 includes six planar sides. However, a repair assembly interface having an alternate number of planar sides has been contemplated, such as a repair assembly interface having an octagonal shape, a star shape, a square shape, etc. As shown, the repair assembly interface includes curved surfaces 48040. However, in other examples the planar sides may intersect to form an edge. The repair assembly interface 48036 is included in an external surface 48042 of the drive apparatus 48024. The external surface 48042 further includes a curved section 48044. The curved section 48044 may have a smaller radius than the repair assembly interface 48036. Additionally, the repair assembly interface 48036 is configured to mate with the internal drive apparatus interface 48014 included in the thread repair assembly 48002. When the drive apparatus 48024 is mated with the thread repair assembly 48002 a rotational force may be transferred from the drive apparatus to the thread repair assembly 48002.

Figure 58:
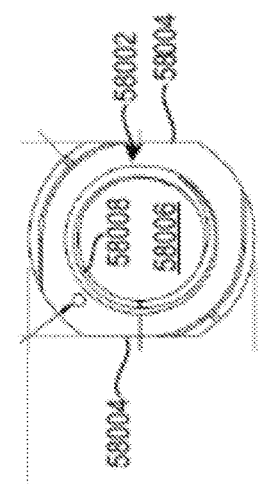

The thread repair assembly 48002 and specifically cutting threads included in the thread repair assembly 48002, such as the cutting threads 5808 shown in FIG. 58, may be configured to engage (e.g., cuttingly engage) the threaded element 48020 when the thread repair assembly 48002 is urged in a first axial direction 48046 and disengage (e.g., cuttingly disengage) the threaded element when the thread repair assembly is urged in a second axial direction 48048 opposing the first axial direction. It will be appreciated that rotation of the thread repair assembly 48002 in a clockwise or counterclockwise direction may urge the thread repair assembly 48002 in the first axial direction 48046. Urging the thread repair assembly 48002 in the first axial direction may include rotating the thread repair assembly 48002 via rotation of the drive apparatus in a clockwise or counterclockwise direction. Furthermore, urging the thread repair assembly 48002 in the second axial direction may include applying a radial force to the thread repair assembly 48002 via a hand of a user, for instance. It will be appreciated that each of the components in the thread repair system may be constructed out of one or more suitable materials such as steel, aluminum, titanium, etc. The materials may be selected based on a desired amount of corrosion resistance of the components, the expected use environment/application of the system, the material of the damaged threaded rod, etc. Moreover, some of the components in the components in the thread repair system may be constructed out of different materials, in some examples.

Figure 49:
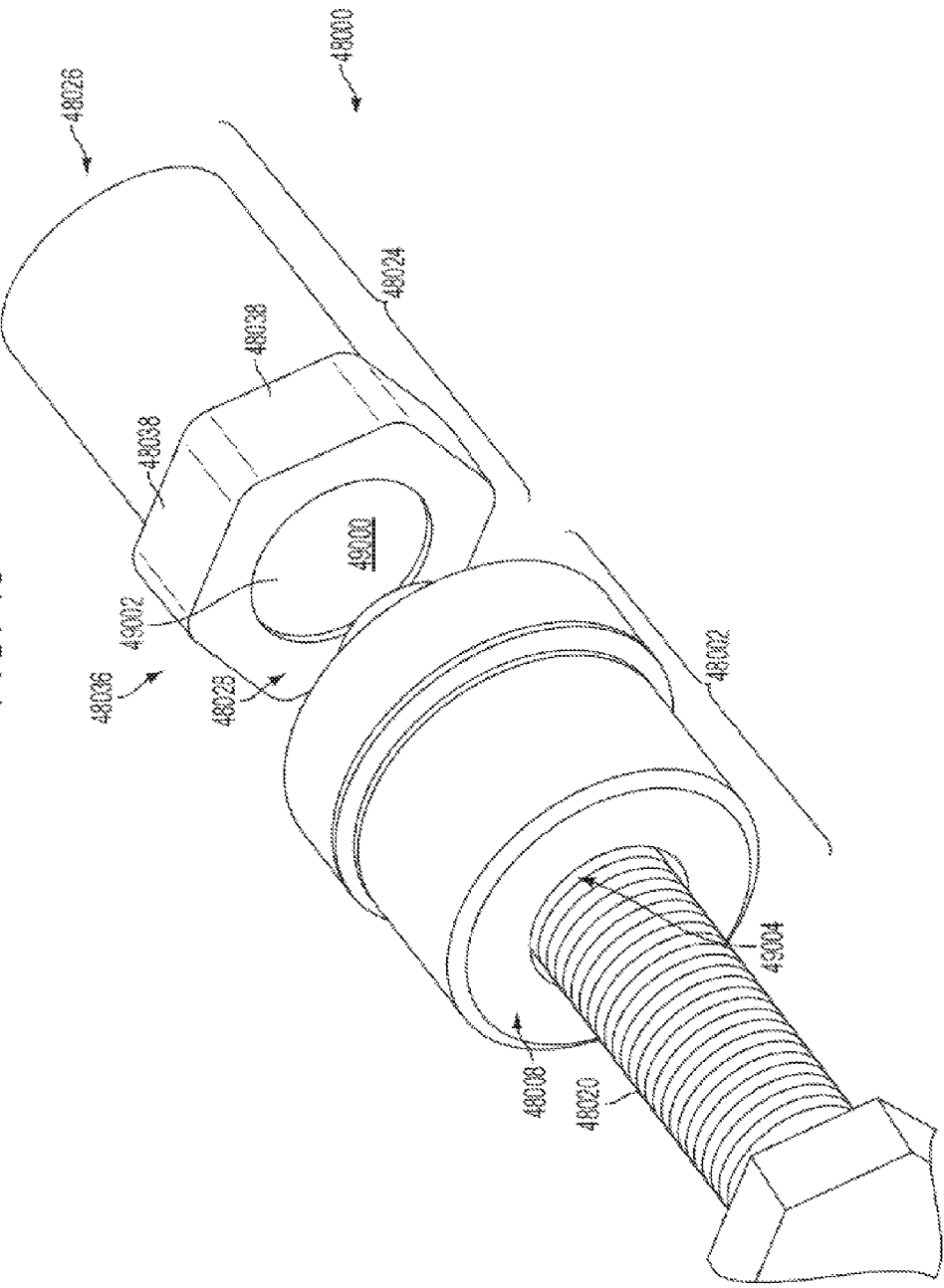

FIG. 49 shows another view of the example thread repair system 48000 shown in FIG. 48. As discussed above, the thread repair system 48000 includes a thread repair assembly 48002 and a drive apparatus 48024. The threaded element 48020 is also shown in FIG. 49.

An internal opening 49000 (e.g., internal central shaft opening) of the drive apparatus 48024 included in the second axial end 48028 of the drive apparatus is also shown. The internal opening 49000 is circular, in the depicted example. However, other geometries of the opening have been contemplated. A boundary 49002 of the internal opening 49000 is curved and smooth. In this way, the drive apparatus 48024 may not directly interact with the threaded element 48020. In one example, the drive apparatus may be freely rotated around the threaded element because a size of the internal opening 49000 is greater than an outer diameter of 48020. Similarly, the size of a diameter of opening 49000 is greater than the opening at the internal nut cutting face. Thus, the internal opening may accept a portion of the threaded element and the boundary of the opening may partially enclose a portion of the threaded element 48020. The boundary 49002 may be referred to as an internal surface. Additionally, the internal opening 49000 extends from the second end 48028 of the drive apparatus 48024 to the tool interface 48030, shown in FIG. 48, included in the first axial end 48026 of the drive apparatus.

An opening 49004 of the thread repair assembly 48002 is also depicted in FIG. 49. As shown, the opening 49004 may at least partially enclose the threaded element 48020. Thus, the threaded element 48020 may extend into the thread repair assembly. The opening 49004 may be included in the second axial end 48008 of the thread repair assembly 48002. The repair assembly interface 48036 including planar surfaces 48038 is also shown in FIG. 49.

Figure 50:
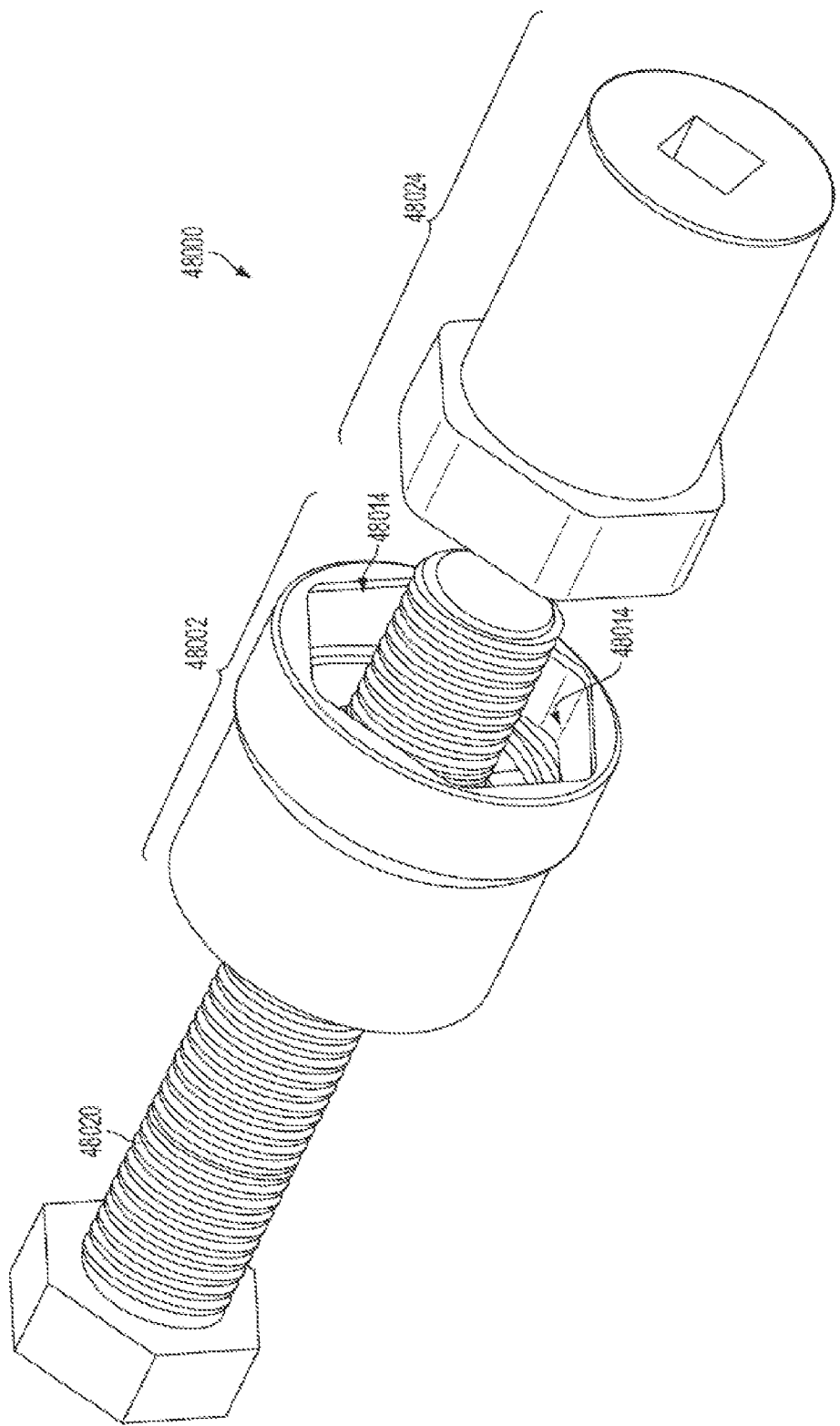

FIG. 50 shows another view of the example thread repair system 48000 shown in FIG. 48. The thread repair assembly 48002, drive apparatus 48024, and threaded element 48020 are shown in FIG. 50. The threaded element 48020 is a bolt, in the depicted example. However, as discussed above other suitable threaded elements may be repaired via the thread repair system 48000. The drive apparatus interface 48014 included in the thread repair assembly 48002 is also shown in FIG. 50.

Figure 53:
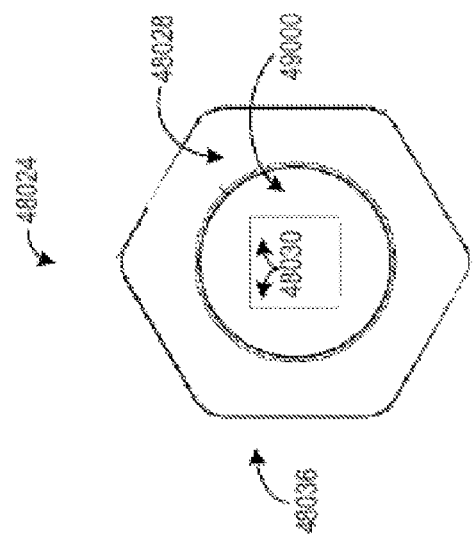
FIGS. 51-53 show different views of an example drive apparatus included in the thread repair system shown in FIGS. 48-50.
Figure 52:
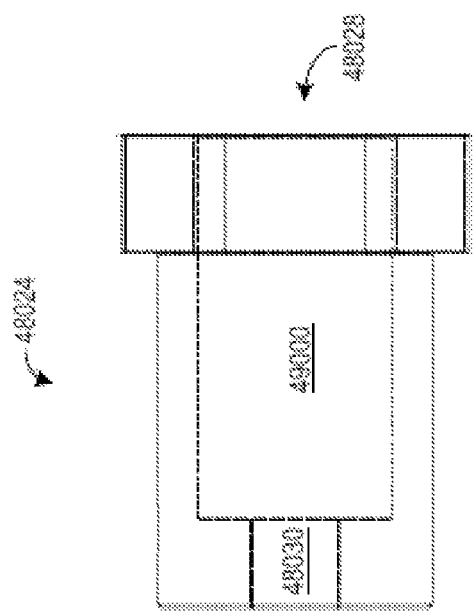
Figure 51:
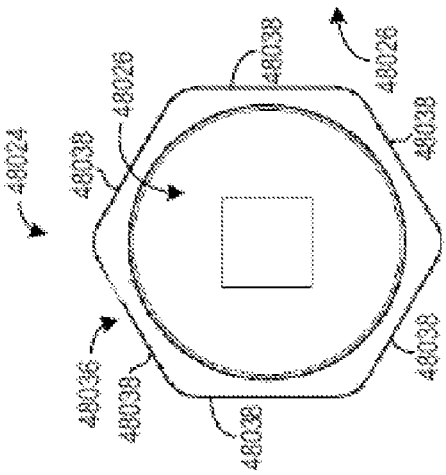

FIGS. 51-53 show different views of the drive apparatus 48024. Specifically, FIG. 51 shows the first axial end 48026 of the drive apparatus 48024 including the tool interface 48030 having the planar sides 48038. The repair assembly interface 48036 including the planar sides 48038 is also shown in FIG. 51.

FIG. 52 shows a side view of the drive apparatus 48024. Additionally, the first axial end 48026 and the second axial end 48028 of the drive apparatus are shown. The internal opening 49000 is shown extending from the second axial end 48028 to the tool interface 48030. As previously discussed, the threaded element 48020 shown in FIGS. 48-50 may extend through the internal opening 49000.

FIG. 53 shows a view of the second axial end 48028 including the internal opening 49000. The repair assembly interface 48036 is also shown in FIG. 53. The tool interface 48030 is also illustrated in FIG. 53.

Figure 54:
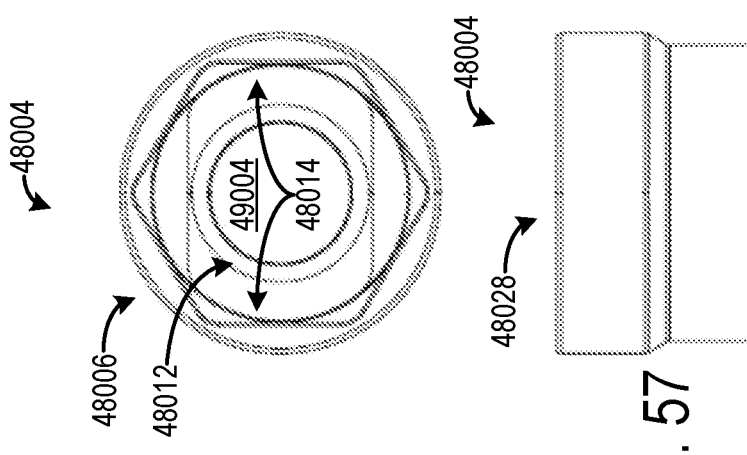

FIGS. 54-57 show various views of the cutting-nut housing 48004 included in the thread repair assembly 48002, shown in FIGS. 48-50. It will be appreciated that the cutting-nut housing 48004 may be configured to accommodate a variety of different cutting nuts having different thread pitches and/or diameters. In this way, different cutting nuts may be used depending on the type of thread being repaired. As a result, the applicability of the cutting-nut assembly may be increased. Specifically, in one example each cutting nut may be thread pitch and/or diameter specific. In particular, FIG. 54 illustrates the first axial end 48006 of the cutting-nut housing 48004. The internal drive apparatus interface 48014 included in the cutting-nut housing 48004 is also shown in FIG. 54. The opening 48012 of the first axial end 48006 is also shown. The opening 49004 of the second axial end is also shown in FIG. 54.

Figure 55:
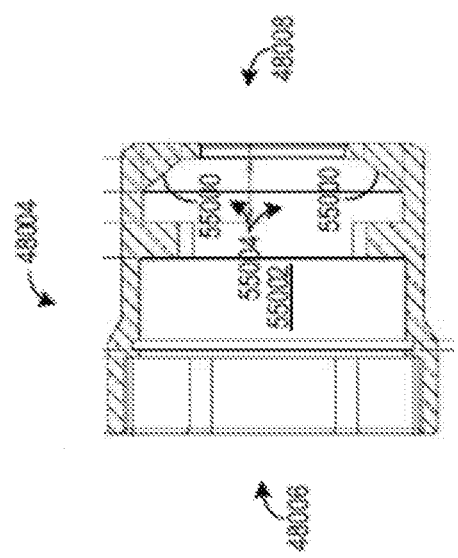

FIG. 55 shows a side view of the cutting-nut housing 48004, shown in FIG. 54. The first axial end 48006 and the second axial end 48008 of the cutting-nut housing 48004 are shown. A tapered surface 55000 in the cutting-nut housing 48004 is also shown. The tapered surface 55000 is configured to mate with a corresponding tapered surface 60000 included in a cutting nut 58000, shown in FIG. 60, discussed in greater detail herein. The tapered surfaces enable the cutting nut in the thread repair assembly to engage and disengage from a threaded element when urged in different axial direction. In this way, the thread repair assembly may be slid onto a threaded element without engaging the threads and then subsequently rotated to engage the cutting nut, thereby repairing damage threads in the threaded element. In one example, the thread repair assembly 48002 may be used in this way without lubrication, if desired. It will be appreciated that a cutting nut may be positioned in the void 55002 in the cutting-nut housing 48004. The tapered surface 55000 may be included in an internal cutting nut interface 55004 configured receive a cutting nut, such as the cutting nut 58000, shown in FIGS. 58-62.

Figure 56:
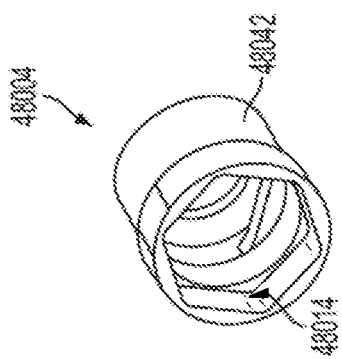
FIGS. 54-57 show different views of a cutting-nut housing included in the thread repair assembly of the thread repair system shown in FIGS. 48-50.
Figure 57:
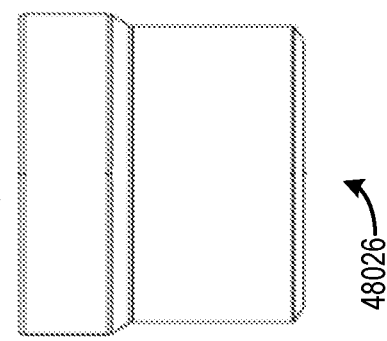

FIG. 56 shows another view of the cutting-nut housing 48004 including the internal drive apparatus interface 48014 having and internal drive apparatus interface 48014. The external surface 48042 of the cutting-nut housing 48004 is also shown in FIG. 56. FIG. 57 shows another view of the cutting-nut housing 48004. The external surface 48042, first axial end 48026, and second axial end 48028 of the cutting-nut housing 48004 are shown in FIG. 57. As shown, the diameter of the first axial end 48026 may be less than the radius of the second axial end 48028.

FIGS. 58-62 show an example cutting-nut 58000. The cutting-nut 58000 may be configured to cut right or left handed threads, tapered threads, square threads, coiled threads, etc. Moreover, the cutting nut 58000 is externally driven via the cutting-nut housing in the depicted example. However in other examples, the cutting nut may be internally driven via a cutting-nut housing. The cutting nut 58000 shown in FIG. 58-62 forms a continuous shape. However, it will be appreciated that the cutting nut 58000 may be split. Thus, the cutting-nut 58000 may include a first piece and a second piece, the first and second pieces each forming separate volumes. In some examples, the first piece may be equivalent in shape and size to the second piece. However, pieces having different geometries and/or sizes have been contemplated. The cutting nut 58000 may be included in the thread repair assembly 48002 shown in FIGS. 48-50. Specifically, the cutting nut may be enclosed by the cutting-nut housing 48004 and mate with certain surface in the housing during certain operating conditions. However, in other example other cutting nuts may be included in the thread repair assembly shown in FIGS. 48-50, such as one of the split nuts discussed above with regard to FIGS. 1-47.

FIG. 58 shows a first end 58002 of the cutting nut 58000. The cutting nut 58000 includes at least two planar surfaces 58004 configured to mate with planar surfaces included in the cutting-nut housing 48004, shown in FIGS. 54-57. Continuing with FIG. 58, the cutting nut 58000 includes an opening 58006 and threads 58008. The threads 58008 are continuous in the depicted example. However, in other examples the threads may be non-continuous. For instance, the threads may include a plurality of sections spaced away from one another. As previously discussed, the threads may engage the threaded element 48020, shown in FIGS. 48-50 to facilitate repair of the threads in the threaded element.

Figure 59:
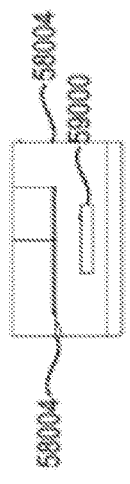

FIG. 59 shows a side view of the cutting nut 58000. The planar surfaces 58004 of the cutting nut 58000 are also depicted in FIG. 59. The cutting nut 58000 also includes a recess 59000.

Figure 60:
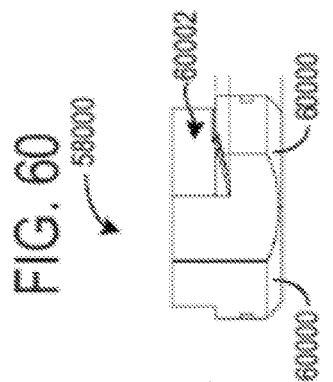
Figure 61:
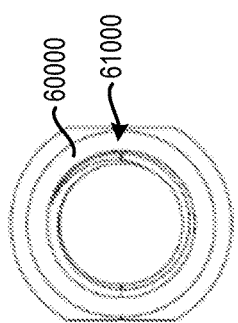

FIG. 60 shows another side view of the cutting nut 58000. A tapered surface 60000 of the cutting nut 58000 is illustrated. As previously discussed the tapered surface 60000 is configured to mate with the internal tapered surface 55000 in the cutting-nut housing shown in FIG. 55. The cutting nut 58000 also includes a recessed section 60002. FIG. 61 shows a second end 61000 of the cutting nut 58000. The tapered surface 60000 in the cutting nut 58000 is also shown.

Figure 62:
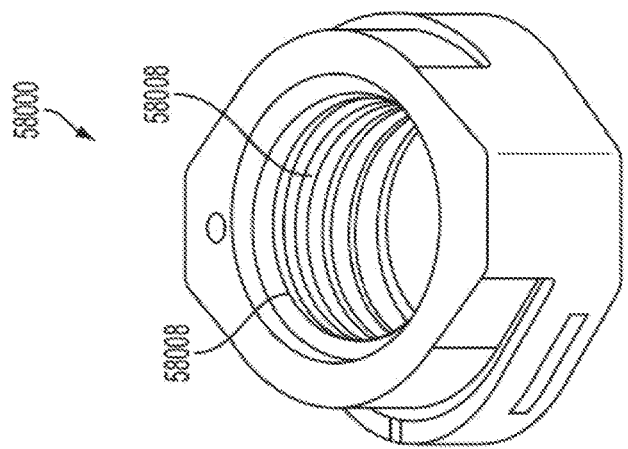
FIGS. 58-62 show different views of an example cutting nut which may be included in the thread repair assembly shown in FIGS. 48-50.

FIG. 62 shows another view of the cutting nut 58000 shown in FIG. 58. The threads 58008 of the cutting nut 58000 as depicted. As previously discussed the threads may engage and disengage a threaded element based on the direction of movement of the cutting-nut housing 48004. In one example, the cutting nut 58000 may be a single continuous piece of material. However, in other examples the cutting nut 58000 may be split into two or more pieces. For instance, the cutting nut 5800 may be split into cutting nut halves, as previously discussed. Still further in other embodiments, the cutting nut may be split into four pieces.

FIGS. 63-66 show another example cutting-nut housing 63000. Specifically, FIG. 63 shows a first view of the cutting-nut housing 63000. The cutting-nut housing 63000 includes an external drive apparatus interface 63002 including at least two planar sides 63004. Specifically in the depicted example the external drive apparatus interface 63002 includes six planar sides. It will be appreciated that the external drive apparatus interface 63002 may be included in the cutting-nut housing 48004, shown in FIGS. 48-50. Additionally, the external drive apparatus interface 63002 may be engaged via a wrench (e.g., impact wrench).

FIG. 64 shows a side view of the cutting-nut housing 63000. Again, the cutting-nut housing 63000 includes a cutting-nut interface 64000 having a tapered surface 64002. The tapered surface is configured to mate with a correspondingly tapered surface of a cutting nut, such as the cutting nuts previously described. FIGS. 65-66 show another view of the cutting-nut housing 63000 including the external drive apparatus interface 63002. As shown, the external drive apparatus interface 63002 is included in an external surface 65000 of the cutting-nut housing 63000.

It will be appreciated that combinations of the components in the different embodiments of the thread repair assembly described above have been contemplated. For instance, the cutting nut halves shown in FIGS. 24, 37, etc., may be used in the thread repair assembly shown in FIGS. 48-50. It will be appreciated that a variety of combinations are possible.

FIGS. 1-66 provide for a thread repair assembly comprising a cutting-nut housing including a first axial end, a second axial end, an internal drive apparatus interface having at least two interior planar surfaces, and an internal cutting-nut interface, the first and second axial ends each having an opening and a cutting nut at least partially enclosed by the cutting-nut housing and including a plurality of cutting threads configured to engage a threaded element when the assembly is urged in a first axial direction and disengage the threaded element when the thread repair assembly is urged in a second axial direction opposing the first axial direction.

FIGS. 1-66 further provide for a thread repair assembly where the cutting nut is split and includes a first piece and a second piece. FIGS. 1-66 further provide for a thread repair assembly where the first piece is substantially identical in size and geometry to the second piece, the first and second piece forming separate volumes. FIGS. 1-66 further provide for a thread repair assembly where the cutting threads are non-continuous.

FIGS. 1-66 further provide for a thread repair assembly where the cutting nut includes an external surface tapered in the second axial direction, the tapered external surface configured to mate with a correspondingly tapered surface in the cutting-nut interface when the cutting threads are cuttingly engaged with the threaded element.

FIGS. 1-66 further provide for a thread repair assembly where the cutting-nut housing further comprises an external drive apparatus interface. FIGS. 1-66 further provide for a thread repair assembly where the external drive interface includes two or more planar surfaces. FIGS. 1-66 further provide for a thread repair assembly further comprising one or more cutting-nut retaining elements at least partially enclosed by the cutting-nut housing and coupled to the cutting nut.

FIGS. 1-66 further provide for a thread repair assembly where the one or more retaining elements is positioned axially between one of the openings and the cutting nut. FIGS. 1-66 further provide for a thread repair assembly where the internal drive apparatus interface is positioned adjacent to one of the axial ends. FIGS. 1-66 further provide for a thread repair assembly where urging in the first axial direction includes rotating the cutting-nut housing via rotation of a drive apparatus mated with the internal drive apparatus interface. FIGS. 1-66 further provide for a thread repair assembly where the internal drive apparatus interface includes a plurality of planar surfaces forming a hexagonal shape.

FIGS. 1-66 further provide for a thread repair kit comprising a thread repair assembly including a cutting-nut housing having a first axial end, a second axial end, and an internal drive apparatus interface having at least two planar surfaces, the first and second axial ends each including openings and a drive apparatus including a tool interface configured to accept a rotational-tool attachment and a repair assembly interface configured to mate with the internal drive apparatus interface in the thread repair assembly.

FIGS. 1-66 further provide for a thread repair kit where cutting-nut housing further includes an internal cutting-nut interface and the thread repair assembly further includes a cutting nut at least partially enclosed by the cutting-nut housing and includes a plurality of cutting threads configured to engage a threaded element when the thread repair assembly is urged in a first axial direction and disengage the threaded element when the thread repair assembly is urged in a second axial direction opposing the first axial direction.

FIGS. 1-66 further provide for a thread repair kit where the drive apparatus includes an internal opening. FIGS. 1-66 further provide for a thread repair kit where the internal opening extends from a first end of the drive apparatus to the tool interface. FIGS. 1-66 further provide for a thread repair kit where the repair assembly interface is positioned on an external surface of the drive apparatus. FIGS. 1-66 further provide for a thread repair kit where the thread repair assembly further includes one or more retaining elements positioned between one of the axial ends and the cutting nut. FIGS. 1-66 further provide for a thread repair kit where the cutting nut includes an external surface tapered in the second axial direction, the tapered external surface configured to mate with a correspondingly tapered surface in the cutting-nut interface when the cutting threads are engaged with the threaded element.

FIGS. 1-66 also provide for a thread repair assembly comprising a cutting-nut housing including a first axial end, a second axial end, an internal drive apparatus interface having at least two exterior planar surfaces, and an internal cutting-nut interface, the first and second axial ends each having an opening and a cutting nut coupled to the cutting-nut housing and including a plurality of cutting threads and an external surface tapered in the second axial direction, the tapered external surface configured to mate with a correspondingly tapered surface in the cutting-nut interface when the cutting threads are cuttingly engaged with the threaded element.

FIGS. 1-66 also provide for a thread repair assembly where the cutting threads are non-continuous and include a plurality of sections spaced away from one another.

Those skilled in the art will recognize that numerous modifications and changes may be made to the example disclosed embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the disclosed embodiments are essential. Other embodiments are possible, their specific designs depending upon the particular application. As such, the scope of the invention should not be limited by the particular embodiments herein described but should be defined only by the appended claims and equivalents thereof. The terms of degree such as "substantially" and "approximately" as used herein mean a reasonable amount of deviation of the modified term such that the end result is not significantly changed (e.g., manufacturing tolerances.

The invention claimed is:

1. A thread repair assembly comprising:
   a cutting-nut housing including a first axial end, a second axial end, a central axis passing through the first and second axial ends, and an internal cutting-nut interface, the first and second axial ends each having an opening; and
   a cutting nut coupled to the cutting-nut housing and including a plurality of cutting threads configured to engage a threaded element when the assembly is urged in a first axial direction and disengage the threaded element when the thread repair assembly is urged in a second axial direction opposing the first axial direction, wherein the cutting-nut housing comprises an engagement surface perpendicular to the central axis and located between the first and second axial ends, the engagement surface facing the second axial end;

wherein the cutting nut comprises a shoulder perpendicular to the central axis and facing the first axial end, the shoulder slidingly engaging with the engagement surface when the cutting-nut housing is rotated in a loosening direction, the shoulder being located between the engagement surface and the second axial end; and wherein the cutting nut is rotatable relative to the cutting-nut housing when the thread repair assembly is engaged to the threaded element.

2. The thread repair assembly of claim 1, where the cutting-nut housing includes an internal drive apparatus interface having at least two interior planar surfaces, and wherein the cutting nut locks in to the cutting-nut housing when the cutting-nut housing is urged in the loosening direction.

3. The thread repair assembly of claim 2, where the cutting nut is split and includes a first piece and a second piece, the first and second pieces each forming separate volumes, wherein the lock in compresses the cutting threads against the threaded element.

4. The thread repair assembly of claim 3, where the first piece is substantially identical in size and geometry to the second piece, and wherein the cutting nut disengages from the cutting-nut housing when the cutting-nut housing is urged in a tightening direction, opposite the loosening direction.

5. The thread repair assembly of claim 3, where the internal drive apparatus interface is positioned adjacent to one of the axial ends; and where each of the first and second pieces has first and second exterior flats, the first and second exterior flats located on opposing sides of the pieces, and the first and second pieces further having a third exterior flat perpendicular to the first and second exterior flats, the third exterior flat perpendicularly adjoining the shoulder.

6. The thread repair assembly of claim 5, where urging in the loosening direction includes rotating the cutting-nut housing via rotation of a drive apparatus mated with the internal drive apparatus interface, wherein urging in the loosening direction urges the thread repair assembly in the first axial direction; and where the cutting-nut housing has an interior flat adjoining the engagement surface, the interior flat and the engagement surface being perpendicular.

7. The thread repair assembly of claim 6, where the internal drive apparatus interface includes a plurality of planar surfaces forming a hexagonal shape; and where the first exterior flat engages the interior flat when the assembly is urged in the second axial direction by rotating the assembly in a tightening direction.

8. The thread repair assembly of claim 7, where the cutting nut is internally driven by the cutting-nut housing; and where the third exterior flat engages the interior flat when the assembly is urged in the first axial direction by rotating the assembly in the loosening direction.

9. The thread repair assembly of claim 2, where the cutting nut includes an external surface tapered in the second axial direction, the tapered external surface configured to mate with a correspondingly tapered surface in the cutting-nut interface when the cutting threads are cuttingly engaged with the threaded element.

10. The thread repair assembly of claim 2, further comprising one or more cutting-nut retaining elements at least partially enclosed by the cutting-nut housing and coupled to the cutting nut.

11. The thread repair assembly of claim 10, where the one or more retaining elements is positioned axially between one of the openings and the cutting nut.

12. A thread repair kit comprising:

a thread repair assembly including a cutting-nut housing having a first axial end, a second axial end, a central axis passing through the first and second axial ends, an engagement surface located on an interior surface of the cutting-nut housing and oriented perpendicularly to the central axis, and an internal drive apparatus interface having at least two interior planar surfaces, the first and second axial ends each including openings;

a drive apparatus including a tool interface configured to accept a rotational-tool attachment and a repair assembly interface configured to mate with the internal drive apparatus interface in the thread repair assembly; and a cutting nut comprised of two half-nuts configured to engage with a threaded element, each half nut including a plurality of non-continuous cutting threads, the cutting nut locking in to the cutting-nut housing when the housing is urged in a loosening direction, where urging the housing in the loosening direction urges the assembly in a first axial direction, wherein the cutting nut further comprises a shoulder parallel to the engagement surface, and wherein the locking in comprises the shoulder slidingly engaging the engagement surface.

13. The thread repair kit of claim 12, where the cutting-nut housing further includes an internal cutting-nut interface, where the cutting nut is at least partially enclosed by the cutting-nut housing, where the plurality of cutting threads is configured to engage the threaded element when the thread repair assembly is urged in the first axial direction and disengage the threaded element when the thread repair assembly is urged in a second axial direction opposing the first axial direction.

14. The thread repair kit of claim 13, where the drive apparatus includes an internal central shaft opening sized greater than a resulting outer diameter of a threshold cut by the thread repair assembly.

15. The thread repair kit of claim 14, where the internal central shaft opening extends from a first end of the drive apparatus to the tool interface; and wherein upon locking in the shoulder is located between the engagement surface and the second axial end.

16. The thread repair kit of claim 13, where the repair assembly interface is positioned on an external surface of the drive apparatus, and wherein the cutting nut is rotatable relative to the cutting-nut housing when the thread repair assembly is engaged to the threaded element.

17. The thread repair kit of claim 13, where the thread repair assembly further includes one or more retaining elements positioned between one of the axial ends and the cutting nut, and wherein the shoulder engages the engagement surface when the thread repair assembly is urged in the first axial direction, the engagement surface being located above the shoulder in the first axial direction.

18. The thread repair kit of claim 13, where the cutting nut includes an external surface tapered in the second axial direction, the tapered external surface configured to mate with a correspondingly tapered surface in the internal cutting-nut interface when the cutting threads are engaged with the threaded element, and where the shoulder slides relative to the engagement surface when the thread repair assembly is urged in the loosening direction.

19. A thread repair assembly comprising:
- a cutting-nut housing including a first axial end, a second axial end, a central axis passing through the first and second axial ends, an engagement surface perpendicular to the central axis, an internal drive apparatus interface having at least two interior planar surfaces, and an internal cutting-nut interface, the first and second axial ends each having an opening; and
- a cutting nut coupled to the cutting-nut housing and including a plurality of cutting threads, a shoulder parallel to the engagement surface, and an external surface tapered in a second axial direction, the tapered external surface configured to mate with a correspondingly tapered surface in the internal cutting-nut interface when the cutting threads are cuttingly engaged with a threaded element, wherein
- the shoulder slides relative to the engagement surface when the cutting threads are engaged with the threaded element and the cutting-nut housing is urged in a loosening direction.

20. The thread repair assembly of claim 19, where the cutting threads are non-continuous and include a plurality of sections spaced away from one another, wherein the shoulder is engaged with the engagement surface and is located between the engagement surface and the second axial end when the cutting threads are engaged with the threaded element and the cutting-nut housing is urged in the loosening direction, causing the thread repair assembly to be urged in a first axial direction, and wherein the shoulder being engaged with the engagement surface locks the cutting nut to the cutting-nut housing.

* * * * *